US010442892B2

United States Patent
Gnanou et al.

(10) Patent No.: US 10,442,892 B2
(45) Date of Patent: *Oct. 15, 2019

(54) COPOLYMERIZATION OF CARBON DIOXIDE AND CYCLIC MONOMERS TO FORM POLYCARBONATES

(71) Applicant: King Abdullah University of Science and Technology, Thuwal (SA)

(72) Inventors: Yves Gnanou, Thuwal (SA); Xiaoshuang Feng, Thuwal (SA); Dongyue Zhang, Thuwal (SA); Yahya Alzahrany, Thuwal (SA); Senthil Boopathi, Thuwal (SA); Nikolaos Hadjichristidis, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

This patent is subject to a terminal disclaimer.

(21) Appl. No.: 15/803,011

(22) Filed: Nov. 3, 2017

(65) Prior Publication Data

US 2018/0051134 A1  Feb. 22, 2018

Related U.S. Application Data

(63) Continuation-in-part of application No. 15/571,631, filed as application No. PCT/IB2016/053552 on Apr. 13, 2016.

(Continued)

(51) Int. Cl.
  *C08G 64/34* (2006.01)
  *C08G 64/32* (2006.01)
  (Continued)

(52) U.S. Cl.
  CPC .......... *C08G 64/34* (2013.01); *C08G 64/32* (2013.01); *C08G 81/00* (2013.01); *C08K 5/057* (2013.01);
  (Continued)

(58) Field of Classification Search
  CPC ........ C08G 64/34; C08G 81/00; C08K 5/057; C08K 5/19; C08K 5/53; C08K 5/5399
  See application file for complete search history.

(56) References Cited

U.S. PATENT DOCUMENTS 4,746,726 A * 5/1988 Evans .................... C08G 64/30
                                                     528/196
5,952,457 A    9/1999 Kouno et al.
(Continued)

FOREIGN PATENT DOCUMENTS

WO   2009130470 A1   10/2009
WO   2011144523 A1   11/2011
(Continued)

OTHER PUBLICATIONS

Coates, et al., "Discrete Metal-Based Catalysts for the Copolymerization of CO2 and Epoxides: Discovery, Reactivity, Optimization, and Mechanism", Angew. Chem. Int. Ed. 43, 2004, 6618-6639.
(Continued)

*Primary Examiner* — Shane Fang
(74) *Attorney, Agent, or Firm* — Billion & Armitage; Gregory S. Schwartz

(57) ABSTRACT

Embodiments of the present disclosure describe initiating systems comprising an activator and an initiator, wherein the activator includes an alkyl borane or alkyl aluminum, wherein the initiator includes an organic cation and either an alkali metal or a compound containing an active protic hydrogen. Embodiments of the present disclosure further describe methods of making a polycarbonate comprising contacting a cyclic monomer and carbon dioxide in the presence of an activator and an initiator to form a polycarbonate, wherein the catalyst is one or more of an alkyl borane and alkyl aluminum, wherein the initiator includes an organic cation and either an alkali metal or a compound containing an active protic hydrogen.

16 Claims, 53 Drawing Sheets

Related U.S. Application Data

(60) Provisional application No. 62/319,883, filed on Apr. 8, 2016, provisional application No. 62/175,556, filed on Jun. 15, 2015.

(51) Int. Cl.

| | |
|---|---|
| *C08G 81/00* | (2006.01) |
| *C08K 5/057* | (2006.01) |
| *C08K 5/19* | (2006.01) |
| *C08K 5/53* | (2006.01) |
| *C08K 5/5399* | (2006.01) |

(52) U.S. Cl.
CPC ............... *C08K 5/19* (2013.01); *C08K 5/53* (2013.01); *C08K 5/5399* (2013.01)

(56) References Cited

U.S. PATENT DOCUMENTS

| | | |
|---|---|---|
| 6,713,599 B1 | 3/2004 | Hinz et al. |
| 6,815,529 B2 | 11/2004 | Zhao et al. |
| 6,844,287 B2 | 1/2005 | Meng et al. |
| 7,304,172 B2 | 12/2007 | Coates et al. |
| 8,093,351 B2 | 1/2012 | Coates et al. |
| 2011/0207909 A1 | 8/2011 | Jeong et al. |

FOREIGN PATENT DOCUMENTS

| | | |
|---|---|---|
| WO | 2012121508 | 9/2012 |
| WO | 2014178442 | 11/2014 |
| WO | 2016203408 A1 | 12/2016 |

OTHER PUBLICATIONS

Darensbourg, "Making Plastics from Carbon Dioxide: Salen Metal Complexes as Catalysts for the Production of Polycarbonates from Epoxides and CO2", Chem. Rev. 107, 2007, 2388-2410.

Esswein, et al., "Polymerization of Ethylene Oxide with Alkyllithium Compounds and Phosphazene Base "tBu-P4"**", Angew. Chem. Int. Ed. Engl. 35, No. 6, 1996, 623-625.

Herzberger, et al., "Polymerization of Ethylene Oxide, Propylene Oxide, and Other Alkylene Oxides: Synthesis, Novel Polymer Architectures, and Bioconjugation", Chem. Rev. 116, 2016, 2170-2243.

Hsieh, et al., "Anionic Polymerization Principles and Practical Applications", Marcel Dekker, Inc., 1996, 5.

Ikpo, et al., "Aluminum coordination complexes in copolymerization reactions of carbon dioxide and epoxides", Dalton Trans., 42, 2013, 8998-9006.

Kuran, et al., "Epoxide Polymerization and Copolymerization with Carbon Dioxide Using Diethylaluminum Chloride-25,27-Dimethoxy-26,28-Dihydroxy-p-tert-Butyl-Calix[4]Arene System as a New Homogeneous Catalyst", J.M.S.—Pure Appl. Chem., A35(3), 1998, 427-437.

Lu, et al., "Cobalt catalysts for the coupling of CO2 and epoxides to provide polycarbonates and cyclic carbonates", Chem. Soc. Rev., 41, 2012, 1462-1484.

Mikkelsen, et al., "The teraton challenge. A review of fixation and transformation of carbon dioxide", Energy Environ. Sci., 3, 2010, 43-81.

Roos, et al. "Grignard-based anionic ring-opening polymerization of propylene oxide activated by triisobutylaluminum", European Polymer Journal 70, 2015, 240-246.

Sugimoto, et al., "Copolymerization of Carbon Dioxide and Epoxide", Journal of Polymer Science: Part A: Polymer Chemistry, vol. 42, 2004, 5561-5573.

Sujith, et al., "A Highly Active and Recyclabel Catalytic System for CO2/Propylene Oxide Copolymerization**", Angew. Chem. Int. Ed. 47, 2008, 7306-7309.

Varghese, et al., "Incorporation of ether linkage in CO2/propylene oxide copolymerization by dual catalysis", Polyhedron 32, 2012, 90-95.

Zevaco, et al., "Aluminum bisphenoxides: Promising challengers for a catalyzed copolymerization of cyclohexene oxide with CO2", Catal. Today, 115, 2006, 151-161.

Zevaco, et al., "Aluminum triisopropoxide: An inexpensive and easy-to-handle catalyst of the copolymerisation of cyclohexene oxide with CO2", Green Chem., 7, 2005, 659-666.

Zhang, et al., "Metal-Free Alternating Copolymerization of CO2 with Epoxides: Fulfilling "Green" Synthesis and Activity", J.Am. Chem.Soc. 138, 2016, 11117-11120.

Inoue, et al., "Copolymerization of Carbon Dioxide and Epoxide", Polymers Letteres, vol. 7, 1969, 287-292.

Sun, et al., "Development in the green synthesis of cyclic carbonate from carbon dioxide using ionic liquids", Journal of Organometallic Chemistry, 690, 2005, 3490-3497.

Wang, et al., "Carbon Dioxide Capture by Superbase-Derived Protic Ionic Liquids", Angew. Chem. Int. Ed., 49, 2010, 5978-5981.

Cowman, et al., "Multicomponent Nanomaterials with Complex Networked Architectures from Orthogonal Degradation and Binary Metal Backfilling in ABC Triblock Terpolymers", J. Am. Chem. Soc. 2015, 137, 6026-6033.

Fiorani, et al., "Sustainable conversion of carbon dioxide: the advent of organocatalysis", Green Chemistry, (2014) 10.1039/C4GC01959H).

Ikpo, et al., "Aluminium coordination complexes in copolymerization reactions of carbon dioxide and epoxides", Organometallics, 2012, 31, 8145-8158.

Kember, et al., "Catalysts for CO2/Epoxide Copolymerisation", Chem. Commun., 2011, 47, 141.

Maeda, et al., "Recent progress in catalytic conversions of carbon dioxide", Ema. Catal. Sci. Technol., 2014,4, 1482-1497.

Sun, et al., "Ionic Liquids in Green Carbonate Synthesis" In: "Ionic Liquids-Classes and Properties", Oct. 10, 2011, 303-306.

Xu, et al., "Effects of imidazolium salts as cocatalysts on the copolymerization of CO"2 with epoxides catalyzed by (salen) Cr I I C1 complex", Polymer, Elsevier Science Publishers B.V. GB, Jun. 29, 2007, 3921-3924.

Search Report and Written Opinion for PCT/IB2016/053552, dated Aug. 30, 2016.

* cited by examiner poly(cyclohexene carbonate) initiated by LiBr

COPOLYMERIZATION OF CARBON DIOXIDE AND CYCLIC MONOMERS TO FORM POLYCARBONATES

BACKGROUND

Carbon dioxide ($CO_2$) is an abundant, inexpensive, and non-toxic renewable C1 resource for the production of value-added chemicals and materials. Chemical fixation of carbon dioxide is an important research field of green chemistry. Alternating copolymerization of carbon dioxide-based polycarbonate is one of its most important applications. This polymer not only has excellent barrier properties to oxygen and water, but also has excellent biocompatibility and biodegradability. Polycarbonates can be used as engineering plastics, non-polluting materials, disposable medical and food packaging, adhesives and composite materials.

In 1969 Inoue, et al. discovered that $CO_2$ could be incorporated into the polymer chain to form polycarbonates through the copolymerization with epoxides. Since then, especially during the past two decades, significant progresses have been made in this area. Generally, the catalysts used for the copolymerization of $CO_2$ and epoxide are compounds based on transition metals or earth-abundant main group metals such as, Zn, Co, Cr, Mg, Al, which are either insoluble or soluble in the reaction system during copolymerization. The most successful $CO_2$-epoxide copolymerization systems are based on transition metal Cr(III), Co(III) or Zn(II) complexes with Schiff base ligands. In the case of copolymerization of $CO_2$ and propylene oxide (PO), totally alternated poly(propylene carbonate) (PPC) with molar mass up to 300,000 g $mol^{-1}$ could be prepared using a recyclable catalyst (salen) Co(III) (S. Sujith, et. al, Angew. Chem. Int. Ed., 2008, 47, 7306).

In this context, many patents have been filed for the production of polycarbonates or polyol depending on the catalysts used, including heterogeneous ones represented by zinc glutarate and double metal cyanides (DMCs): U.S. Pat. No. 6,713,599, 6,815,529, 6,844,287, 8,093,351, WO2011144523; and homogeneous ones represented by cobalt and chromium with salen ligands: U.S. Pat. No. 7,304,172, US20110207909, WO2009130470. Homogeneous catalysts are of more active and higher selectivity with respect to the heterogeneous ones. However, the former need multi-step synthesis due to the complexity of ligands. In addition, whatever catalysts used during copolymerization, the polycarbonates produced are contaminated with metals which give color and toxicity. A post-polymerization removal step is necessary for stability and broad applicability especially in the commodity area including Sacrificial Binder, Electronic Processing, and Packaging.

There are a very large range of commercially available and naturally occurring epoxides, the diversities of epoxides could produce the polycarbonates with different properties. For instance, the Tg values of produced polycarbonates from epoxides 1-dodecene oxide, cyclohexene oxide, 1,4-dihydronaphthalene oxide span from −38, 118, to 150° C., where the latter is very close to the conventional bisphenol-A polycarbonate. In addition, terpolymerization of two or more epoxide monomers can tune the properties of random polycarbonate copolymers produced. (Darensbourg and Wang 2014; Seong et al. 2010; Ren et al. 2010) On the other hand, sequential polymerization of epoxides with $CO_2$ can afford a polycarbonate block copolymer. Darensbourg et al. reported the synthesis of ABA triblock polycarbonates through sequential addition of propylene oxide and allyl glycidyl ether, using water as a chain-transfer reagent; (Wang, Fan, and Darensbourg 2015) similarly, Tan et al. described the copolymerization of cyclohexene oxide and 4-vinyl-1-cyclohexene-1,2-epoxide with $CO_2$, producing polycarbonate block copolymer through sequential addition of monomers in one pot. (Hsu and Tan 2002, 2003) The pendant vinyl groups could thus be further functionalized for other applications. (Darensbourg 2017) Due to the selectivity of catalysts, it should be noted that epoxide monomers chosen for block copolymerization have similar structures, in other words, they are either terminal epoxides (propylene oxide) or internal epoxides (cyclohexene oxide).

To improve the thermal and mechanical properties of most investigated polycarbonates, (PPC) and poly(cyclohexenecarbonate) (PCHC), or endow degradable properties to other polymeric materials, incorporation of two or more other blocks into the polycarbonates to form block copolymers is indispensable. One strategy is the copolymerization of $CO_2$ with other epoxides which could afford polycarbonate block copolymers. Through sequential addition of functionalized cyclohexene monomer, Coates, et. al. synthesized a multiblock polycyclohexene carbonate with different functional substituents at the cyclohexene ring with Zn(II) diiminate as catalyst (J. G. Kim, et. al., Macromolecules 2011, 44, 1110-1113). Similarly, Darensbourg et. al. reported that terpolymerization of propylene oxide, vinyl oxide and $CO_2$ provided random polycarbonate copolymers of various compositions depending on the feed ratios of the epoxide monomers catalyzed by binary and bifunctional (salen) Co(III) complexes, the vinyl group introduced could be crosslinked afterwards (D. J. Darensbourg, et. al., Polymer Chemistry 2014, DOI: 10.1039/c4py01612b). Due to the high selectivity of catalysts to one kind of epoxide monomer, other strategy had to be employed to get block copolymers other than polycarbonates. Using various polymers containing hydroxyl or carboxylic group as a chain transfer agents, Lee et. al. synthesized block copolymers of PPC, and poly (ethylene oxide), polytetrahydrofuran, polycaprolactone, polystyrene, etc. respectively (A. Cyriac, et al, Macromolecules 2010, 43, 7398-7401). Alternatively, Williams's and Lu's group reported the preparation of polycarbonate block copolymer in a two-step process, the end or side hydroxyl groups due to transfer or hydrolysis of polycarbonate produced in the first step, subsequently initiate the polymerization of lactide; ABA-type and grafted polycarbonate-b-polylactide were obtained respectively (M. R. Kember, et al, Polymer Chemistry 2012, 3, 1196-1201; Y. Liu, et al, Macromolecules 2014, 47, 1269-1276). Recently, Darensbourg have demonstrated a tandem catalytic approach for the synthesis of AB diblock copolymers containing poly (styrene carbonate) and polylactide, where the end hydroxyl group of macroinitiator was generated at the end of copolymerization of styrene oxide/$CO_2$ copolymerization (G.-P. Wu, et al, J. Am. Chem. Soc. 2012, 134, 17739-17745); in another strategy, they reported the synthesis of ABA-type PLA-PPO-PLA triblock copolymers in one pot, here, water was added along with the propylene oxide (PO)/$CO_2$ copolymerization process as a chain-transfer reagent (D. J. Darensbourg, G. P. Wu, Angew. Chem. Int. Ed. 2013, 52, 10602-10606).

Recently, more attention has been paid to green processes and catalysts based on main group metal complexes. With efficient catalysts such as Co(III) and Cr(III), the traces of metal residues inside the resin may result in toxic, colored, degradation issues that will affect their performance and limit their applications accordingly. In contrast, aluminum, one of the earliest investigated metal as catalyst since the discovery of copolymerization of $CO_2$ and epoxides, is earth-abundant, cheap, and biocompatible. More importantly, aluminum complexes are known to catalyze a wide range of other polymerization reactions, thus providing the possibility to expand $CO_2$ based block copolymers other than epoxides. In fact, due to the competitive homopolymerization of epoxides catalyzed by aluminum catalysts, more work needs to be done to improve the catalytic effects. Aluminum porphyrin complex and Schiff base complexes both could catalyze alternating copolymerization of $CO_2$ and epoxides, the catalytic efficiencies were quite low, and molar masses of obtained polycarbonates were below 10 Kg $mol^{-1}$ (N. Ikpo, J. C. Flogeras, F. M. Kerton, Dalton Trans., 42, 2013, 8998-9006). As for aluminum alkoxides Rtriisopropoxide (T. A. Zevaco, et. al. Green Chem., 2005, 7, 659-666); bisphenoxide (T. A. Zevaco, et. al. Catal. Today, 2006, 115, 151-161); calixarenoxide (W. Kuran, et. al. J. Macromol. Sci., Pure Appl. Chem., 1998, A35, 427-437)], these relatively simple coordination complexes, however, required high pressures, the achieved polymers were of low to moderate carbonate linkage with low molar mass. The only exception is the results reported by Kerton (N. Ikpo, et. al. Organometallics, 2012, 31, 8145-8158) that a relatively high molecular weight polymer (20.9 Kg mol-1) with 54% of carbon dioxide incorporation was achieved when aminephenoxide was used as catalyst.

The composition of carbonate linkage in these systems could be hardly fine-tuned once the catalysts for the copolymerization of $CO_2$ and epoxides were chosen, which then yielded for each system a fixed percentage of carbonate linkage between 100% and a few percent. The only means in each of these systems to vary the percentage of carbonate linkage would thus be to vary the pressure of $CO_2$ or the temperature. For some purposes, polymers whose level of carbonate linkages could be easily varied may also be desirable. However, one example that allows tuning of the composition of carbonate linkage is reported by Lee et. al. who mixed two kinds of catalysts in different ratio, the propagation occurring through shuttling of the growing polymer chains between the two catalyst sites: Salen-cobalt (III) complex bearing four quaternary ammonium salts [a highly active poly(propylene carbonate) catalyst, 100% of carbonate linkage] and a double metal cyanide [DMC, a highly active poly(propylene oxide), 10% of carbonate linkage], copolymers with 10-67% of carbonates could be achieved (J. K. Varghese, et al, Polyhedron 2012, 32, 90-95).

SUMMARY

In general, embodiments of the present disclosure describe, among other things, initiating systems, methods of making polycarbonates, and methods of controlling polymer composition.

Embodiments of the present disclosure describe initiating systems comprising an activator and an initiator, wherein the activator includes an alkyl borane or alkyl aluminum, wherein the initiator includes an organic cation and either an alkali metal or a compound containing an active protic hydrogen.

Embodiments of the present disclosure further describe methods of making a polycarbonate comprising contacting a cyclic monomer and carbon dioxide in the presence of an activator and an initiator to form a polycarbonate, wherein the activator is one or more of an alkyl borane and alkyl aluminum, wherein the initiator includes an organic cation and either an alkali metal or a compound containing an active protic hydrogen.

Embodiments of the present disclosure also describe methods of making a polycarbonate comprising contacting an epoxide monomer and carbon dioxide in the presence of an activator and an initiator to form a polycarbonate, wherein the activator is trialkyl borane, wherein the initiator includes an alkali metal and an organic cation.

Embodiments of the present disclosure also describe methods of making a polycarbonate comprising contacting an epoxide monomer and carbon dioxide in the presence of an activator and an initiator to form a polycarbonate, wherein the activator is a trialkyl borane, wherein the initiator includes an alcohol compound and an organic cation.

Other embodiments of the present disclosure describe methods of making block copolymers of polycarbonate comprising contacting a first epoxide monomer and carbon dioxide in the presence of an activator including trialkyl borane and an initiator to form a first polycarbonate block, and adding a second epoxide monomer to form a second polycarbonate block of a block copolymer that is different from the first polycarbonate block Embodiments of the present disclosure further describe a method of controlling a polymer composition, comprising contacting one or more cyclic monomers and carbon dioxide; adjusting an amount of one or more of a Lewis acid catalyst, an ionic liquid, and an initiator in the presence of the one or more cyclic monomers and carbon dioxide, sufficient to selectively modify a resulting polycarbonate; and agitating, sufficient to copolymerize the one or more cyclic monomers and carbon dioxide to create the polycarbonate.

BRIEF DESCRIPTION OF THE DRAWINGS

The accompanying drawings illustrate non-limiting example embodiments of the invention.

DETAILED DESCRIPTION

Figure 1:
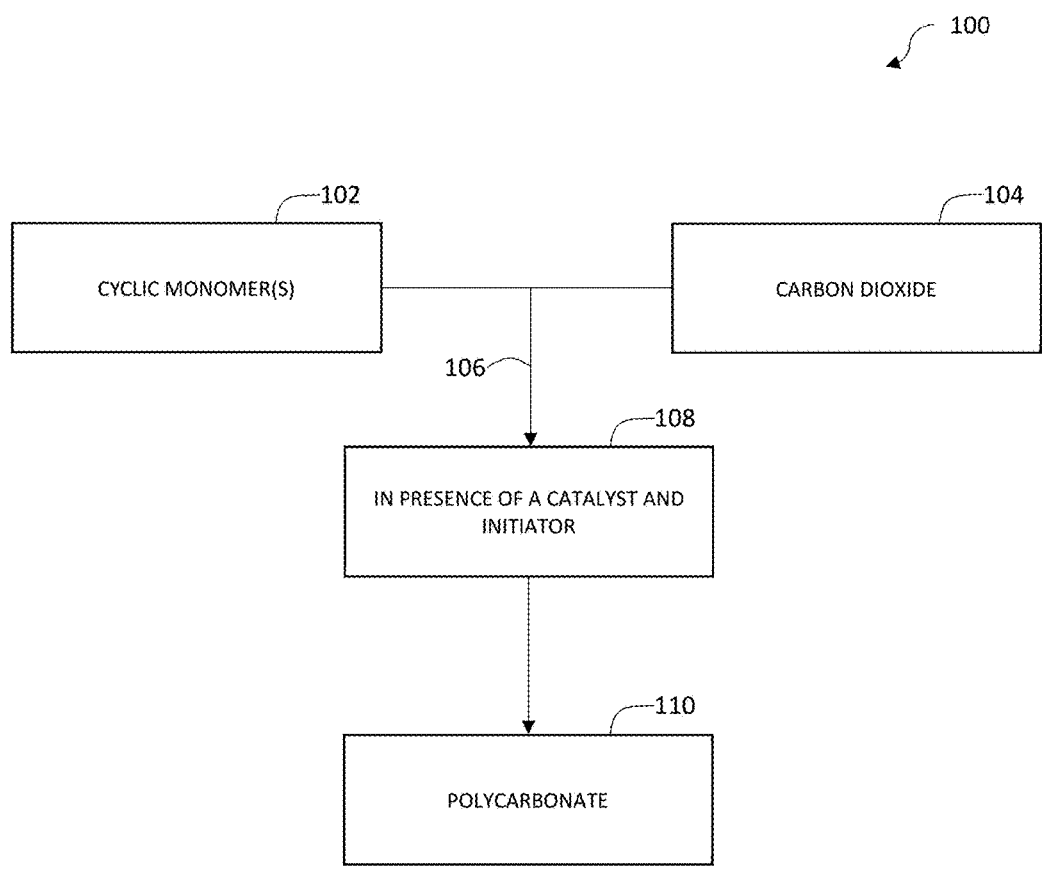
FIG. 1 is a flowchart of a method of making polycarbonates, according to one or more embodiments of the present disclosure.

The invention of the present disclosure relates to initiating systems for the synthesis of polycarbonates and methods of synthesizing polycarbonates. The synthesis of polycarbonates may include the copolymerization (e.g., anionic copolymerization) of carbon dioxide and epoxide monomers in the presence of an activator and an initiator, which may collectively be referred to as an initiating system. The activator may include one or more of an alkyl borane or alkyl aluminum. For example, the activator may include a trialkyl borane, such as triethyl borane, or a trialkyl aluminum, such as triisobutyl aluminum. The initiator may include an organic cation and either an alkali metal or alcohol compound. For example, the organic cation may include one or more of ammonium, phosphonium, and phosphazenium; the alkali metal may include one or more of lithium, potassium, and sodium; and the alcohol compound may include any compound containing more than one hydroxyl group. Together, the activator and initiator may be used as an initiating system to produce polycarbonates from a wide array of epoxide monomers. In addition, the initiating systems may be used to produce, among other things, AB and/or ABA block copolymers of polycarbonate, where polycarbonate block A is different from polycarbonate block B.

The methods of the present disclosure provide various synthetic routes that are simple, scalable, and modifiable. The methods do not require multi-step synthetic routes for activator/ligand. In addition, the synthesis of polycarbonates may include anionic copolymerization of epoxide monomer and carbon dioxide to afford perfectly or nearly perfectly alternating polycarbonates. In embodiments in which there is no solvent, the methods produce polymers of high clarity for bulk polymerizations. The synthesis of block copolymers may include sequential addition of epoxide monomers to afford, for example, AB diblock copolymers and ABA triblock copolymers. The methods may also be used to produce non-linear complex macromolecular architectures, diol polycarbonates, polyester, and polyether, among other things. The methods permit precise control over the molecular weight of polycarbonates, which is essential for practical applications of polymerization process and obtaining desired physical properties.

In addition, the synthetic routes for polycarbonates and/or polycarbonate block copolymers may proceed either in the presence of a metal or under metal-free conditions. For example, in some embodiments, a metal-based synthetic route may be used for the synthesis of polycarbonates. In these embodiments, the initiating system may include a phosphazene base as the organic cation and lithium as the alkali metal. In other embodiments, the synthesis of polycarbonates may proceed under metal-free conditions, obviating any post-synthesis purification steps. In these embodiments, the initiating system only needs to include an organic cation and borane as an activator for the copolymerization to proceed metal-free. Metal-free conditions may be a desirable alternative because the polycarbonate is color-free and generally about 100% solid. In these ways, the initiating systems provide unprecedented performance and versatility in the synthesis of polycarbonates and ABA block copolymers of polycarbonates from a wide array of epoxide monomers under various conditions and via numerous synthetic routes.

Further, common commercial problems with polycarbonates include laborious and costly activator preparation, as well as residues remaining in the resins. These problems may increase costs, create toxicity issues, and limit performance. Importantly, there lacks a methodology to tune the carbonate contents for specific applications. The activators for the copolymerization of $CO_2$ and epoxides in the present disclosure are inexpensive and widely available, can tune the composition of obtained polycarbonates, and copolymerize with other cyclic monomers, such as lactide and caprolactones.

The methods and compositions disclosed herein also provide inexpensive, commercially available, biocompatible Lewis acids as activators for copolymerization of carbon dioxide and cyclic monomers, such as epoxides. Further, the carbonate and polyether contents can be conveniently adjusted based on the feeding ratio of activator to initiator or together with amount of ionic liquid and lithium salts utilized. Polycarbonates can be modified or tuned according to embodiments of the invention to create two types of block copolymer structure, random and alternated copolymer with the carbonate composition from about 2% to about 100%, for example.

As embodiments of this disclosure discuss preparations of polycarbonate with different compositions and structures, which is also the precursor of polyurethane, results may find application in packaging, coatings, surfactant, and medical industries.

Definitions

As used herein, "polycarbonate" refers to a general class of polymers containing a carbonate moiety.

As used herein, "contacting" refers to bringing two or more components in proximity, such as physically, chemically, electrically, or some combination thereof. Mixing is an example of contacting.

As used herein, "agitating" refers to disturbing or moving components. Agitating can include stirring and shaking, for example.

As used herein, "ionic liquid" refers to a salt in a liquid state. In an ionic liquid, the ions are poorly coordinated and result in the liquids having low melting points. Ionic liquids can be derived from methylimidazolium and pyridinium ions, for example.

As used herein, "lithium salt" refers to a salt with lithium as a cation. They include inorganic and organic salts, and could participate in polymerization as an initiator or as additive to tune the polymerization activity of one or more monomers and carbon dioxide.

As used herein, "initiating system" refers to a system including at least one initiator and activator.

As used herein, "initiator" refers to a mono- or poly- (including macromolecular) alcoholic, phenolic, acidic salts with cations (lithium, sodium, potassium, cesium, ammonium, imidazolium, phosphazium) produced through deprotonation by different bases, salts, and other lithium salts additives, as well as superbase complexes. Bases include, but are not limited to, for example, imidazolium alkoxide, lithium alkoxide, lithium phenolate, and alkyllithium (including macromolecular alkoxide); salts include, but are not limited to, for example, imidazolium halide, lithium, sodium, potassium, halides, ammonium, tetraalkylammonium, tetraalkylphosphonium in halide, hydroxide, carbonate, and carboxylate; and other lithium salts additives include, but are not limited to, for example, lithium carbonate, LiOH, $LiCO_3$, $LiClO_4$, $LiPF_6$, $LiBF_4$, and lithium bis(trifluoromethane)sulfonamide (Tf2N). The initiator can include macromolecular salts, including, but not limited to, for example, one or more of macromolecular lithium salts. The initiator can include an anionic nucleophile.

As used herein, "epoxide" refers to a cyclic ether with a three-atom ring. Examples of epoxides include propylene oxide (PO) and cyclohexene oxide (CHO), and can be used as cyclic monomers.

Initiating Systems

Embodiments of the present disclosure describe initiating systems including at least one activator and initiator for use in the synthesis of polycarbonates and/or block copolymers of polycarbonate from the copolymerization of one or more cyclic monomers and carbon dioxide. While conventional initiating systems are limited to a small number of epoxides, the initiating systems of the present disclosure may be used to synthesize polycarbonates from a wide array of epoxides. For example, the initiating systems may be used in the anionic copolymerization of cyclic monomers (e.g., epoxide monomers) and carbon dioxide to form perfectly (or nearly perfectly) alternating polycarbonates. The initiating systems may also be used to synthesize block copolymers of polycarbonate. In many embodiments, the block copolymers may be characterized as AB or ABA block copolymers, wherein the A block and B block are different polycarbonate blocks.

The activator may include one or more of boron and aluminum compounds. For example, the activator may include one or more of an alkyl borane and alkyl aluminum. In embodiments in which the activator includes an alkyl borane, the activator may include a trialkyl borane. For example, trialkyl boranes may include one or more of triethyl borane, trimethyl borane, triisobutylborane, and triphenyl borane. In embodiments in which the activator includes an alkyl aluminum, the activator may include a trialkyl aluminum. For example, the trialkyl aluminum may include triisobutyl aluminum.

The initiator may include salts or an organic cation associated with an alcohol compound forming an organic base or an alkali metal associated with an alcohol compound (RO or an alkali metal such as Li+ associated with an alcohol compound mixed with a superbase $P_1$, $P_2$ or $P_4$. The organic cation may be based on one or more of phosphazenium, ammonium, and/or phosphonium. For example, the organic cation/organic base may be obtained by mixing phosphazene bases (e.g., t-Bu-$P_Y$, where Y is 1, 2, or 4) with an alcohol, or may include bis (triphenylphosphoranylidene) ammonium chloride, tetraoctylammonium chloride, and tetrabutylammonium chloride. In other embodiments, the organic cation may include any ammonium or phosphonium salt, wherein the nitrogen or phosphorous, respectively, are connected by four alkyl groups, each of which may be the same or different. The alkali metal may include one or more of lithium, potassium, and sodium. The alcohol compound may include any compound containing more than one hydroxyl group such as a diol and/or triol. The alcohol compound may be a linear polymer or a star-branched polymer. In many embodiments, the alcohol compound may include 1,4-dibenzenemethanol. In other embodiments, any compound containing an active protic hydrogen may be used, including, but not limited to, one or more of alcohols, thiols, phenols, carboxylic acids, etc.

In an embodiment, the initiator may be a salt, such as LiCl, LiBr, and/or any other salt disclosed herein. In an embodiment, the initiator may be an organic cation associated with an alcohol, such as $RO^-$, $N^+(Alkyl)_4$ and/or any other embodiment disclosed herein that includes an organic cation associated with an alcohol. In an embodiment, the initiator may include an alkali metal cation associated with an alcohol, such as $RO^-$, $Li^+$ and/or any other embodiment disclosed herein that includes an alkali metal cation associated with an alcohol. In an embodiment, the initiator may include an alkali metal, such as $Li^+$, associated with an alcohol compound mixed with a superbase, such as $RO^-$, $Li-P_4^+$, and/or any other embodiment disclosed herein that includes an alkali metal associated with an alcohol compound mixed with a superbase.

The activator and initiator may comprise the initiating system. In many embodiments, it is important to provide the activator in excess of stoichiometric conditions. For example, the initiator (e.g., base, such as BuLi, oxyanion, etc.) and activator (e.g., Lewis acid) may react under stoichiometric conditions to form an ate complex (e.g., the initiating system). The ate complex may be used to initiate the copolymerization of epoxides and $CO_2$. The ate complex may be formed when a Lewis acid gains one bond by reaction with a base and becomes a negative anion. Similarly, when the base reacts with an acid, it gains one bond and becomes a positive cation (e.g., phophazene base, $P_4$, reacting with $H^+$ of an alcohol becomes a positive cation, $P_4-H^+$; in the presence of $Li^+$, $P_4$ gives the $P_4-Li^+$, a positive cation). See the reaction below, for example, where the central boron atom gains one more bond and becomes a negative anion, reducing the reactivity of ate complex formed.

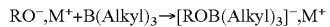

$$RO^-, M^+ + B(Alkyl)_3 \rightarrow [ROB(Alkyl)_3]^-, M^+$$

The initiator of the ate complex (i.e., initiating system) may be used to activate carbon dioxide. The activator of the ate complex (i.e., initiating system) may be used to activate the epoxide monomer. However, since the activator reacted with the base under stoichiometric conditions in forming the ate complex, in many embodiments, it is important to provide an excess of the activator in order to ensure activation of the epoxide monomer. In some embodiments, where an excess of activator was not provided, no copolymerization may occur.

Accordingly, the use of activators including boron and/or aluminum may fulfill at least two important roles that are different from other activators known in the art. First, each of boron and/or aluminum may be used to form an ate complex with a growing anion for triggering polymerization. The reactivity of these ate complexes is very different from conventional anions because ate complexes are the result of the reaction of the latter anions with Lewis acids; ate complexes therefore exhibit a lower reactivity than the bases they are generated from and are generally more selective. Second, trialkyl boron and/or trialkyl aluminum is used in excess of the organic cation and/or initiator to specifically activate the epoxide monomer in a ratio that may vary from 1.1:1 to 10:1. For example, a 1:1 ratio of boron or aluminum to organic cation or initiator may fail to activate the monomer and result in no polymerization. In many embodiments, a 1:2 ratio of organic cation/initiator to boron/aluminum is appropriate to activate the monomer.

Some embodiments of the present disclosure describe an initiating system comprising an activator including an alkyl borane and an initiator including an organic cation and alkali metal. The alkyl borane may include a trialkyl borane. For example, the trialkyl borane may include triethyl borane (shown below), an organoborane with a B—C bond and generally a colorless pyrophoric liquid:

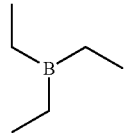

The addition of triethylborane may provide numerous advantages over conventional activators. For example, in reaction systems for the anionic alternating copolymerization of epoxides with $CO_2$, triethyl borane may serve at least two important functions (1) for epoxide monomers activation and (2) for generating ate complexes by reaction with a base (e.g., BuLi, oxyanion, etc.) thereby making the active species formed more selective. Accordingly, triethyl borane, among other activators, may not only be used as an activator of an epoxide monomer, but it may also be used to generate less reactive and yet more selective chain ends.

The initiator may be used to generate highly reactive anionic species and/or to capture/activate carbon dioxide. In many embodiments, the initiator may be prepared from and/or include a phosphazene base (e.g., as organic cation) and one or more of an alkyllithium, lithium alkoxide, and lithium salt (e.g., as source of alkali metal). The phosphazene base and lithium c: lion may be mixed to form the cation $P_4-Li^+$ which in turn may enhance the reactivity of the associated anion responsible for the copolymerization of epoxides and $CO_2$. The organolithium compounds are unique among organic compounds with alkali metals because the C—Li bond exhibits properties of both covalent and ionic bonds. In some embodiments, this is observed because lithium, as compared to other alkali metals, has the smallest radius, the highest electronegativity, and the highest ionization potential.

The initiator may generally be characterized by the following formula: $X^-$, $Cat^+$, where X is $R-O^-$, $R-C^-$, $Cl^-$, $F^-$, $Br^-$, $CO_2^-$ or $CO_3^-$; and $Cat^+$ may be $Li^+$, $Na^+$, $K^+$, $Cs^+$, or an organic cation such as ammonium or phosphonium cation, or a cation resulting from the mixing of a phosphazene base ($P_y$) with cation such as $Li^+$ which generates $P_y-Li^+$ where Y may be 1, 2, or 4.

In some embodiments, the initiator may be prepared from and/or include an alkyllithium and the phosphazene base. The alkyllithium may include one or more of n-BuLi and sec-BuLi. In these embodiments, the alkyllithium-based initiator may be characterized by the formula: $R-C^-\{^+Li/t\text{-}Bu\text{-}P_Y\}$, $R-C^-$ may be any alkyl or any "living" polymer obtained by anionic polymerization of vinyl monomers and carrying an end-standing carbanion: for example polystyrenyl lithium, polyisoprenyl lithium, etc.

In other embodiments, the initiator may be prepared from and/or include a lithium alkoxide and the phosphazene superbase. In these embodiments, the lithium alkoxide-based initiator may be characterized by the formula: $R-O^-\{^+Li/t\text{-}Bu\text{-}P_Y\}$, where $R-O^-$ is an anion of any lithium alkoxide. $RO^-$ may be any small molecular organo-alcoholate or any macromolecule terminated with an alcoholate, such as one or more of PSt-O⁻ (PS=polystyrene), PI—O⁻ (PI=polyisoprene), PEO—O⁻ (PEO=polyethylene oxide), and PPO⁻ (PPO=polypropylene oxide).

Other embodiments may include an initiator that may be prepared from and/or include a lithium salt (e.g., LiCl, LiBr, LiF, and Li$_2$CO$_3$) and the phosphazene base. In these embodiments, the lithium salt-based initiator may be characterized by the formula: X⁻{⁺Li/t-Bu-P$_y$}, where X is one or more of Cl, Br, F, and CO$_3$.

Non-limiting examples of suitable and/or preferred alkyllithiums, lithium alkoxides, lithium salts, and phosphazene bases are provided below:

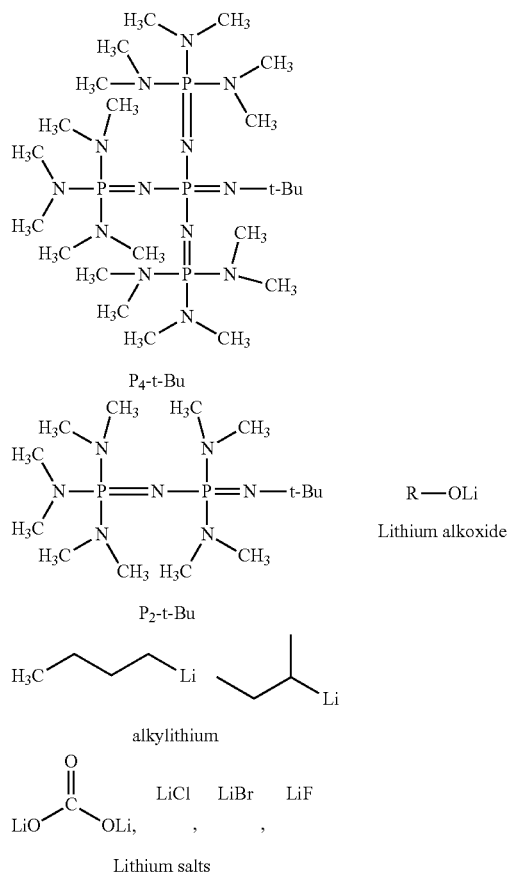

Non-limiting examples of initiators may include one or more of n-Bu⁻{⁺Li/t-Bu-P$_4$}, n-Bu⁻{⁺Li/t-Bu-P$_2$}, sec-Bu⁻{⁺Li/t-Bu-P$_4$}, and Cl⁻{⁺Li/t-Bu-P$_4$}.

Some embodiments of the present disclosure describe an initiating system comprising an activator including an alkyl borane and an initiator including an organic cation and an alcohol compound. The alkyl borane may include a trialkyl borane. For example, the trialkyl borane may include triethyl borane. The organic cation may include a phosphazene base, such as t-Bu-P$_y$, where Y is 1, 2, or 4; and the alcohol compound may include any compound, including those of macromolecular size, containing more than one hydroxyl group. The alcohol compound may include a diol and/or triol. For example, the alcohol compound may include 1,4-benzenedimethanol. In other embodiments, any compound containing an active protic hydrogen may be used, including, but not limited to, one or more of alcohols, thiols, phenols, carboxylic acids, etc.

Methods of Making Polycarbonates

Embodiments of the present disclosure also describe methods of making polycarbonates using the initiating systems described herein. In particular, FIG. 1 is a flowchart of a method of making polycarbonates, according to one or more embodiments of the present disclosure. The method 100 may comprise contacting 106 one or more cyclic monomers 102 and carbon dioxide 104 in the presence of an activator and an initiator 108 to form a polycarbonate 110. The activator may include one or more of an alkyl borane and alkyl aluminum. The initiator may include at least an organic cation and either an alkali metal or an alcohol compound. Any of the activators, initiators, and/or initiating systems of the present disclosure may be used to form polycarbonates according to any of the methods of the present disclosure. For example, in some embodiments, any compound containing an active protic hydrogen (e.g., thiols, phenols, carboxylic acids, etc.) are used in place of an alcohol compound.

The polycarbonates may be produced under metal-free conditions or via metal-based synthetic routes. Metal-based synthetic routes may include activators including an alkali metal. Such metal-based activators (e.g., activators based on) may be desirable because they exhibit high selectivity and high selectivity toward the alternating insertion of carbon dioxide and epoxides. On the other hand, metal-based synthetic routes may be toxic and produce colored products. In addition, metal-based synthetic routes require multi-step processes, as well as a step for post-polymerization metal removal. Accordingly, metal-free conditions may be a desirable alternative to metal-based synthetic routes. Accordingly, the copolymerization of epoxide monomer and carbon dioxide may proceed under metal-free conditions. In particular, the copolymerization may proceed under metal-free conditions in any embodiment including boron as an activator and an organic cation as an initiator.

The one or more cyclic monomers may include any cyclic ether and/or cyclic ester. The cyclic ethers may include any epoxide. For example, in many embodiments, the one or more cyclic monomers may include one or more of ethylene oxide, propylene oxide, 1-butene oxide, 1-hexene oxide, 1-octene oxide, styrene oxide, cyclohexene oxide, allyl glycidyl ether, and butyl glycidyl ether. In other embodiments, the one or more cyclic monomers include cyclic esters. For example, the cyclic esters may include lactides and/or caprolactones.

Contacting the one or more cyclic monomers (e.g., epoxide(s)) and carbon dioxide in the presence of at least the activator and initiator forms the polycarbonate. The contacting generally refers to bringing two or more components into proximity, such as physical and/or chemical proximity. In many embodiments, contacting may include adding and/or mixing two or more components in a reaction vessel and/or charging a chamber including the reaction vessel with a gaseous component sufficient to bring at least two of the components into physical and/or chemical proximity. The contacting may occur at temperatures ranging from about room temperature to about 120° C. and at pressures ranging from about atmospheric pressure to about 30 bar. In many embodiments, the temperature ranges from about −30° C. to about 80° C. and the pressure is about 20 bar.

The resulting polycarbonate may include any polymer containing a carbonate group. In many embodiments, the polycarbonate is an alternating copolymer formed from the anionic copolymerization of an epoxide monomer and carbon dioxide. The polycarbonates produced according to the methods of the present disclosure may be perfectly alternating polycarbonates and/or nearly perfectly alternating polycarbonates. The polycarbonate may, for example, be an alternating copolymer of one or more of poly(cyclohexene carbonate), poly(propylene carbonate), poly(ethylene carbonate), poly(styrene carbonate), and poly(butylene carbonate).

As one example, a general synthetic route for the copolymerization of epoxide monomer and carbon dioxide using initiating systems of the present disclosure is provided in Scheme 1:

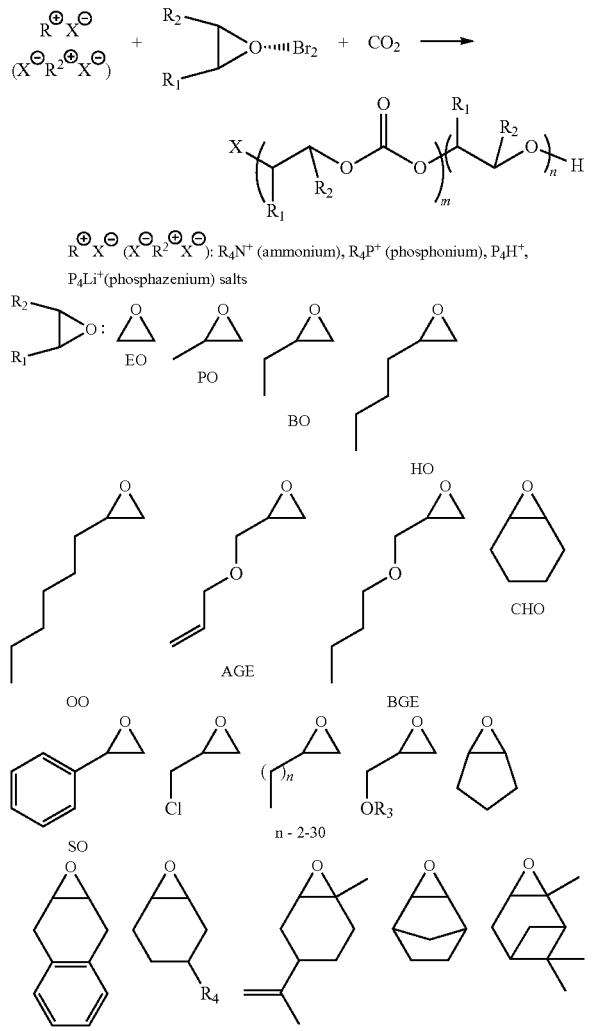

where X is any halide, pseudohalide, alkoxide, phenoxide, carboxylate, carbonate, hydrogen carbonate, etc.; where each of R, $R_1$, $R_2$, $R_3$, $R_4$ is independently one or more of any alkyl group including saturated and unsaturated, aromatic, cyclic alkyl group, heteroatom (e.g., halide, $N_3$, O, S, etc) containing alkyl groups.

Figure 2:
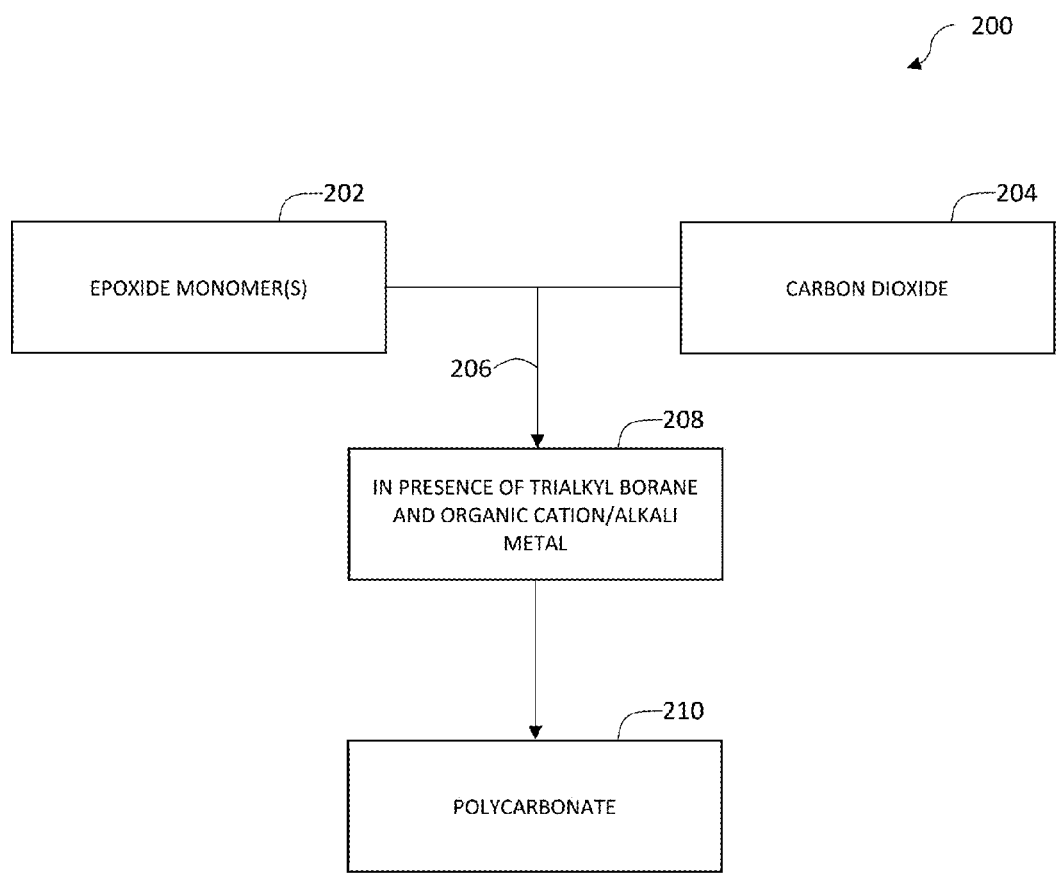
FIG. 2 is a flowchart of a metal-based method of making polycarbonates, according to one or more embodiments of the present disclosure.

Some embodiments of the present disclosure describe methods of making polycarbonates using specific initiating systems. In particular, FIG. 2 is a flowchart of a metal-based method 200 of making a polycarbonate, according to one or more embodiments of the present disclosure. The method 200 comprises contacting 206 an epoxide monomer 202 and carbon dioxide 204 in the presence of an activator including a trialkyl borane and an initiator including an organic cation and an alkali metal 208 form a polycarbonate 210. The epoxide monomer may include one or more of propylene oxide, cyclohexene oxide, ethylene oxide, styrene oxide, butyl glycidyl ether, and allyl glycidyl ether. The activator may include one or more of triethyl borane, trimethyl borane, triisobutylborane, and triphenylborane. In many embodiments, the activator is triethyl borane.

The initiator may include an organic cation or an alkali metal. While any of the organic cations and/or alkali metals described herein may be used, in some embodiments, the initiating system may be characterized by the following formula:

$$R\text{—}O^-Cat^+$$

where $R\text{—}O^-$ is an alkoxide anion and $Cat^+$ may be $Li^+$, $Na^+$, $K^+$, $Cs^+$, or an organic cation such as ammonium or phosphonium cation, or a cation resulting from the mixing of a phosphazene base ($P_y$) with cation such as $Li^+$ which generates $P_y\text{—}Li^+$ where Y may be 1, 2, or 4. RO may include any compounds carrying terminal hydroxyls as described previously. In some embodiments, the initiating system and/or complex initiator may be characterized and/or referred to as a lithium alkoxide (R—OLi)/phosphazene base initiating system. As one example, the synthetic route for the anionic alternating copolymerization of epoxide monomer and carbon dioxide using the lithium alkoxide/phosphazene base initiating system to form a perfectly (or nearly perfectly) alternating polycarbonate is provided in Scheme 2:

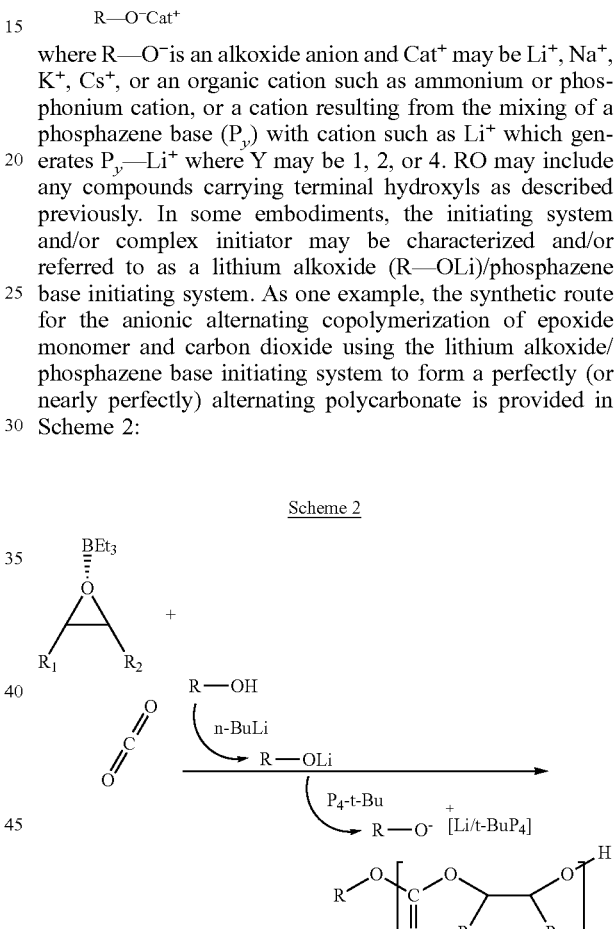

As shown in Scheme 2, an alkyllithium (e.g., n-BuLi) reacts with R—OH to form lithium alkoxides $R\text{—}O^-Li^+$ strong base, when a hydrogen atom is removed from a hydroxyl group of an alcohol and reacts with a metal, and t-Bu-$P_4$ complexes with the lithium alkoxide $R\text{—}O^-Li^+$ to form a complex initiator, $RO^-\{^+Li/t\text{-}Bu\text{-}P_4\}$, a highly reactive species, in the presence of TEB.

In other embodiments, the initiating system may be characterized by the following formula:

$$R\text{—}C^-\{^+Li/t\text{-}Bu\text{-}P_Y\}$$

where $R\text{—}C^-$ is one or more of n-Bu and sec-Bu and Y is 1, 2, or 4. In these embodiments, the initiating system and/or complex initiator may be characterized and/or referred to as an alkyllithium/phosphazene superbase initiating system. As one example, the synthetic route for the anionic alternating copolymerization of epoxide monomer and carbon dioxide using this initiating system to form a perfectly (or nearly perfectly) alternating polycarbonate is provided in Scheme 3:

Scheme 3

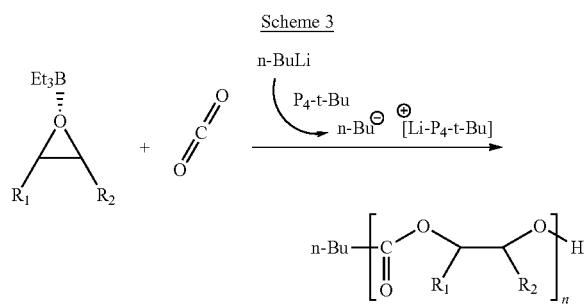

As shown in Scheme 3, alkylithium reacts directly with t-Bu-P$_4$ to form n-Bu$^-${$^+$Li/t-Bu-P$_4$}, a highly effective initiating system for anionic alternating copolymerization of CO$_2$ with epoxide monomers in the presence of TEB.

In other embodiments, the initiating system may be characterized by the following formula:

X$^-${$^+$Li/t-Bu-P$_Y$} where X is one or more of Cl, Br, F, and CO$_3$ and Y is 1, 2, or 4. In these embodiments, the initiating system and/or complex initiator may be characterized and/or referred to as a lithium salt (LiX)/phosphazene superbase initiating system. As one example, the synthetic route for the anionic alternating coplymerization of epoxide monomer and carbon dioxide using this initiating system to form a perfectly (or nearly perfectly) alternating polycarbonate is provided in Scheme 4:

Scheme 4

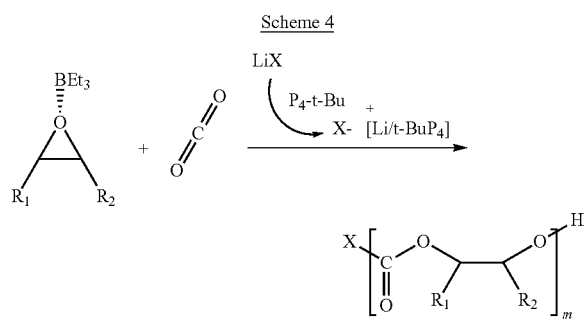

As shown in Scheme 4, lithium salts (e.g., LiCl, LiBr, LiF, and Li$_2$CO$_3$) react with t-Bu-P4 to form X$^-${$^+$Li/t-Bu-P$_4$}, another highly effective initiating system for anionic alternating copolymerization of CO$_2$ with epoxide monomers in the presence of TEB.

Any of the polycarbonates described herein may be formed according to the methods of the present disclosure. In many embodiments, the method may be used to form polycarbonates with high molar masses, narrow molecular weight distributions, and high carbonate linkage. Polycarbonates may be formed with higher molecular weights. For example, the molecular weight of the polycarbonates may range from about 25,000 g mol$^{-1}$ to about 250,000 g mol$^{-1}$. In some embodiments, the molecular weight of the polycarbonates may be about 40,000, about 75,000, or about 250,000 g mol$^1$. In addition, the polycarbonates are not only well-defined, but also exhibit narrow molecular weight distributions and unimodal distributions. For example, the molecular weight distribution may range from about 1.0 to about 1.5. In some embodiments, the molecular weight distribution may be about 1.1, about 1.2, or about 1.3. In addition, the carbonate linkage may range from about 75% to about 100%. For example, the carbonate linkage may be greater than about 77%, greater than about 95%, or about 100%.

In one embodiment, the anionic copolymerization of cyclohexene oxide (CHO) with CO$_2$ affords perfectly alternating poly(cyclohexene carbonate) (PCHC) with carbonate linkage (100%), and molar mass up to 250, 0000 g mol$^{-1}$ with narrow molecular weight distribution (M$_w$/M$_n$<1.3). In another embodiment, the anionic copolymerization of propylene oxide (PO) with CO$_2$ affords perfectly alternating poly(propylene carbonate) (PPC) with higher carbonate linkage (>95%), and molar mass up to 75, 0000 g mol$^{-1}$ with narrow molecular weight distribution (M$_w$/M$_n$<1.1). In another embodiment, the anionic copolymerization of ethylene oxide (EO) with CO$_2$ affords perfectly alternating poly(ethylene carbonate) (PEC) with carbonate linkage (>77%), and molar mass close to 40, 0000 g mol$^{-1}$ with narrow molecular weight distribution (M$_w$/M$_n$<1.2).

Figure 3:
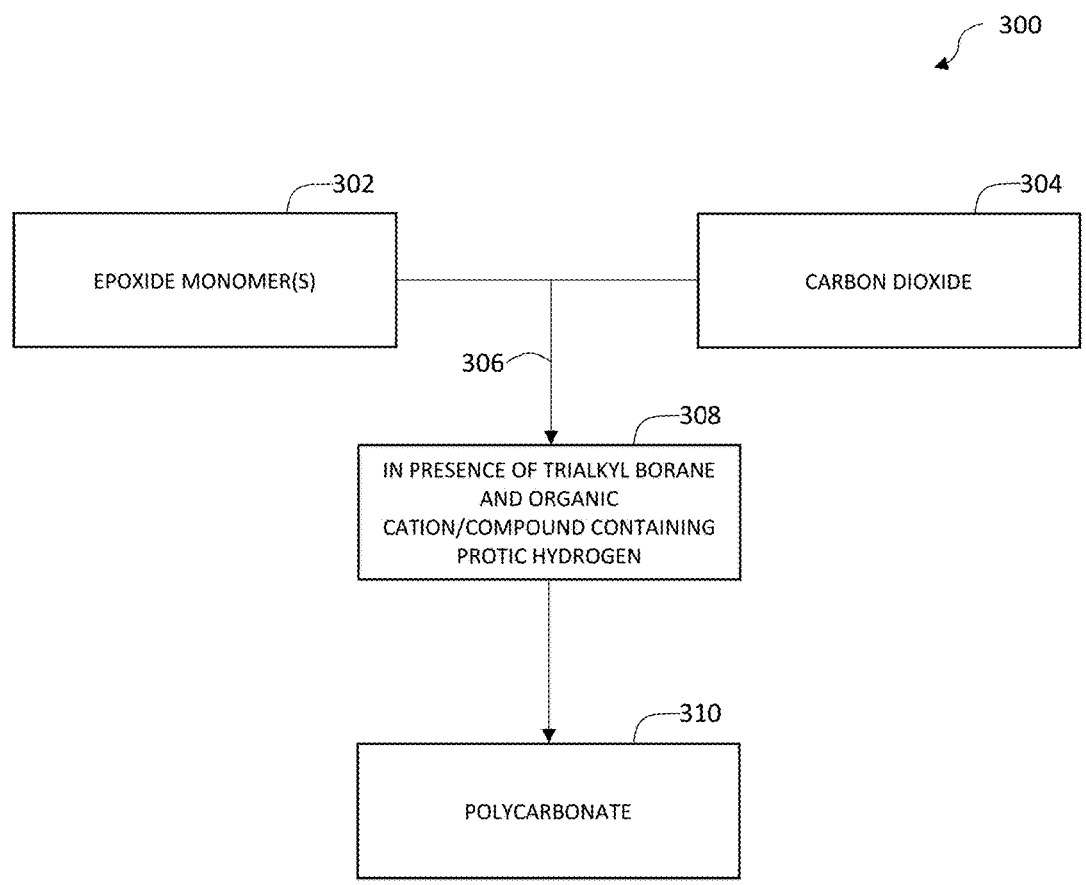
FIG. 3 is a flowchart of a metal-free method of making polycarbonates, according to one or more embodiments of the present disclosure.

FIG. 3 is a flowchart of a metal-free method 300 of making a polycarbonate, according to one or more embodiments of the present disclosure. The method 300 comprises contacting 306 an epoxide monomer 302 and carbon dioxide 304 in the presence of an activator including a trialkyl borane and an initiator including an organic cation and an alcohol compound 308 to form a polycarbonate 310. The method of these embodiments is generally metal free. The epoxide monomer may include one or more of ethylene oxide, propylene oxide, 1-butene oxide, 1-hexene oxide, 1-octene oxide, styrene oxide, cyclohexene oxide, allyl glycidyl ether, and butyl glycidyl ether. The activator may include one or more of triethyl borane, trimethyl borane, triisobutylborane, and triphenylborane. In many embodiments, the activator is triethyl borane.

The initiating system includes an organic cation and an alcohol. While any of the organic cations and/or alcohols described herein may be used, in many embodiments, the organic cation is phosphazene and the alcohol is any compound containing more than one hydroxyl group, such as any diol and/or triol. For example, the alcohol compound may be 1,4-dibenzenedimethanol. An example of a general synthetic route for the copolymerization of epoxide monomer and carbon dioxide using an alcohol compound/phosphazene initiating system is provided in Scheme 5:

Scheme 5

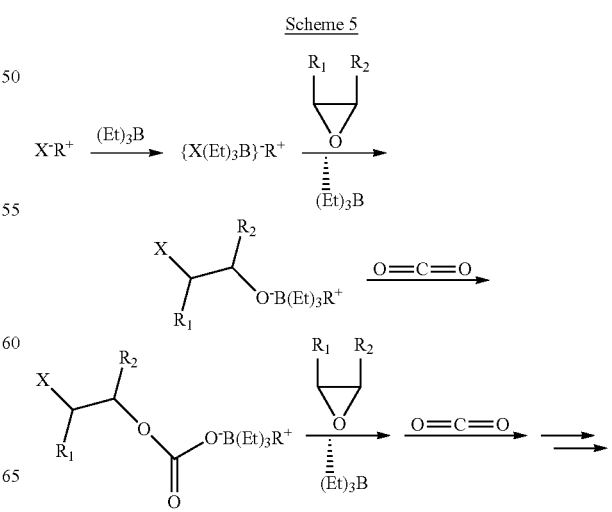

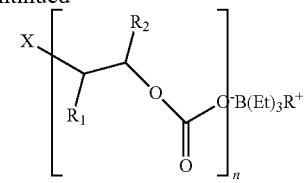

where X is any halide, pseudohalide, alkoxide, phenoxide, carboxylate, carbonate, hydrogen carbonate, etc.; where each of R, $R_1$, $R_2$, $R_3$, $R_4$ is independently one or more of any alkyl group including saturated and unsaturated, aromatic, cyclic alkyl group, heteroatom (e.g., halide, $N_3$, O, S, etc) containing alkyl groups. In other embodiments, any compound containing an active protic hydrogen may be used, including, but not limited to, one or more alcohols, thiols, phenols, carboxylic acids, etc.

Figure 4:
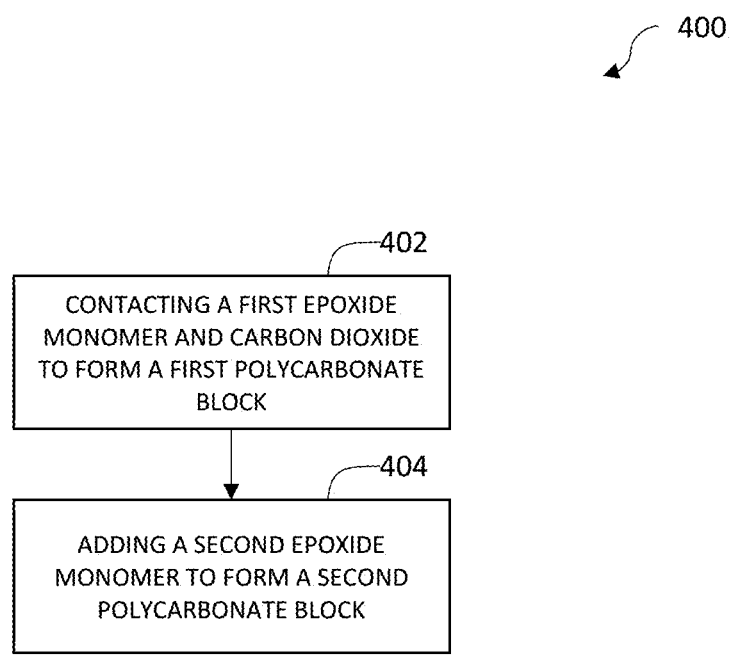
FIG. 4 is a flowchart of a method of making a block copolymer of polycarbonate, according to one or more embodiments of the present disclosure.

FIG. 4 is a flowchart of a method of making a block copolymer of polycarbonate comprising contacting 402 a first epoxide monomer and carbon dioxide in the presence of an activator including trialkyl borane and an initiator to form a first polycarbonate block, and adding 404 a second epoxide monomer to form a second polycarbonate block of a block copolymer. In many embodiments, the second polycarbonate block is different from the first polycarbonate block. The method 400 may be used to form, for example, AB or ABA block copolymers, wherein block A and block B are different.

Contacting and/or adding may refer to bringing two or more components into proximity, such as physical and/or chemical proximity. In many embodiments, contacting may include adding and/or mixing two or more components in a reaction vessel and/or charging a chamber including the reaction vessel with a gaseous component sufficient to bring at least two of the components into physical and/or chemical proximity. In many embodiments, the contacting and adding is generally in the presence of the same activator and initiator. In other embodiments, the contacting and adding may be in the presence of a different activator and/or a different initiator.

The first epoxide monomer may include one or more of ethylene oxide, propylene oxide, 1-butene oxide, 1-hexene oxide, 1-octene oxide, styrene oxide, cyclohexene oxide, allyl glycidyl ether, and butyl glycidyl ether.

Any of the activators and initiators described herein may be used. In many embodiments, the activator includes a trialkyl borane. For example, the trialkyl borane may include one or more of triethyl borane, trimethyl borane, triisobutylborane, and triphenylborane. In other embodiments, the activator may include an alkyl borane and/or alkyl aluminum. The initiator may include an organic cation and either an alkali metal or alcohol compound. The organic cation may include one or more of phosphazenium, ammonium, and phosphonium. The alkali metal may include one or more of lithium, potassium, and sodium. The alcohol compound may include any compound containing more than one hydroxyl group, such as a diol and/or triol. In other embodiments, any compound containing an active protic hydrogen may be used in place of the alcohol compound.

The second epoxide may include one or more of ethylene oxide, propylene oxide, 1-butene oxide, 1-hexene oxide, 1-octene oxide, styrene oxide, cyclohexene oxide, allyl glycidyl ether, and butyl glycidyl ether. In many embodiments, the second epoxide monomer is different from the first epoxide monomer. In other embodiments, the first and second epoxide monomers are the same.

Figure 5:
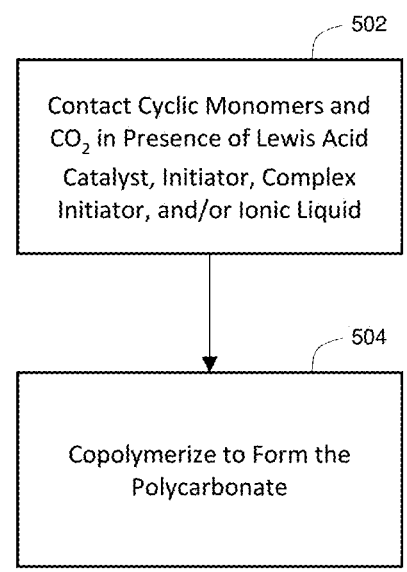
FIG. 5 illustrates a block flow diagram of a method of making a polycarbonate, according to one or more embodiments of this disclosure.

FIG. 5 is a block flow diagram of a method of making a polycarbonate, according to one or more embodiments of this disclosure. One or more cyclic monomers and carbon dioxide are contacted 502 in the presence of one or more of a Lewis acid activator, an initiator and/or complex initiator, and an ionic liquid. The one or more cyclic monomers and carbon dioxide are copolymerized 504 to form a polycarbonate. The structure and terminal functionality of the polycarbonate can be adjusted by the initiator, including multifunctional and macromolecular type. Bifunctional, heterofunctional block copolymers can be created according to an embodiment of this disclosure. In addition, polycarbonates can be formed via anionic alternating copolymerization of cyclic monomer (e.g., epoxide monomer) and carbon dioxide to form perfectly or nearly perfectly alternating polycarbonates.

The one or more cyclic monomers can include any epoxide monomer. The epoxide monomer may generally be characterized by the following chemical structure:

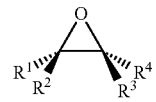

where each of $R_1$, $R_2$, $R_3$, and $R_4$ is independently one or more of alkyl group or containing functional groups such as one or more of halide, vinyl, azide, thiol, ether, ester, ketone, aldehyde, and acid. In many embodiments, the epoxide monomer may include one or more of propylene oxide, cyclohexene oxide, ethylene oxide, styrene oxide, and n-butyl glycidyl ether. In other embodiments, the one or more cyclic monomers can include one or more of epoxides, lactides, caprolactones, propylene oxides (PO), and cyclohexene oxides (CHO). In further other embodiments, the one or more cyclic monomers can include one or more of epoxides, lactides, caprolactones, propylene oxides, cyclohexene oxides, ethylene oxides, styrene oxides, and glycidyl ethers. For example, the glycidyl ethers may include n-butyl glycidyl ethers.

The Lewis Acid activator (or activator) can include one or more of triisobutyl aluminum, triethyl borane, trialkyl aluminum, trimethyl borane, triisobutylborane, triphenylborane, trialkyl borane, dialkyl zinc, dialkyl magnesium, diethyl zinc, diethyl magnesium, and the ester forms thereof.

The initiator (anionic nucleophile) can include mono- and/or poly-alcoholic, phenolic, and acidic salts with cations produced through deprotonation by different bases, salts, and other lithium salts additives. The cations can include one or more of lithium, sodium, potassium, cesium, ammonium, imidazolium, and phosphonium. The bases can include, but are not limited to, one or more of imidazolium alkoxide, lithium alkoxide, lithium phenolate, and alkyllithium (including macromolecular alkoxide). The salts can include, but are not limited to, one or more of imidazolium halide, lithium, sodium, potassium, halides, ammonium, tetraalkylammonium, tetraalkylphosphonium in halide, hydroxide, carbonate, and carboxylate. Other lithium salts additives can include, but are not limited to, one or more of lithium alkoxide, lithium carbonate, lithium phenolate, lithium halide, LiOH, $LiCO_3$, $LiClO_4$, $LiPF_6$, $LiBF_4$, and lithium bis(trifluoromethane)sulfonamide ($Tf_2N$). The initiator can include one or more of lithium salts, imidazolium salts, and alkoxide salts. The initiator can include one or more of lithium benzoxide, lithium chloride, lithium bromide, lithium triethylene glycoxide, lithium glycoxide, lithium polystyrene, n-heterocyclic carbene, imidazolium chloride, potassium tertbutyloxide, tetrabutylammonium chloride, and benzene alcohol and phosphazene P2. The initiator can include deprotonated alkoxide using one or more of carbene and butyl lithium.

The ionic liquid can include a salt in a liquid state. The ionic liquid can include one or more of 1-butyl-3-methyl-imidazolium hexaflurophosphate (BMIM-$PF_6$) and trioctyl-methylammonium bis(trifluoromethyl-sulfonyl)imide. The ionic liquid can include one or more of methylimidazolium and pyridinium ions. The ionic liquid can include one or more imidazolium-based ionic liquids with different counter ions, including, but not limited to, one or more of 3-Methyl-(4-9)-(fluoro)imidazolium Bis Rtrifluoromethyl)sulfonyl-limide, 1-hexyl-3-methylimidazolium tris(penta fluoro propyl)trifluoro phosphate, and 1-pentyl-3-methyl imidazolium tris(nona fluoro butyl)] trifluoro-phosphate. The ionic liquid can include one or more ammonium-based ionic liquids with different counter ions, including, but not limited to, choline bis(trifluoromethylsulfonyl)imide, tetrabutyl ammonium docusate, peg-5-cocomonium methylsulphate. The ionic liquid can include one or more super-based derived protonic ionic liquids, including, but not limited to, methyl-triaza bicycloundacane (MTBD) and trifluoroethanol [MTBDH+] [TFE-]. The ionic liquid can include one or more polyionic liquids, including, but not limited to, one or more of poly (1-[(2-methacryloyloxy)ethyl]-3-butylimidazoliums, poly (1-ethyl-3-vinyl-imidazolium) bis(trifluoromethylsulfonyl) imide, N,N-dimetyl-N,N-diallylammonium bis(trifluoromethylsulfonyl) imide, and poly(diallyldimethylammonium chloride) solution.

Methods of Controlling Polymer Composition

Figure 6:
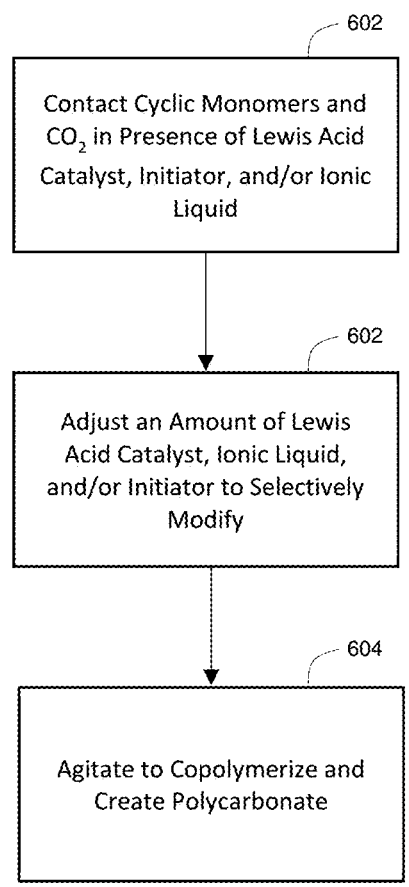
FIG. 6 illustrates a block flow diagram of a method of controlling a polymer composition, according to one or more embodiments of this disclosure.
Figure 7:
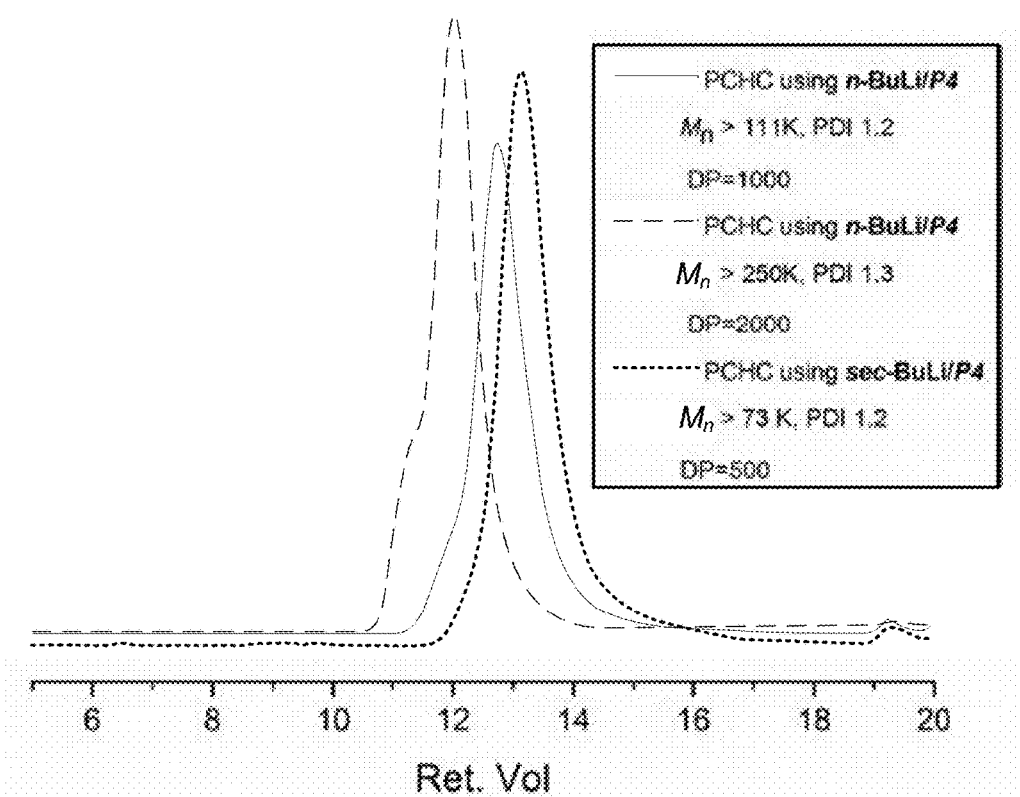
FIG. 7 shows Gel Permeation Chromatography (GPC) traces of poly(cyclohexene carbonate) (PCHC) prepared by alkyllithium/Phosphazene complexes (THF, polystyrene standards), according to one or more embodiments of the present disclosure.
Figure 8:
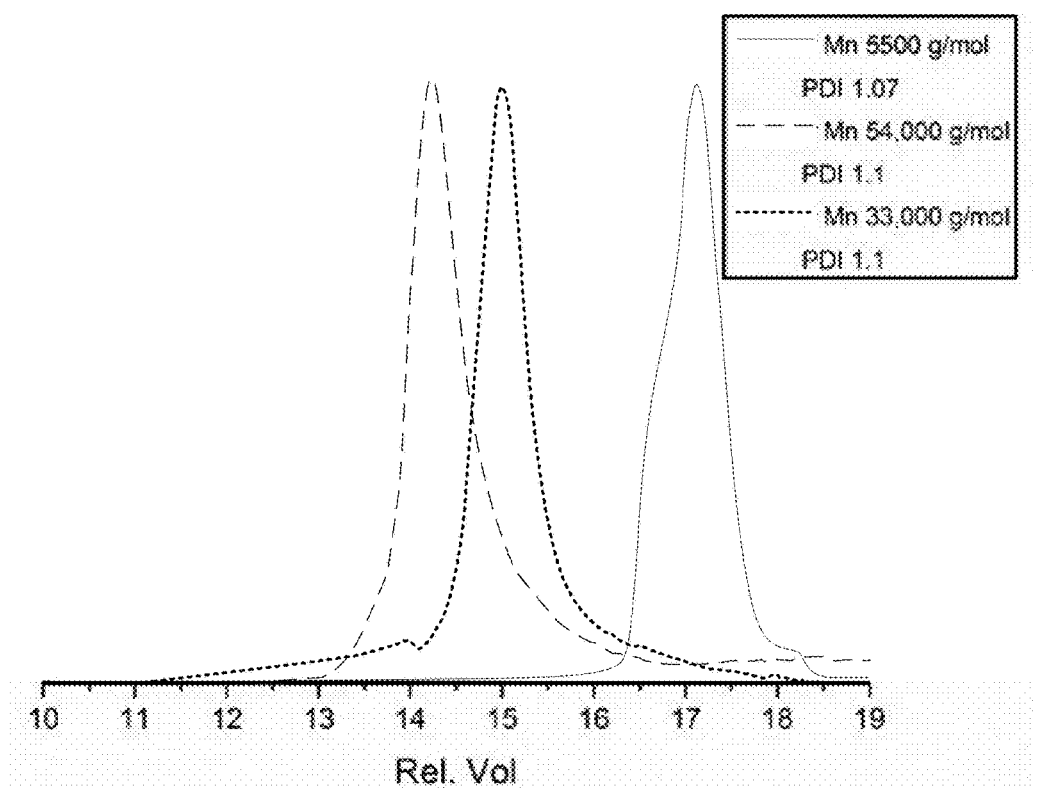
FIG. 8 shows GPC traces of poly(propylene carbonate) (PPCs) prepared by alkyllithium/Phosphazene complexes (THF, polystyrene standards), according to one or more embodiments of the present disclosure.
Figure 9:
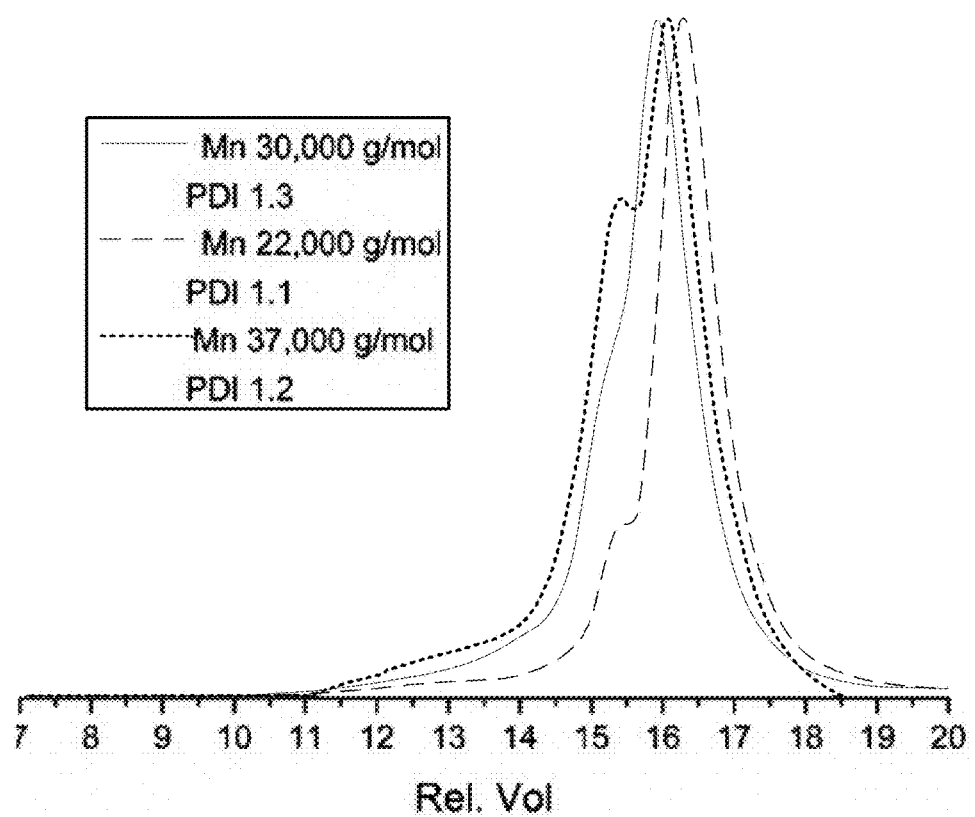
FIG. 9 shows GPC traces of poly(ethylene carbonate) (PECs) prepared by alkyllithium/Phosphazene complexes (GPC calibrated with polystyrene standards in chloroform), according to one or more embodiments of the present disclosure.
Figure 10:
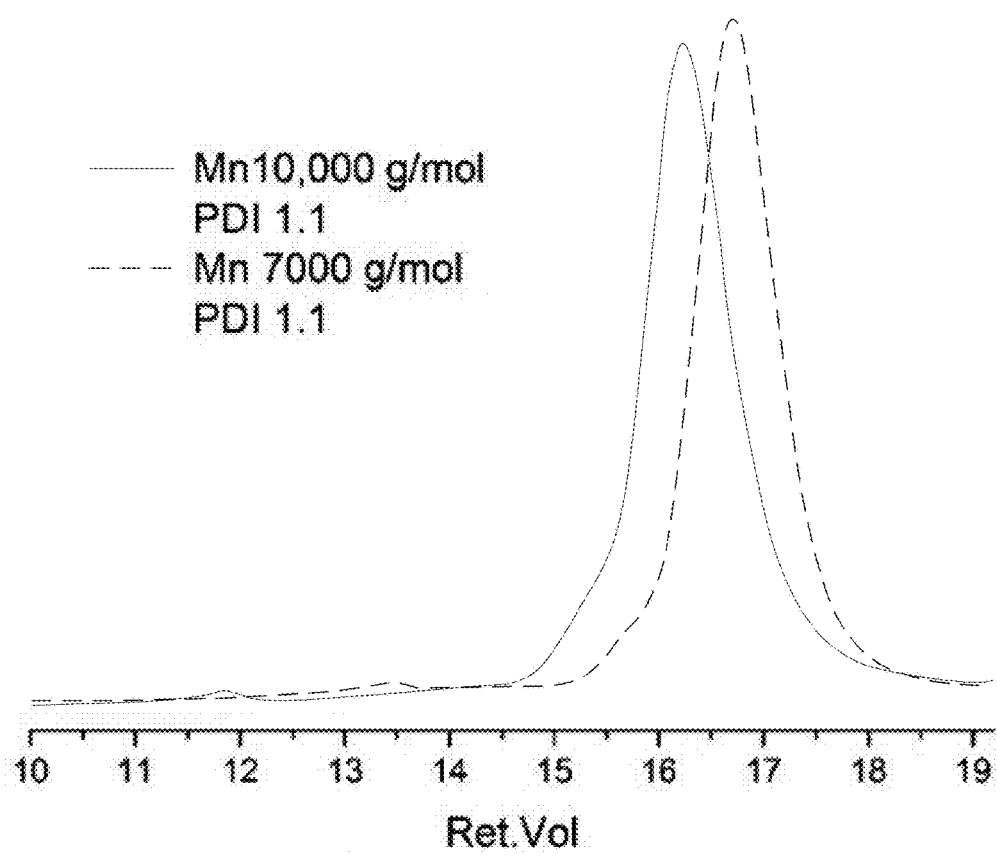
FIG. 10 shows GOC traces of Pt-BuCs prepared by alkyllithium/Phosphazene complexes (THF, polystyrene standards), according to one or more embodiments of the present disclosure.
Figure 11:
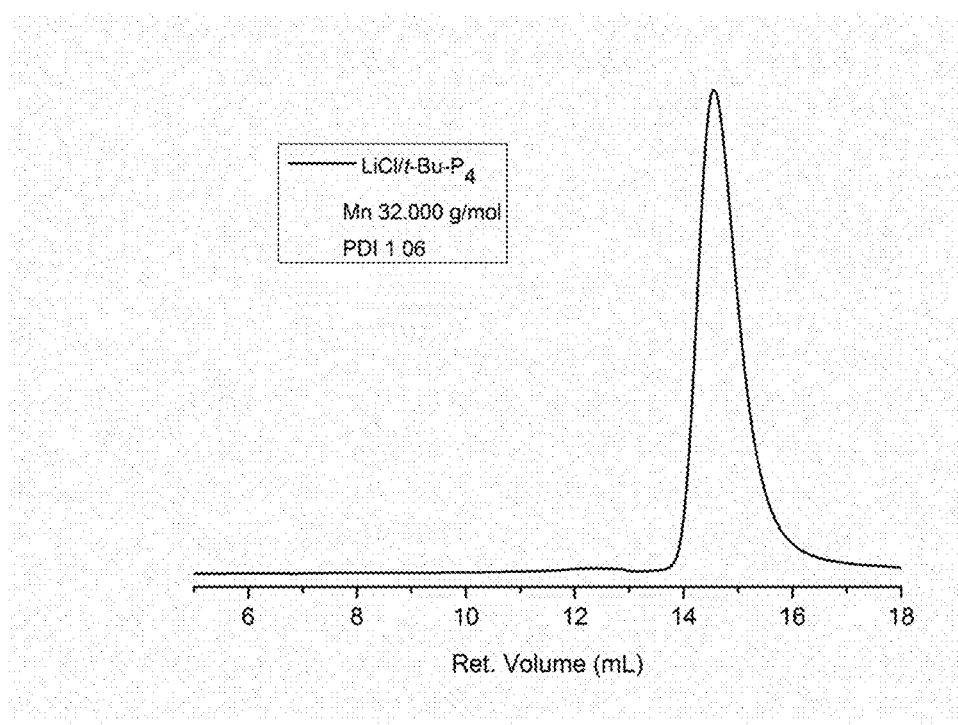
FIG. 11 shows GPC traces of PCHC prepared by LiCl/Phosphazene complexes (THF, polystyrene standards), according to one or more embodiments of the present disclosure.
Figure 12:
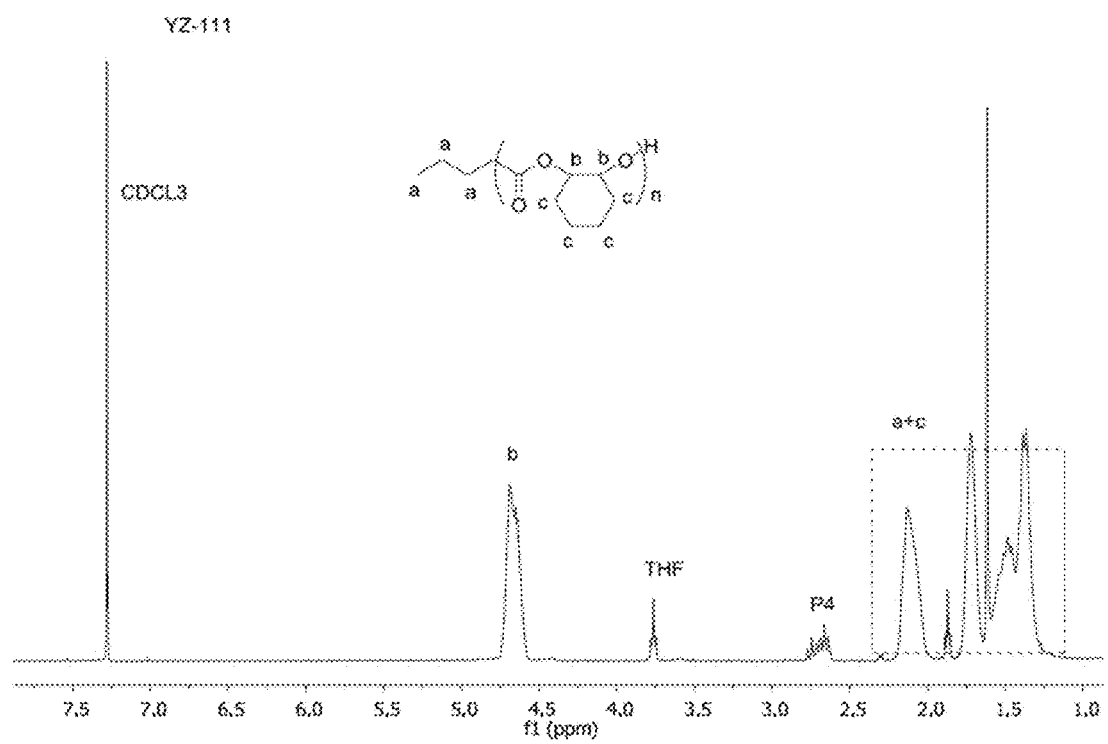
FIG. 12 shows $^1$H NMR characterization of poly(cyclohexene carbonate) prepared by alkyllithium/Phosphazene complexes (400 MHz, Chloroform-d), according to one or more embodiments of the present disclosure.
Figure 13:
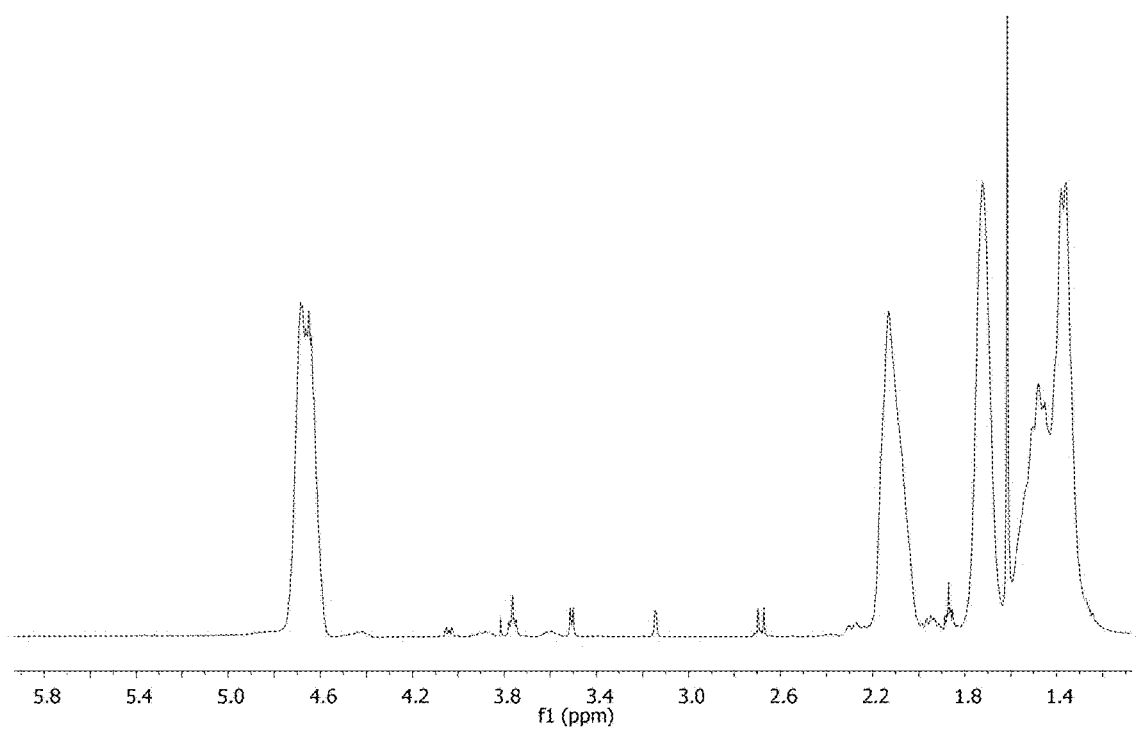
FIG. 13 shows $^1$H NMR characterization of poly(cyclohexene carbonate) prepared by LiCl/Phosphazene complexes (400 MHz, Chloroform-d), according to one or more embodiments of the present disclosure.
Figure 14:
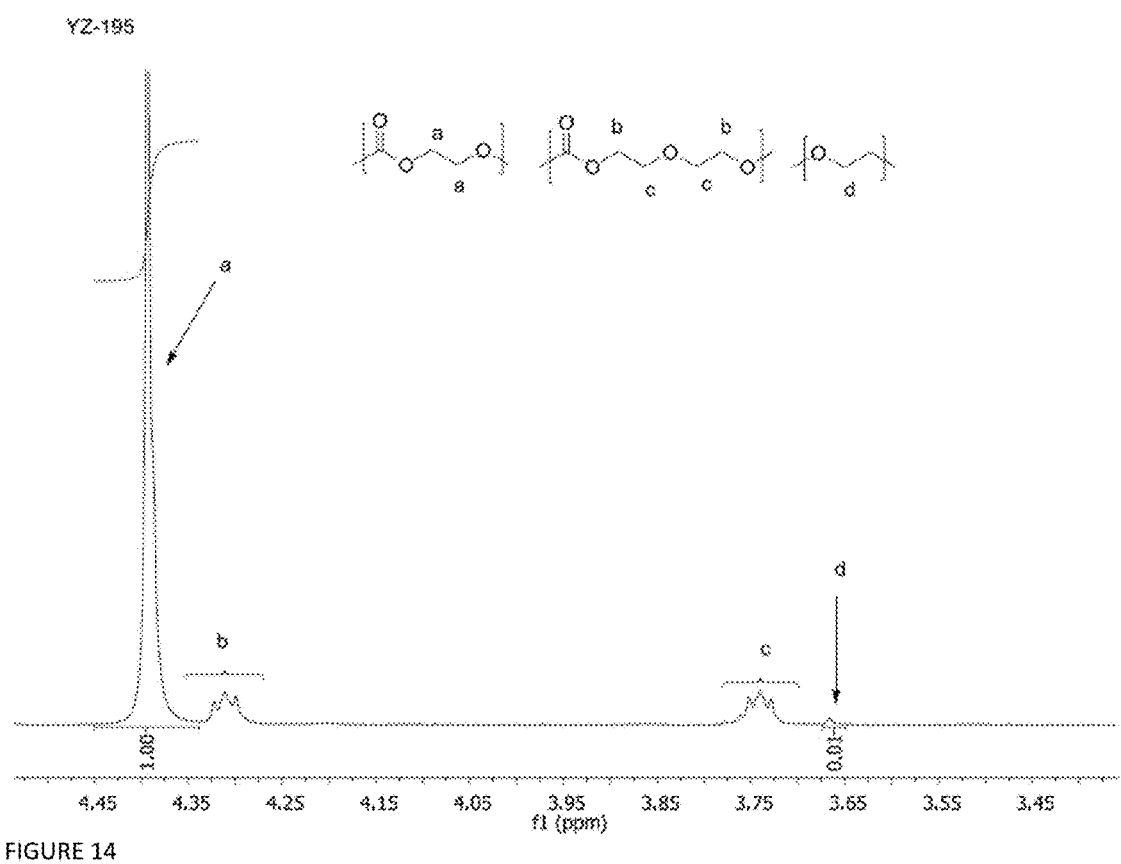
FIG. 14 shows $^1$H NMR characterization of poly(ethylene carbonate) prepared by alkyllithium/Phosphazene complexes (400 MHz, Chloroform-d), according to one or more embodiments of the present disclosure.
Figure 15:
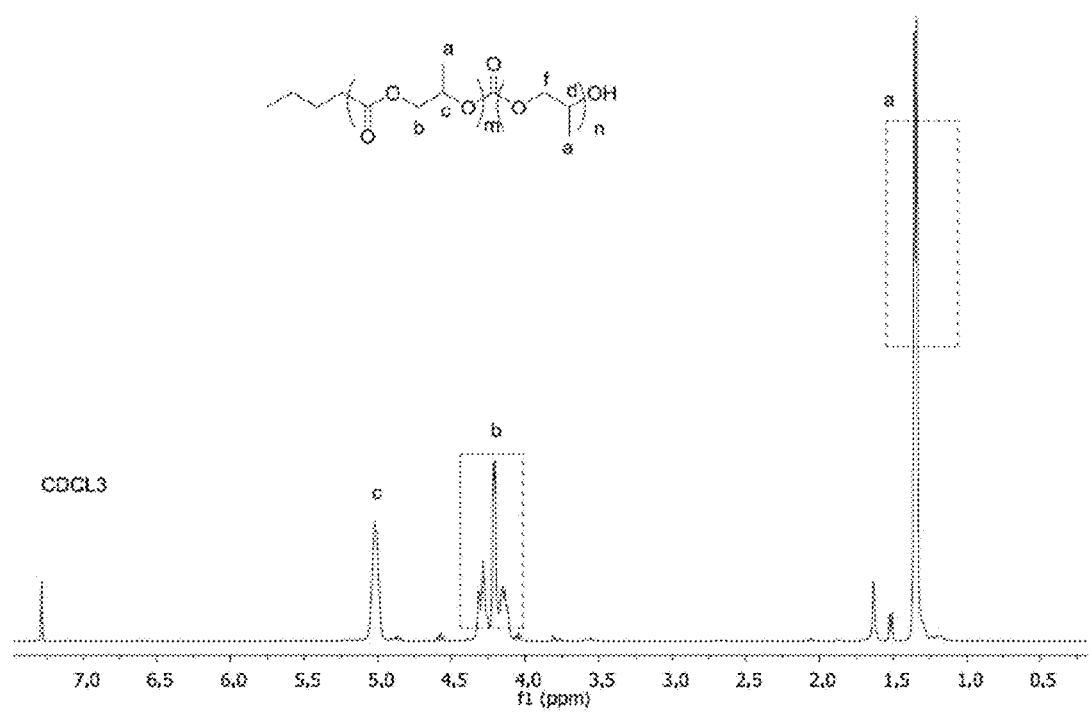
FIG. 15 shows $^1$H NMR characterization of poly(propylene carbonate) prepared by alkyllithium/Phosphazene complexes (400 MHz, Chloroform-d), according to one or more embodiments of the present disclosure.
Figure 16:
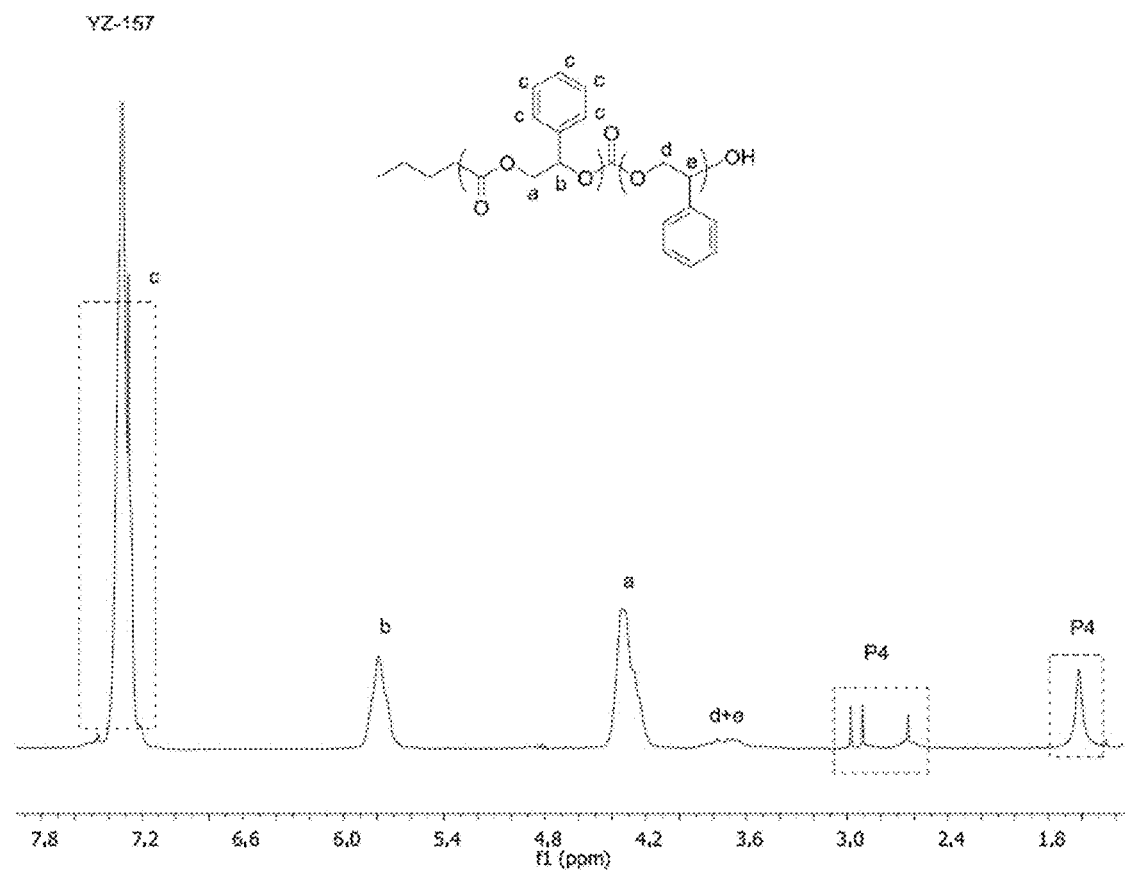
FIG. 16 shows $^1$H NMR characterization of poly(styrene carbonate) prepared by alkyllithium/Phosphazene complexes (400 MHz, Chloroform-d), according to one or more embodiments of the present disclosure.

Referring to FIG. 6, a block flow diagram of a method of controlling a polymer composition is shown, according to one or more embodiments of this disclosure. One or more cyclic monomers and carbon dioxide are contacted 602. An amount of one or more of a Lewis acid catalyst, an ionic liquid, and an initiator in the presence of the one or more cyclic monomers and carbon dioxide is adjusted 602, sufficiently to selectively modify a resulting polycarbonate. The one or more cyclic monomers and carbon dioxide are agitated 604 sufficiently to copolymerize and create the polycarbonate.

Adjusting 602 includes adding an excess, for example. Adjusting can also include modifying one or more of ratios of catalyst/ionic liquid, catalyst/initiator, activator/cyclic monomers, ionic liquid/cyclic monomer and initiator/cyclic monomer, polymerization pressure (1 atm to 50 atm), and temperature (ambient temperature to 120° C.). In one example, ratio of ionic liquid/cyclic monomer is increased to affect the solubility of carbon dioxide and the resulting carbonate percentage in the polycarbonate.

Selectively modifying includes one or more of modifying a ratio of blocks, modifying a gradient, introducing a terminal functional group, copolymerizing with other macromolecular initiates, affecting randomness of blocks, and altering a structure. Polycarbonates can be modified or tuned according to embodiments of the present invention to create two types of block copolymer structures, including a gradient and random copolymer with a carbonate composition from about 2% to about 100%, from about 5% to about 80%, and from about 10% to about 60%, for example. Selectively modifying includes increasing or decreasing a gradient in the copolymer, increasing or decreasing randomness in the blocks, and increasing the amount of carbonate in the resulting copolymer, for example. By choosing appropriate alcohol, phenol, acid, heterofuntional polycarbonates, polyol, and block polycarbonate copolymers with polystyrene, polybutadiene, polyisoprene, poly(ethylene oxide) could be prepared, for example.

In some embodiments, a process of copolymerization of $CO_2$ and epoxides catalyzed by trialkyl aluminum or triethyl borane is shown. The synthetic process catalyzed by tri-isobutyl aluminum as an example is shown in scheme 6, initiated by deprotonated alkoxide using carbene or butyl lithium, or directly by imidazolium salts and lithium salts:

Scheme 6

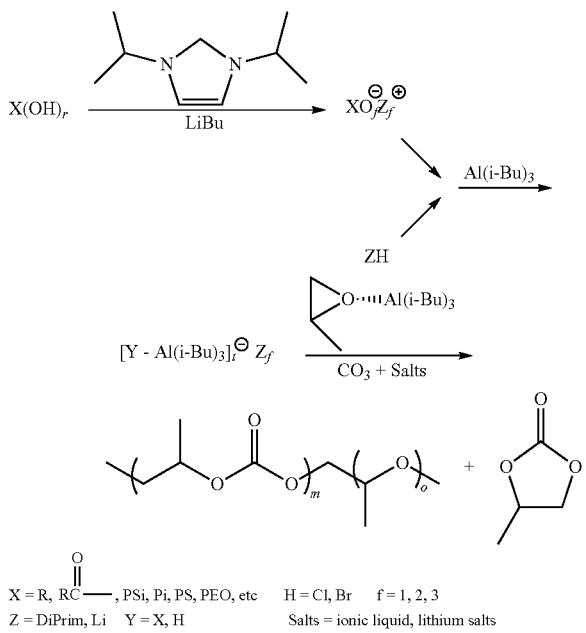

X = R, RC(=O)—, PSi, Pi, PS, PEO, etc     H = Cl, Br     f = 1, 2, 3
Z = DiPrim, Li     Y = X, H     Salts = ionic liquid, lithium salts In the examples, three additives are used to tune or modify the composition of carbonates. One is the activator Al(iBu)$_3$, and the others are ionic liquid, lithium salts and $CO_2$-philic solvents. Ionic liquid could be: 1) Imidazolium based ionic liquids with different counter ion, 3-Methyl-(4-9)-(fluoro) imidazolium Bis[(trifluoromethyl) sulfonyl]imide, 1-hexyl-3-methylimidazolium tris(penta fluoro propyl)trifluoro phosphate and 1-pentyl-3-methyl imidazolium tris(nona fluoro butyl)] trifluoro-phosphate etc.; 2) Ammonium based ionic liquids with different counter ions, choline bis(trifluoromethylsulfonyl)imide, tetrabutyl ammonium docusate, peg-5-cocomonium methylsulphate etc. (ref: J. Phys. Chem. B, Vol. 111, No. 30, 2007); 3) Super based derived protonic ionic liquids, Methyl-triaza bicycloundacane (MTBD) and trifluoroethanol [MTBDH+] [TFE-] etc. (ref: Angew. Chem. Int. Ed. 2010, 49, 5978-5981); B) Polyionic liquids: poly (1-[(2-methacryloyloxy)ethyl]-3-butylimidazoliums, poly (1-ethyl-3-vinyl-imidazolium) bis(trifluoromethylsulfonyl) imide, N,N-dimetyl-N,N-diallylammonium bis(trifluoromethylsulfonyl) imide and poly(diallyldimethylammonium chloride) solution etc. (Electrochimic a Acta, doi: 10.1016/j.electacta.2015.03.038)]. Lithium salts could be: lithium alkoxide, alkyllithium, lithium carbonate, lithium phenolate, lithium halide, LiOH, LiCO3, LiClO4, LiPF6, LiBF4, lithium bis(trifluoromethane)sulfonamide (Tf2N), etc. $CO_2$-philic solvents could be: THF, poly(ethylene glycol) dimethyl ether, polypropyleneglycol dimethylether, polydimethyl siloxane, etc (M. B. Miller, D. R. Luebke, R. M. Enick, Energy & Fuels 2010, 24, 6214-6219). Through different feeding ratios, different mean compositions and terminal functionality of polycarbonates and block copolymers initiated by other macromolecualar polyols (hydroxyl terminated polystyrene (PSt), polyisoprene (PI), polybutadiene (PI), poly(ethylene oxide) (PEO), for example) can be achieved. Not only the sequential polymerization of other cyclic monomers, such as lactide, caprolactone leading block copolymers, but also the copolymerization of the latter monomers with $CO_2$ can be contemplated.

EXAMPLE 1

A 300 mL Parr reactor equipped with stirrer was first dried in an oven at 120° C. overnight, then immediately placed into the side glove box chamber. After keeping it under vacuum for one hour, the reaction vessel was moved into the main glove box with argon atmosphere. The copolymerization of $CO_2$ with CHO described below is taken from entry 11 in Table 1 as an example. n-Butyllithium (n-BuLi, 21.6 µL, 0.034 mmol) was firstly added into the reactor, then, phosphazene base ($P_4$-t-Bu, 34.6 µL, 0.034 mmol) was added, followed by the addition of triethyl borane (70 µL, 0.069 mmol). Cyclohexene oxide (CHO, 7 mL, 69 mmol) was finally added. The reactor was sealed and taken out from the glove box and charged with $CO_2$ under a pressure of 30 bars. The copolymerization was carried out at 70° C. for 12 hr. At the end of the polymerization, the unreacted $CO_2$ was released, and the solid product was removed. A small fraction of the crude product was dissolved in $CHCl_3$, precipitated in methanol, filtered and dried, for characterization. The copolymerization of other epoxides with $CO_2$ was carried out in similar processes. The results are listed in Table 1.

Figure 17:
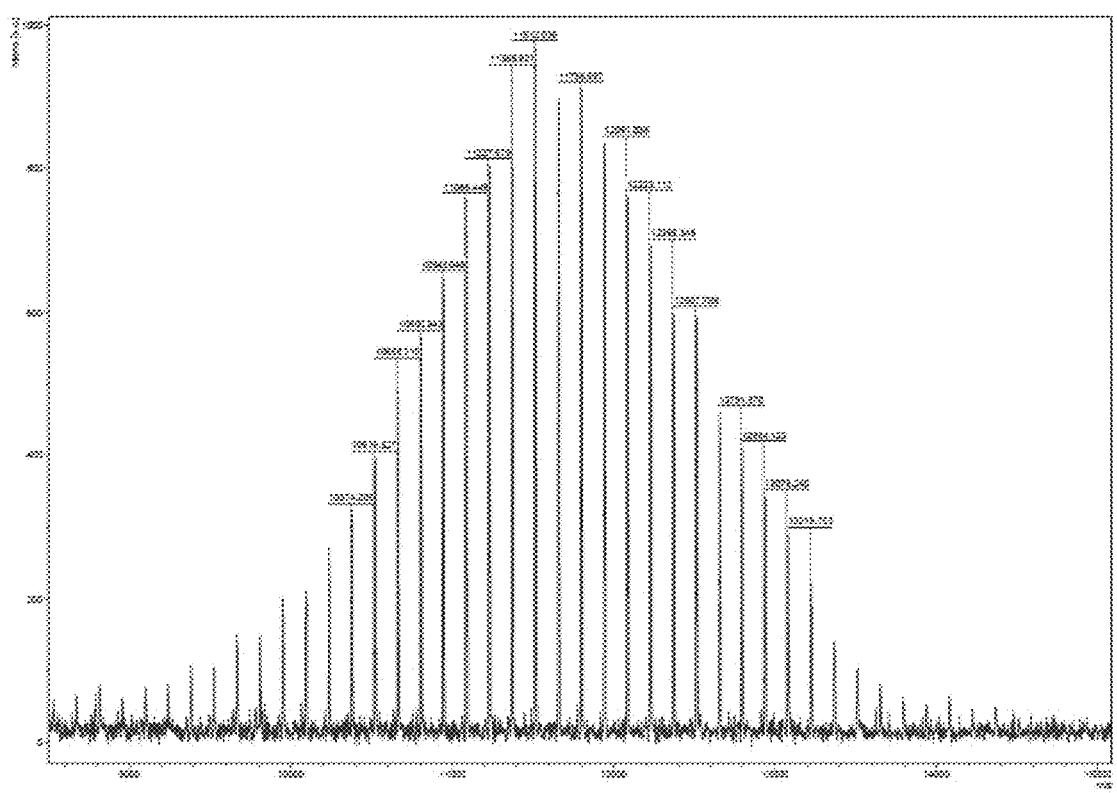
FIG. 17 shows MALD-TOF characterization of PCHC, the main population with peak to peak difference of 142 corresponding to the alternating structure, according to one or more embodiments of the present disclosure.
Figure 18:
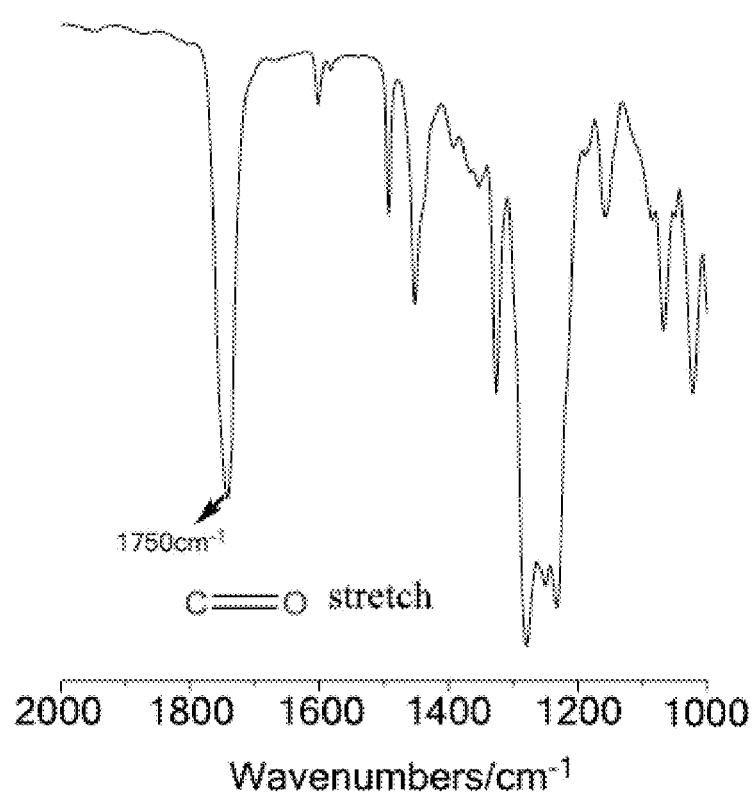
FIG. 18 shows infrared spectroscopy of poly(cyclohexene carbonate) with high selectivity (100% polymer) and no cyclic carbonates formed, according to one or more embodiments of the present disclosure.

The analysis by Gel Permeation Chromatography (GPC), MALDI-TOF mass spectroscopy, Infrared Spectroscopy (IR) and Nuclear Magnetic Resonance Spectroscopy (NMR) were used to provide useful information of the system in order to prove the polycarbonate structure. All samples, characterized by GPC, exhibited monomodal and narrow molecular weight distribution ($M_w/M_n$<1.3) and expected molecular weights (FIGS. 7-11). Moreover, these results confirm the livingness of the copolymerization initiated by the system described in this patent. The carbonate content/alternating structure, precisely determined by $^1$H NMR characterization, revealed the high carbonate content of the samples (FIGS. 12-16, Table 1). In addition, MALDI-TOF characterization clearly shows the formation of one main population of perfectly alternating (100%) poly (cyclohexene carbonates) (FIG. 17). IR spectroscopy supports these results showing a strong polycarbonate peak at 1750 $cm^{-1}$[11]. IR analysis also shows that selectivity of the copolymerization of CHO with $CO_2$ is 100% for linear polymer with practically absence of cyclic species (FIG. 18).

EXAMPLE 2

Figure 19:
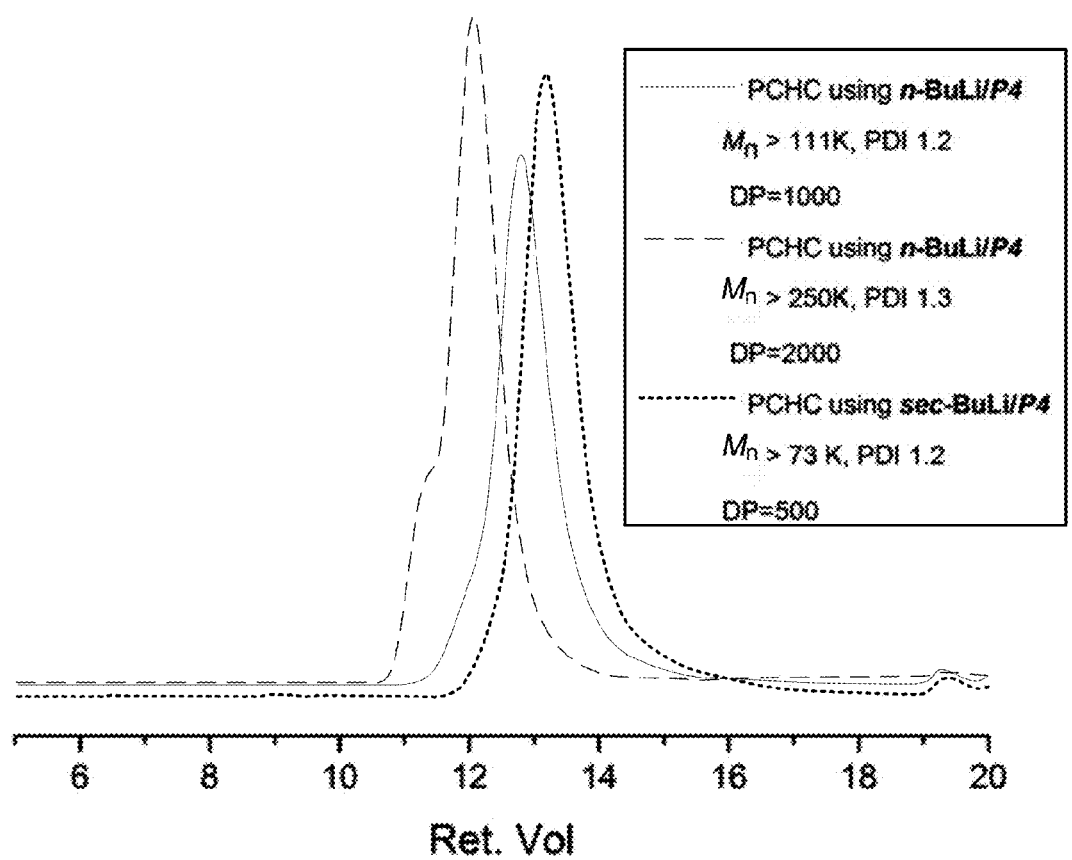
FIG. 19 is a graphical view of GPC traces of PCHCs (entry 9, 10, and 11 in Table 1) prepared by alkyllithium/phosphazene complexes, according to one or more embodiments of the present disclosure.
Figure 20:
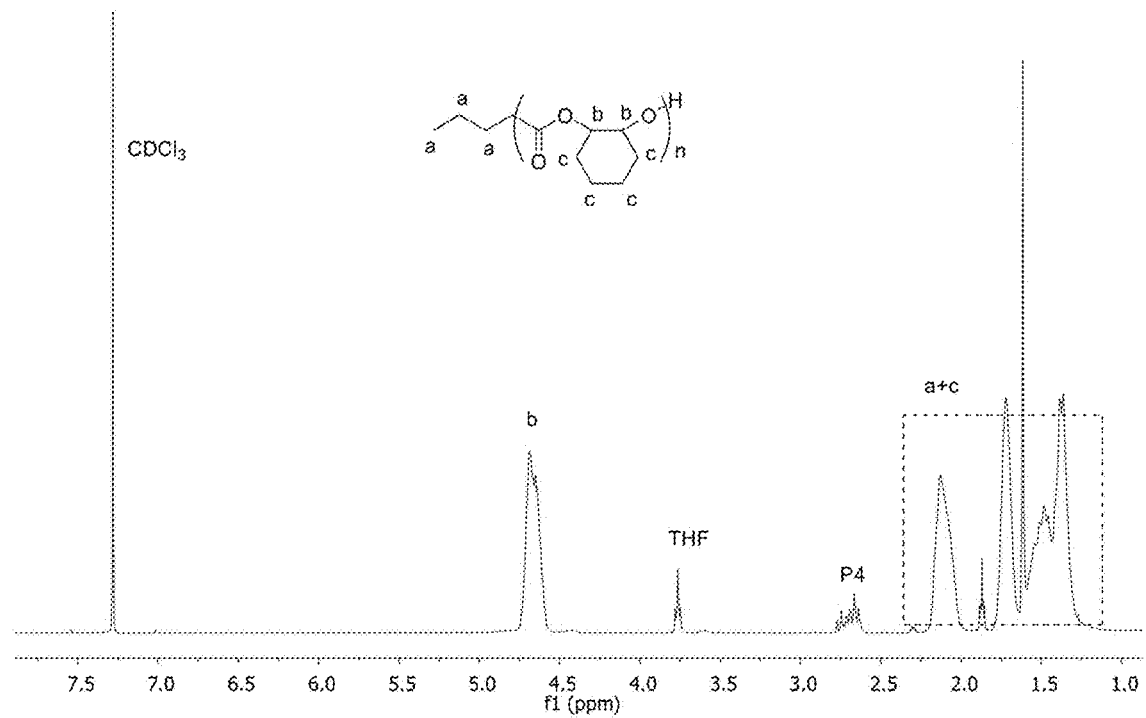
FIG. 20 is a graphical view of $^1$H NMR spectrum of poly(cyclohexene carbonate) prepared by alkyllithium/phosphazene complexes (entry 9 in table 1), according to one or more embodiments of the present disclosure.

Representative procedure of copolymerization of $CO_2$ and epoxide initiated with phosphazenium lithium salts: Take CHO from entry 11 in Table 1 as an example. A 300 mL Parr reactor equipped with mechanical stirrer was first dried in an oven at 120° C. overnight, then immediately placed into the glove box chamber. After keeping it under vacuum for one hour, the reaction vessel was moved into the glove box under argon atmosphere. n-Butyllithium (n-BuLi, 21.6 µL, 0.034 mmol) was firstly added into the reactor, then, phosphazene base (P4-t-Bu, 34.6 µL, 0.034 mmol) was added, followed by the addition of triethyl borane (70 µL, 0.069 mmol). Cyclohexene oxide (CHO, 7 mL, 69 mmol) was finally added. The reactor was sealed and taken out from the glove box and charged with $CO_2$ under a pressure of 10 bars. The copolymerization was carried out at 70° C. for 12 hr. At the end of the polymerization, the unreacted $CO_2$ was released, and the solid product was removed. A small fraction of the crude product was dissolved in CHCl3, precipitated in methanol, filtered and dried, for characterization. See FIGS. 19-20.

TABLE 1

Copolymerization results of selected different epoxides with $CO_2$ activated by TEB initiated with phosphazenium lithium salts:

| Entry | M[a] | Initiators[b] | [Initiator]/[TEB] | Temp. | DP targeted | Yields[c] (%) | PC[d] mol % | Selectivity %[d] | Mn(×10³)/PDI[e] |
|---|---|---|---|---|---|---|---|---|---|
| 1 | EO | n-BuLi/t-BuP$_4$ | 1/1 | r.t. | 200 | 79 | 70 | 97 | 12.0/12 |
| 2 | EO | n-BuLi/t-BuP$_4$ | 1/1 | r.t. | 500 | 80 | 77 | 97 | 37.0/1.2 |
| 3 | EO | n-BuLi/t-BuP$_4$ | 1/1 | r.t. | 600 | 52 | 74 | 98 | 29.0/1.3 |
| 4 | PO | n-BuLi/t-BuP$_4$ | 1/2 | 60 | 1000 | 80 | 96 | 95 | 75.0/1.1 |
| 5 | PO | n-BuLi/t-BuP$_2$ | 1/2 | 60 | 1000 | 80 | 95 | 81 | 47.0/1.2 |
| 6 | PO | PI-b-PStOLi (8.0K)/t-BuP$_4$ | 1/2 | 60 | 1000 | 60 | 99 | 95 | 65.0/1.1 |
| 7 | SO | n-BuLi/t-BuP$_4$ | 1/8 | 60 | 200 | 80 | 99 | 81 | 15.0/1.1 |
| 8 | CHO | n-BuLi/t-BuP$_4$ | 1/2 | 70 | 75 | 95 | 99 | 99 | 9.2/1.1 |
| 9 | CHO | n-BuLi/t-BuP$_4$ | 1/2 | 70 | 500 | 87 | 99 | 99 | 73.0/1.2 |
| 10 | CHO | n-BuLi/t-BuP$_4$ | 1/2 | 70 | 1000 | 90 | 99 | 99 | 120/1.3 |
| 11 | CHO | n-BuLi/t-BuP$_4$ | 1/2 | 70 | 2000 | 90 | 99 | 99 | 284/1.3 |
| 12 | CHO | PStOLi(4.0K)/t-BuP$_4$ | 1/2 | 70 | 200 | 73 | 99 | 99 | 24.0/1.1 |

TABLE 1-continued

Copolymerization results of selected different epoxides with $CO_2$ activated by TEB initiated with phosphazenium lithium salts:

| Entry | M[a] | Initiators[b] | [Initiator]/[TEB] | Temp. | DP targeted | Yields[c] (%) | PC[d] mol % | Selectivity %[d] | Mn(×10³)/PDI[e] |
|---|---|---|---|---|---|---|---|---|---|
| 13 | CHO | PStOLi(4.0K)/t-BuP$_4$ | 1/2 | 70 | 1000 | 87 | 99 | 99 | 100/1.1 |
| 14 | CHO | PI-b-PStOLi (8.0K)/t-BuP$_4$ | 1/2 | 70 | 1000 | 80 | 99 | 99 | 95.0/1.1 |
| 15 | BGE | n-BuLi/t-BuP$_2$ | 1/2 | 60 | 200 | 78 | 71 | 73 | 10.0/1.1 |

[a] EO: ethylene oxide; PO: propylene oxide; CHO: cyclohexene oxide; BGE: butyl glycidyl ether.
[b] t-BuP$_4$, t-BuP$_2$: phosphazene base; PSt: polystyrene; PI: polyisoprene.
[c] Calculated by gravity.
[d] PC: polycarbonate contents; calculated based on $^1$H NMR of reaction mixture.
[e] Determined by GPC using tetrahydrofuran as the fluent and polystyrene as standard.

EXAMPLE 3

Figure 21A:
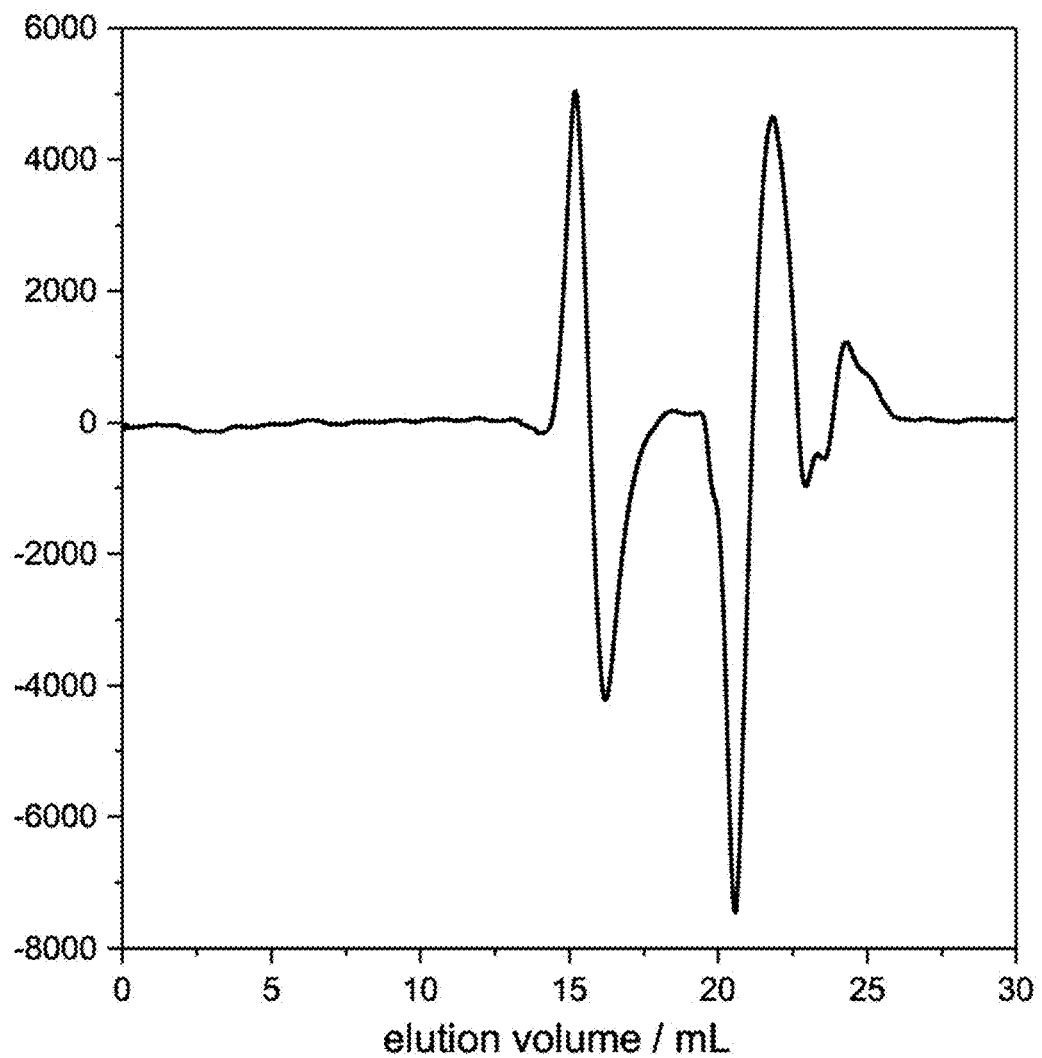
FIG. 21A is a graphical view of GPC trace entry 2 in table 2, according to one or more embodiments of the present disclosure.
Figure 21B:
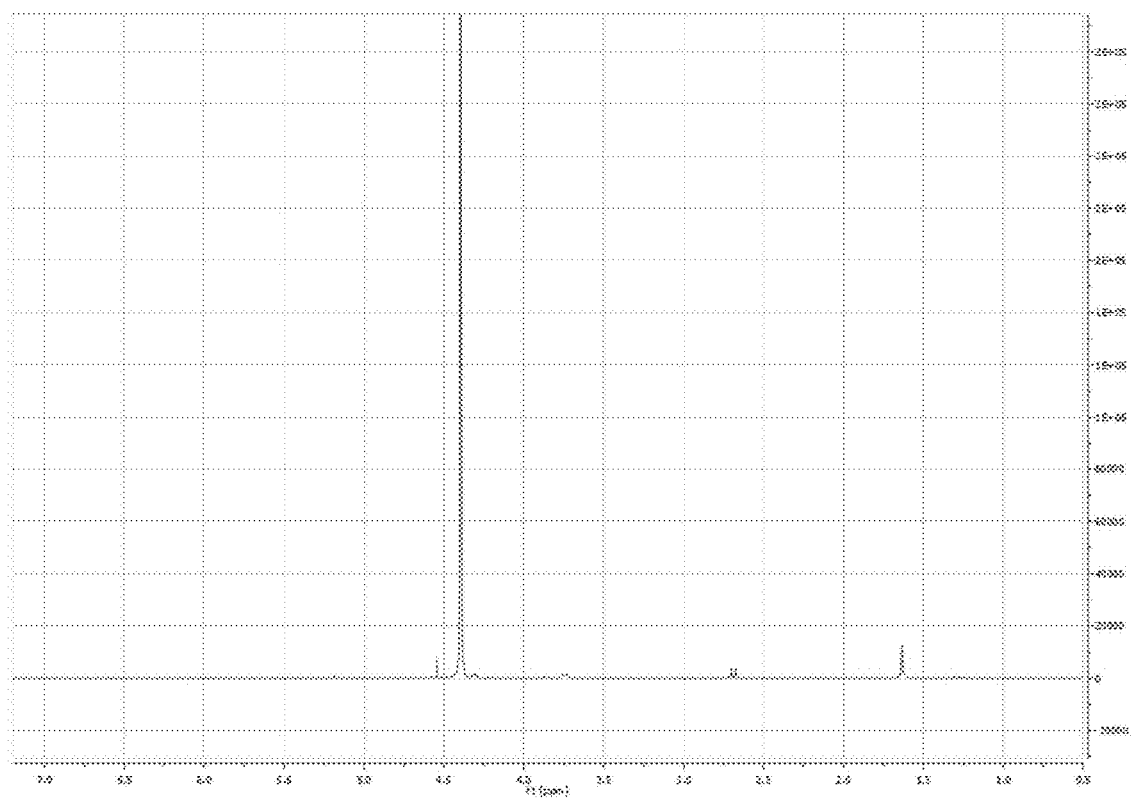
FIG. 21B is a graphical view of $^1$H NMR spectrum of poly(ethylene carbonate) (entry 2 in table 2), according to one or more embodiments of the present disclosure.

Representative procedure of copolymerization of $CO_2$ with ethylene oxide (EO): Take Entry 2 in Table 2 as an example. A 50 mL Parr reactor with magnetic stirrer and a small glass vial inside was first dried in an oven at 120° C. overnight, then immediately placed into the glove box chamber. After keeping under vacuum for 2-3 hours, the reaction vessel was moved into the glove box under argon atmosphere. 110 mg (0.08 mmol) of 1,4-benzyldimethanol (BDM) in 1.5 mL of THF was first added into the reactor, then equal equivalent of t-BuP4 solution (0.16 mmol) was slowly added accompanying with the generation of white precipitate. triethylborane in THF solution (0.16 mmol) was dropped into this suspension solution. The white precipitates dissolved gradually, and a transparent solution was formed. Ethylene oxide (EO, 2 mL, 40 mmol) was carefully added into the glass vial which was placed on the bottom of the reactor. The reactor was quickly sealed, taken out from the glove box and charged with $CO_2$ to a pressure of 10 bar. After the whole system was kept for 20 min, the vial was turned over through vigorous shaking of reactor to release the monomer E0 and mix with other reactants in the reactor. The copolymerization was carried out at room temperature for 10 hr., the unreacted $CO_2$ was slowly released, and the polymer solution was quenched with HCl in methanol (1 mol/L). The crude product was diluted with $CH_2Cl_2$ and then precipitated in cold methanol. The product was collected by centrifugation and dried in vacuum at room temperature until constant weight. See FIGS. 21A-21B.

TABLE 2

Copolymerization results of selected different epoxides with $CO_2$ activated by TEB under metal free conditions

| Entry | M[a] | Initiators[b] | [Initiator]/[TEB] | Temp. | DP targeted | Yields[c] (%) | PC[d] mol % | Selectivity %[d] | Mn(×10³)/PDI[e] |
|---|---|---|---|---|---|---|---|---|---|
| 1[f] | EO | BDM + t-BuP$_4$ | 1/0.5 | r.t. | 500 | 40 | 99 | 99 | 18.0/1.1 |
| 2[f] | EO | BDM + t-BuP$_4$ | 1/1 | r.t. | 500 | 66 | 99 | 97 | 29.0/1.1 |
| 3[f] | EO | BDM + t-BuP$_4$ | 1/2 | r.t. | 500 | 86 | 49 | 96 | 21.0/1.1 |
| 4[f] | EO | BDM + t-BuP$_4$ | 1/1 | 40 | 500 | 74 | 99 | 92 | 33.0/1.1 |
| 5[f] | EO | NOct$_4$Cl | 1/1 | r.t. | 500 | 35 | 99 | 99 | 7.4/1.6 |
| 6[f] | EO | PPNCl | 1/1 | r.t. | 500 | 87 | 56 | 98 | 24.0/1.4 |
| 7 | PO | BDM + t-BuP$_4$ | 1/2 | 50 | 1000 | 77 | 98 | 98 | 32.0/1.2 |
| 8 | PO | BDM + t-BuP$_4$ | 1/2 | 60 | 1000 | 85 | 99 | 97 | 35.0/1.1 |
| 9 | PO | BDM + t-BuP$_4$ | 1/2 | 60 | 1000 | 83 | 98 | 98 | 45.0/1.2 |
| 10 | PO | BDM + t-BuP$_4$ | 1/2 | 70 | 1000 | 69 | 96 | 62 | 22.0/1.1 |
| 11 | PO | BDM + t-BuP$_4$ | 1/2 | 80 | 1000 | 54 | 97 | 53 | 18.0/1.1 |
| 12 | PO | NBu$_4$Cl | 1/2 | 60 | 1000 | 46 | 95 | 97 | 50.0/1.2 |
| 13 | BO | BDM + t-BuP$_4$ | 1/2 | 60 | 500 | 87 | 97 | 99 | 31.0/1.1 |
| 14 | BO | BDM + t-BuP$_4$ | 1/2 | 60 | 1000 | 84 | 98 | 98 | 28.0/1.2 |
| 15 | BO | PPNCl | 1/2 | 60 | 500 | 83 | 96 | 98 | 29.0/1.2 |
| 16 | HO | BDM + t-BuP$_4$ | 1/2 | 50 | 1000 | 72 | 99 | 98 | 63.0/1.1 |
| 17 | HO | BDM + t-BuP$_4$ | 1/2 | 60 | 1000 | 74 | 98 | 97 | 69.0/1.1 |
| 18 | HO | PPNCl | 1/2 | 60 | 500 | 65 | 97 | 98 | 32.0/1.1 |

TABLE 2-continued

Copolymerization results of selected different epoxides with $CO_2$ activated by TEB under metal free conditions

| Entry | M[a] | Initiators[b] | [Initiator]/[TEB] | Temp. | DP targeted | Yields[c] (%) | PC[d] mol % | Selectivity %[d] | Mn(×10³)/PDI[e] |
|---|---|---|---|---|---|---|---|---|---|
| 19 | OO | BDM + t-BuP₄ | 1/2 | 50 | 1000 | 72 | 97 | 98 | 70.0/1.1 |
| 20 | OO | BDM + t-BuP₄ | 1/2 | 60 | 1000 | 73 | 99 | 98 | 73.0/1.1 |
| 21 | OO | PPNCl | 1/2 | 60 | 500 | 70 | 97 | 99 | 41.0/1.2 |
| 22[g] | SO | BnOH + t-BuP₄ | 1/2 | 60 | 100 | 45 | 95 | 57 | 5.1/1.2 |
| 23[g] | SO | BnOH + t-BuP₄ | 1/2 | 60 | 200 | 42 | 94 | 53 | 8.9/1.1 |
| 24[g] | SO | BnOH + t-BuP₄ | 1/2 | 60 | 500 | 14 | 95 | 43 | 9.1/1.1 |
| 25[g] | SO | BnOH + t-BuP₄ | 1/4 | 60 | 500 | 16 | 93 | 61 | 9.7/1.1 |
| 26[g] | SO | PPNCl | 1/8 | 60 | 500 | 67 | 99 | 85 | 15.0/1.1 |
| 27 | CHO | BnOH + t-BuP₄ | 1/2 | 80 | 250 | 88 | 99 | 97 | 24.0/1.2 |
| 28 | CHO | PPNCl | 1/2 | 80 | 4000 | 90 | 99 | 95 | 76.4/1.2 |
| 29 | AGE | BDM + t-BuP₄ | 1/2 | 50 | 1000 | 78 | 94 | 97 | 46.0/1.1 |
| 30 | AGE | BDM + t-BuP₄ | 1/2 | 60 | 1000 | 68 | 93 | 96 | 63.0/1.1 |
| 31 | AGE | PPNCl | 1/2 | 60 | 500 | 56 | 86 | 97 | 12.0/1.1 |
| 32 | BGE | BDM + t-BuP₄ | 1/2 | 60 | 100 | 45 | 92 | 63 | 4.1/1.1 |
| 33 | BGE | BDM + t-BuP₄ | 1/2 | 60 | 500 | 36 | 87 | 42 | 5.3/1.2 |

[a]EO: ethylene oxide; PO: propylene oxide; CHO: cyclohexene oxide; BO: 1-butene oxide; HO: 1-hexene oxide; OO: 1-octene oxide; SO: styrene oxide; AGE: allyl glycidyl ether; BGE: butyl glycidyl ether.
[b]BDM: 1,4-benzenedimethanol; BnOH: benzyl alcohol; PPNCl: bis (triphenylphosphoranylidene) ammonium chloride; NOct₄Cl: tetraoctylammonium chloride; NBu₄Cl: tetrabutylammonium chloride; t-BuP₄: phosphazene base.
[c]Calculated by gravity.
[d]PC: polycarbonate contents; calculated based on ¹H NMR of reaction mixture.
[e]Determined by GPC using tetrahydrofuran as the fluent and polystyrene as standard.
[f]Determined by GPC using dimethylformamide as the fluent and polystyrene as standard.
[g]Determined by GPC using chloroform as the fluent and polystyrene as standard.

EXAMPLE 4

Figure 22A:
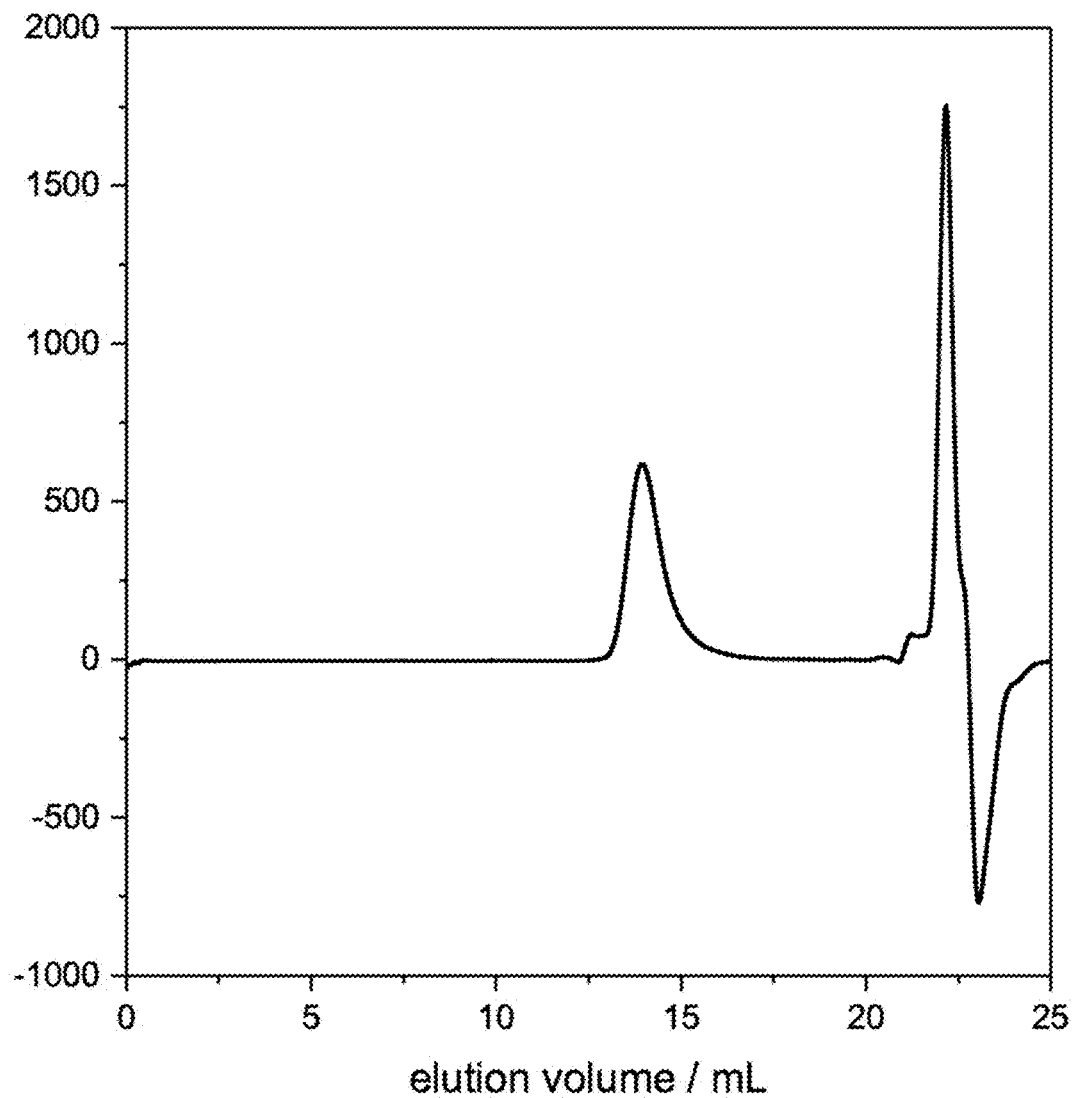
FIG. 22A is a graphical view of GPC trace of entry 7 in table 2, according to one or more embodiments of the present disclosure.
Figure 22B:
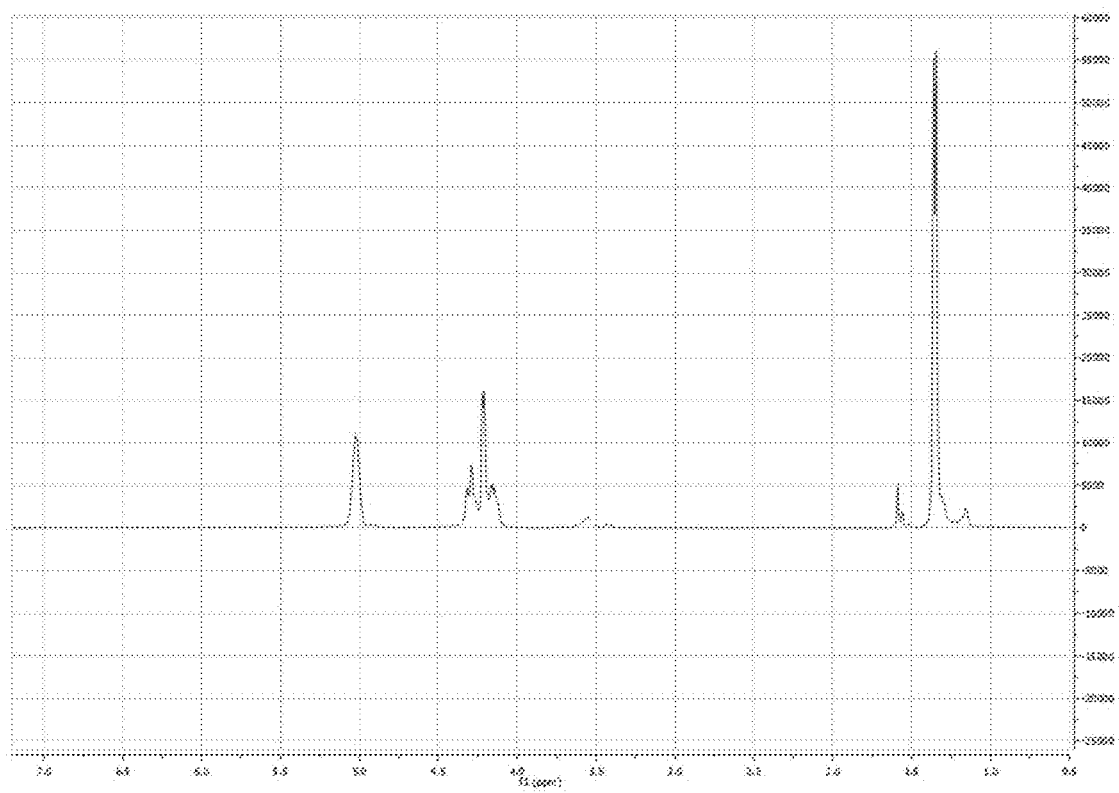
FIG. 22B is a graphical view of $^1$H NMR spectrum of poly(propylene carbonate) (entry 7 in table 2), according to one or more embodiments of the present disclosure.

Representative procedure of copolymerization of $CO_2$ with propylene oxide (PO): Take Entry 7 in Table 2 as an example. A 50 mL Parr reactor with magnetic stirrer was first dried in an oven at 120° C. overnight, then immediately placed into the glove box chamber. After keeping under vacuum for 2-3 hours, the reaction vessel was moved into the glove box under argon atmosphere. 3.9 mg (0.029 mmol) of BDM in 1.0 mL of THF was first added into the reactor, then equal equivalent of t-BuP4 solution (0.058 mmol) was slowly added accompanying with the generation of white precipitate. triethylborane in THF solution (0.116 mmol) was dropped into this suspension solution. The white precipitates dissolved gradually, and a transparent yellow solution was formed. After propylene oxide (PO, 2 mL, 29 mmol) was added into the reactor, and the autoclave was quickly sealed, taken out from the glove box and charged with $CO_2$ to a pressure of 10 bar. The copolymerization was carried out at 60° C. for 10 hr. At the end of the polymerization, the unreacted $CO_2$ was slowly released, and the polymer solution was quenched with HCl in methanol (1 mol/L). The crude product was diluted with $CH_2Cl_2$ and then precipitated in cold methanol. The product was collected by centrifugation and dried in vacuum at room temperature until constant weight. See FIGS. 22A-22B.

EXAMPLE 5

Figure 23:
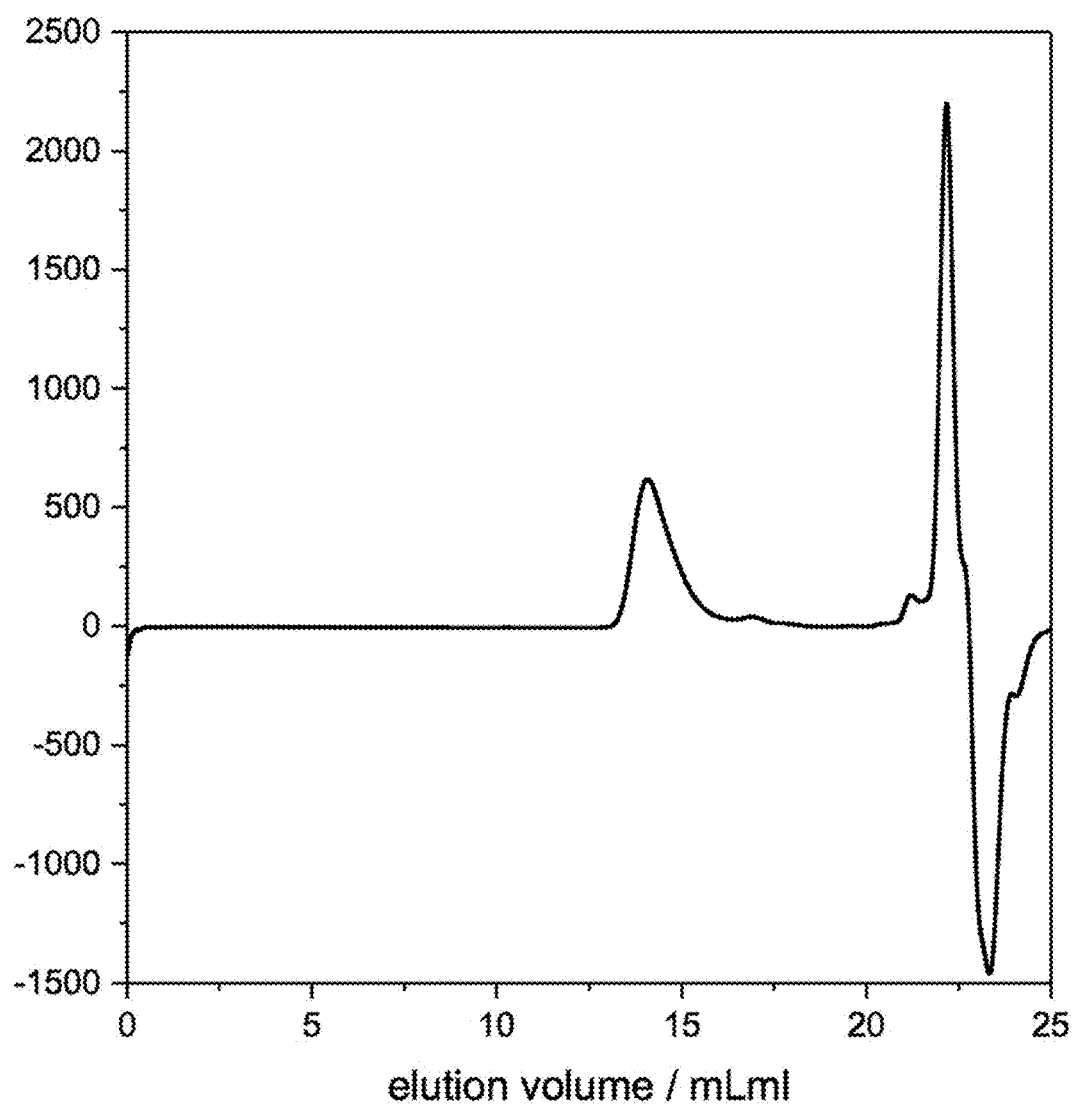
FIG. 23 is a graphical view of GPC trace of entry 14 in table 2, according to one or more embodiments of the present disclosure.
Figure 24:
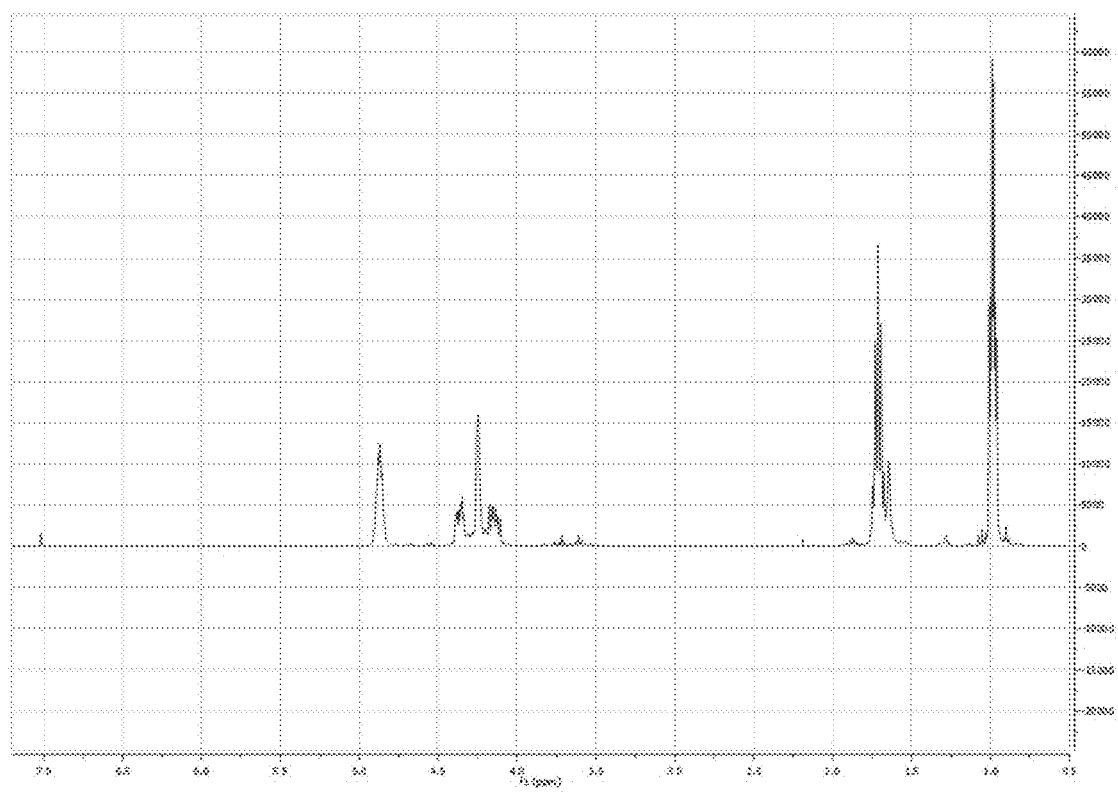
FIG. 24 is a graphical view of 41 NMR spectrum of poly(butylene carbonate) (entry 14 in table 2), according to one or more embodiments of the present disclosure.

Representative procedure of copolymerization of $CO_2$ with 1-butene oxide (BO): Take Entry 14 in Table 2 as the example. A 50 mL Parr reactor with magnetic stirrer was first dried in an oven at 120° C. overnight, then immediately placed into the glove box chamber. After keeping under vacuum for 2-3 hours, the reaction vessel was moved into the glove box under argon atmosphere. 3.2 mg (0.023 mmol) of BDM in 1.0 mL of THF was first added into the reactor, then equal equivalent of t-BuP4 solution (0.046 mmol) was slowly added accompanying with the generation of white precipitate. triethylborane in THF solution (0.092 mmol) was dropped into this suspension solution. The white precipitates dissolved gradually, and a transparent yellow solution was formed. After 1-butene oxide (BO, 2 mL, 23 mmol) was added into the reactor, and the autoclave was quickly sealed, taken out from the glove box and charged with $CO_2$ to a pressure of 10 bar. The copolymerization was carried out at 60° C. for 10 hr. At the end of the polymerization, the unreacted $CO_2$ was slowly released, and the polymer solution was quenched with HCl in methanol (1 mol/L). The crude product was diluted with $CH_2Cl_2$ and then precipitated in cold methanol. The product was collected by centrifugation and dried in vacuum at room temperature until constant weight. See FIGS. 23-24.

EXAMPLE 6

Figure 25:
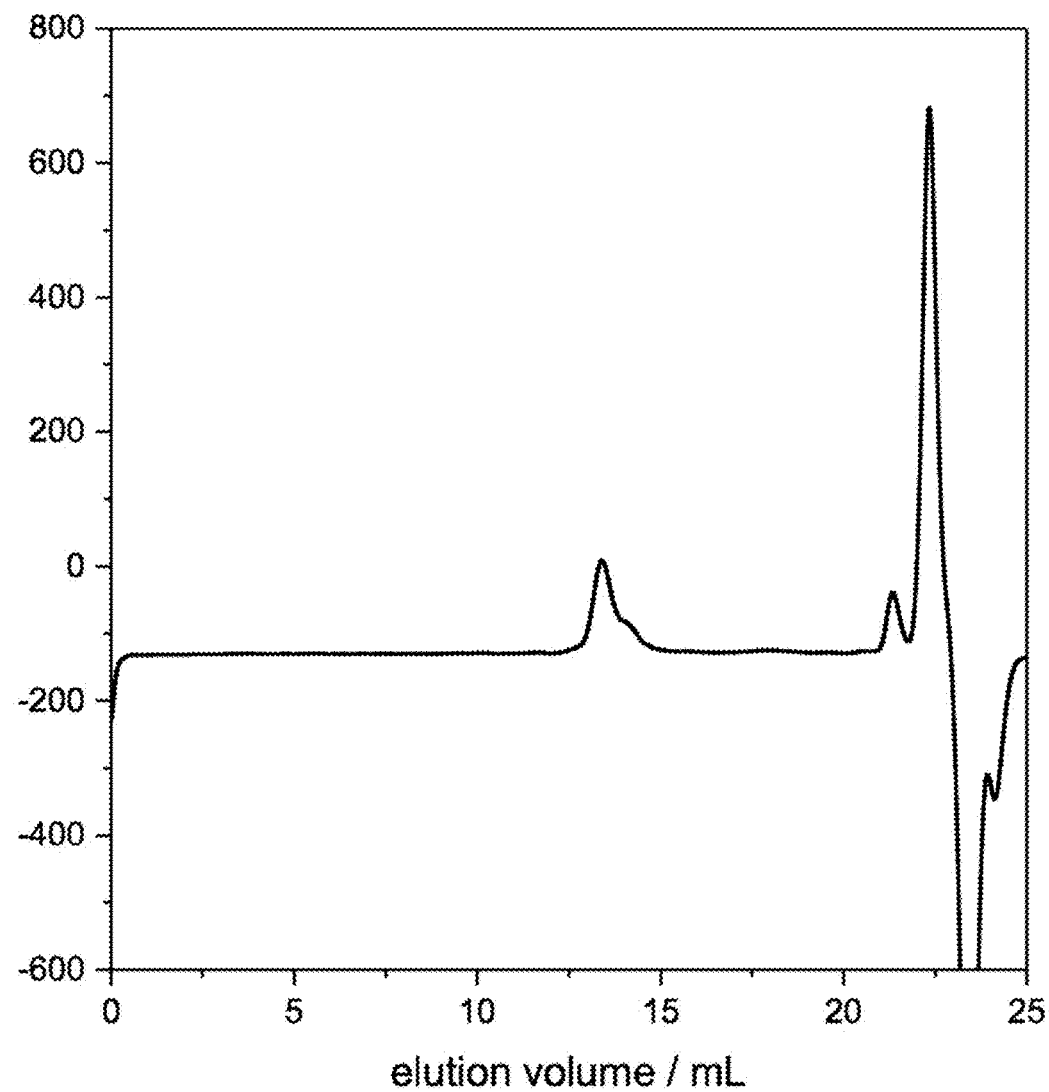
FIG. 25 is a graphical view of GPC trace of entry 16 in table 2, according to one or more embodiments of the present disclosure.
Figure 26:
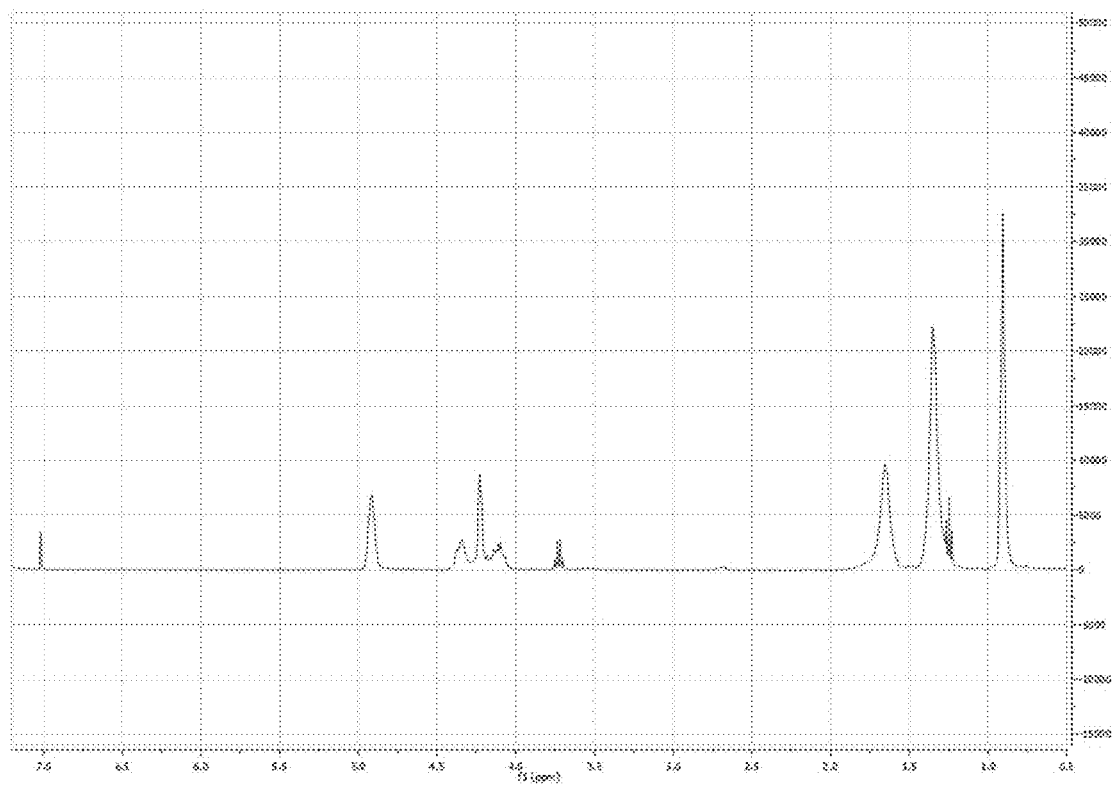
FIG. 26 is a graphical view of 41 NMR spectrum of poly(hexene carbonate) (entry 16 in table 2), according to one or more embodiments of the present disclosure.

Representative procedure of copolymerization of $CO_2$ with 1-hexene oxide (HO): Take Entry 16 in Table 2 as the example. A 50 mL Parr reactor with magnetic stirrer was first dried in an oven at 120° C. overnight, then immediately placed into the glove box chamber. After keeping under vacuum for 2-3 hours, the reaction vessel was moved into the glove box under argon atmosphere. 2.3 mg (0.017 mmol) of BDM in 1.0 mL of THF was first added into the reactor, then equal equivalent of t-BuP4 solution (0.034 mmol) was slowly added accompanying with the generation of white precipitate. triethylborane in THF solution (0.068 mmol) was dropped into this suspension solution. The white precipitates dissolved gradually, and a transparent yellow solution was formed. After 1-hexene oxide (HO, 2 mL, 16.6 mmol) was added into the reactor, and the autoclave was quickly sealed, taken out from the glove box and charged with $CO_2$ to a pressure of 10 bar. The copolymerization was carried out at 60° C. for 10 hr. At the end of the polymerization, the unreacted $CO_2$ was slowly released, and the polymer solution was quenched with HCl in methanol (1 mol/L). The crude product was diluted with $CH_2Cl_2$ and then precipitated in cold methanol. The product was collected by centrifugation and dried in vacuum at room temperature until constant weight. See FIGS. 25-26.

EXAMPLE 7

Figure 27:
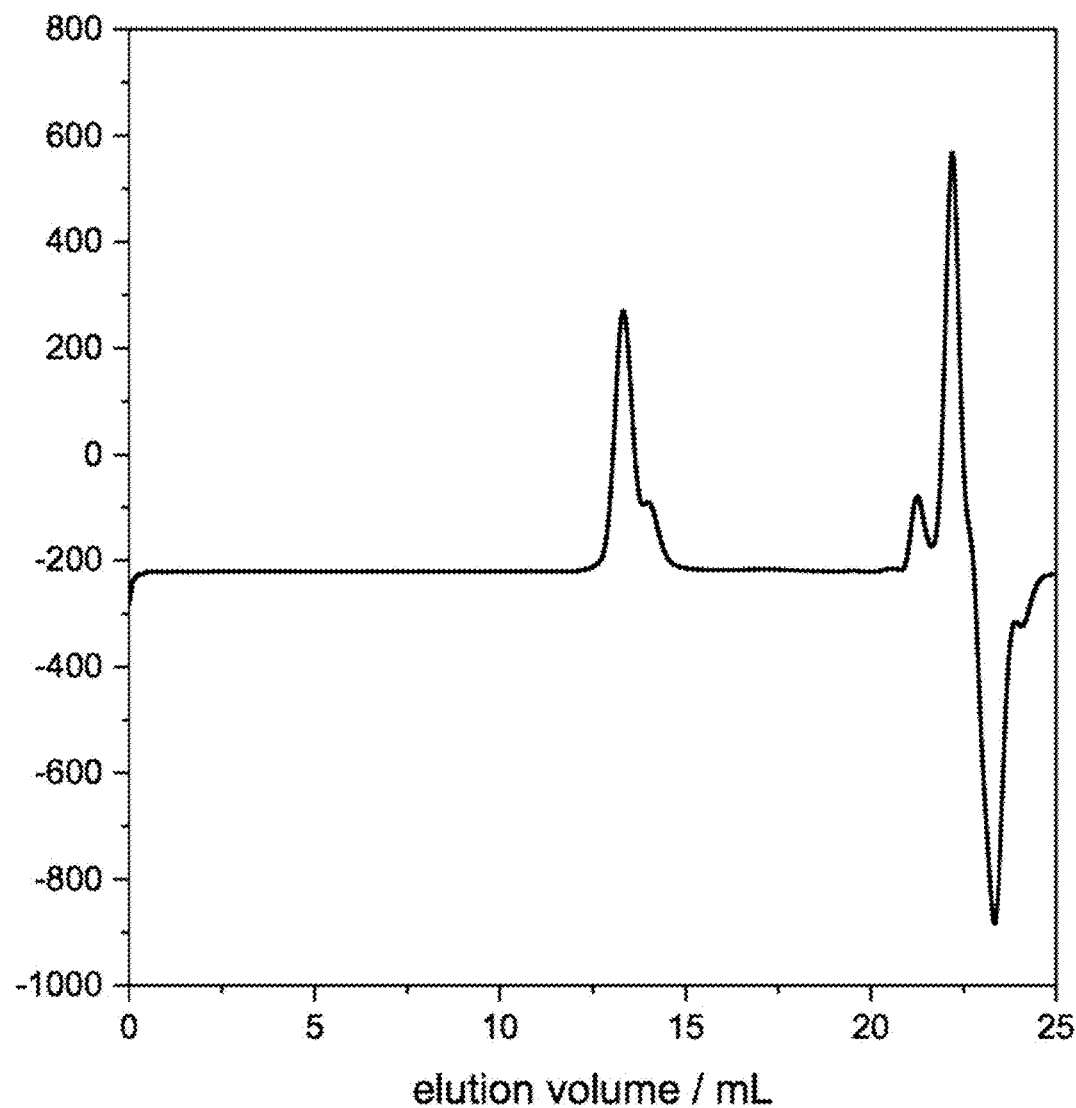
FIG. 27 is a graphical view of GPC trace of entry 20 in table 2, according to one or more embodiments of the present disclosure.
Figure 28:
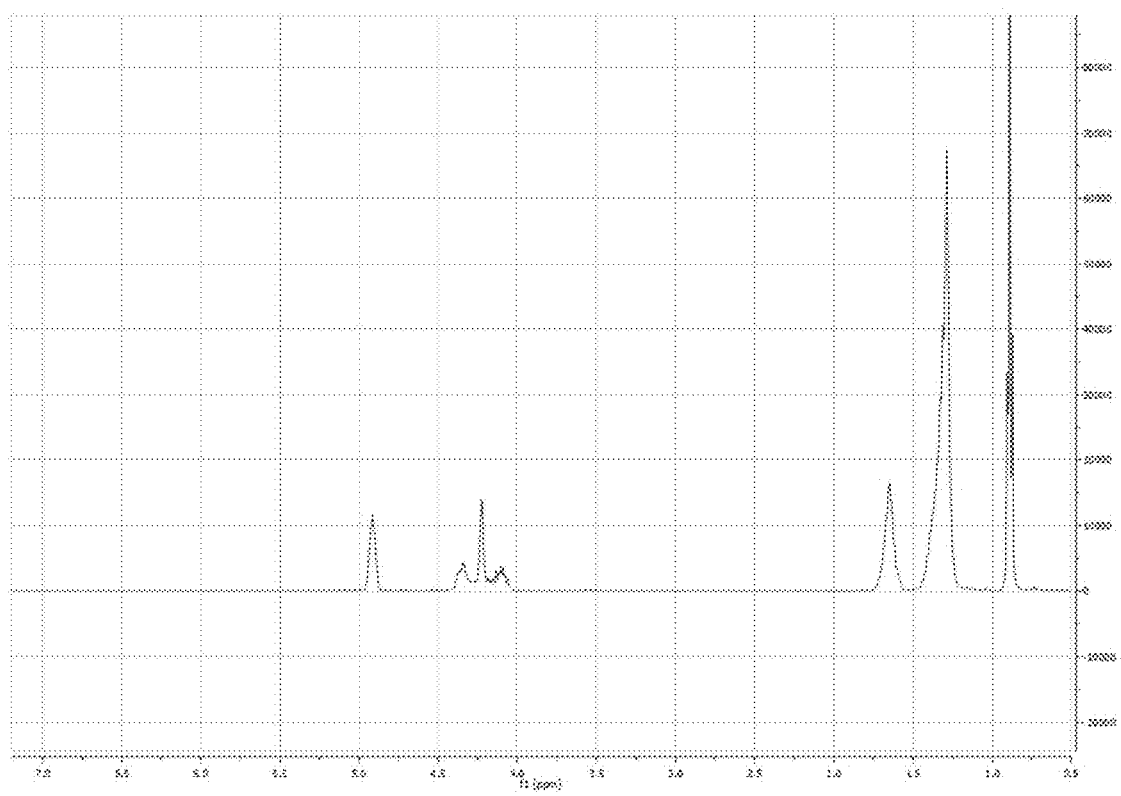
FIG. 28 is a graphical view of 41 NMR spectrum of poly(octane carbonate) (entry 20 in table 2), according to one or more embodiments of the present disclosure.

Representative procedure of copolymerization of $CO_2$ with 1-octene oxide (OO): Take Entry 20 in Table 2 as the example. A 50 mL Parr reactor with magnetic stirrer was first dried in an oven at 120° C. overnight, then immediately placed into the glove box chamber. After keeping under vacuum for 2-3 hours, the reaction vessel was moved into the glove box under argon atmosphere. 1.8 mg (0.013 mmol) of BDM in 1.0 mL of THF was first added into the reactor, then equal equivalent of t-BuP4 solution (0.026 mmol) was slowly added accompanying with the generation of white precipitate. triethylborane in THF solution (0.052 mmol) was dropped into this suspension solution. The white precipitates dissolved gradually, and a transparent yellow solution was formed. After 1-octene oxide (OO, 2 mL, 13.4 mmol) was added into the reactor, and the autoclave was quickly sealed, taken out from the glove box and charged with $CO_2$ to a pressure of 10 bar. The copolymerization was carried out at 60° C. for 10 hr. At the end of the polymerization, the unreacted $CO_2$ was slowly released, and the polymer solution was quenched with HCl in methanol (1 mol/L). The crude product was diluted with $CH_2Cl_2$ and then precipitated in cold methanol. The product was collected by centrifugation and dried in vacuum at room temperature until constant weight. See FIGS. 27-28.

EXAMPLE 8

Figure 29:
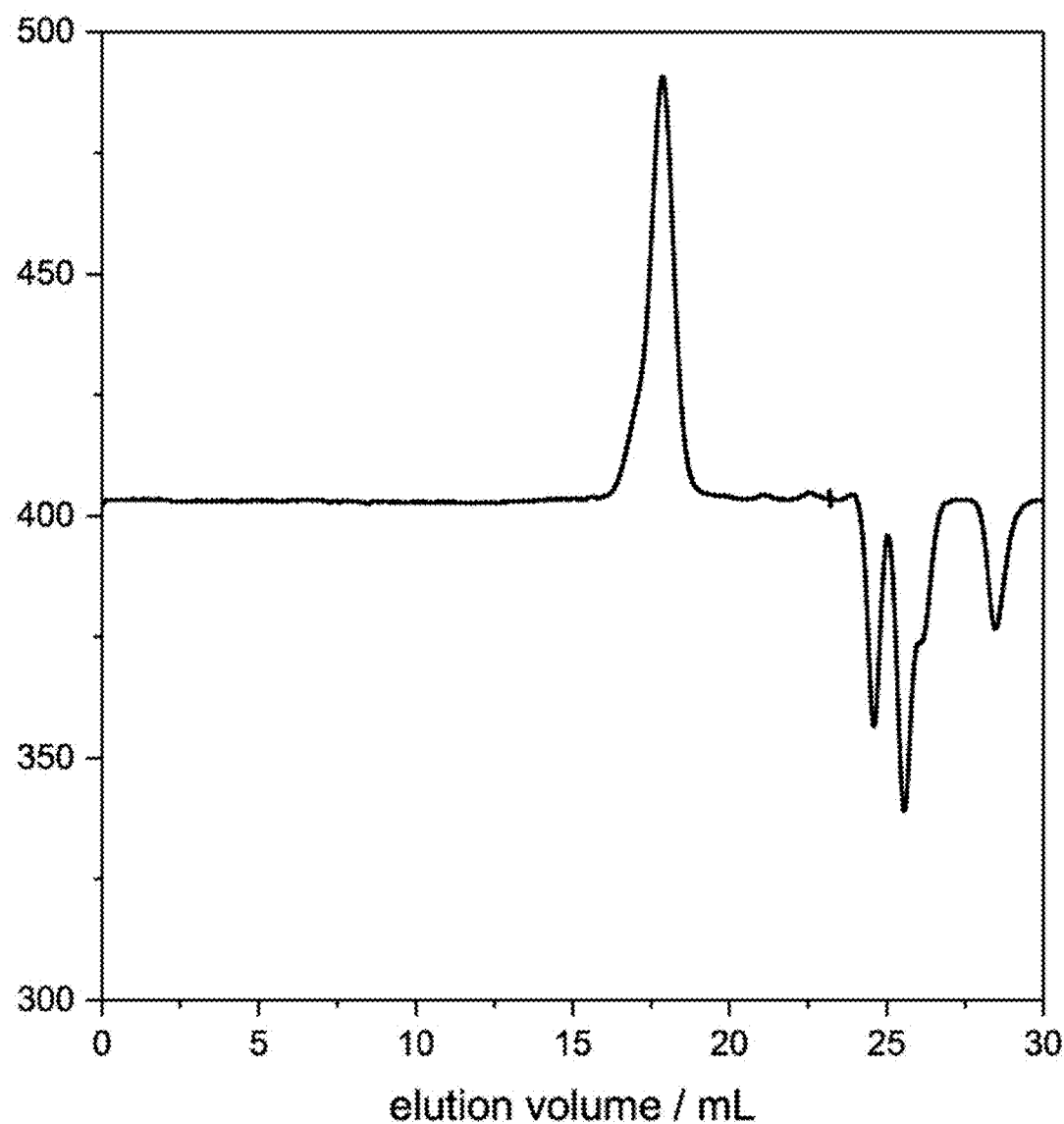
FIG. 29 is a graphical view of GPC trace of entry 26 in table 2, according to one or more embodiments of the present disclosure.
Figure 30:
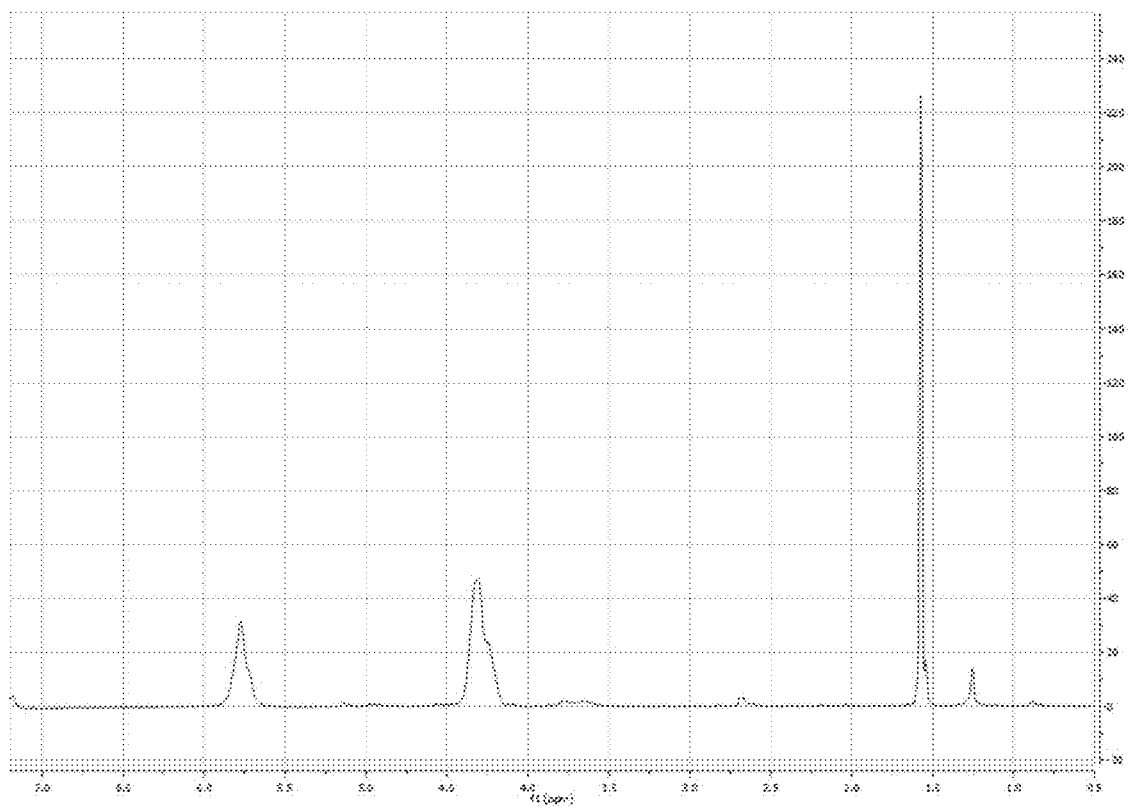
FIG. 30 is a graphical view of $^1$H NMR spectrum of poly(styrene carbonate) (entry 26 in table 2), according to one or more embodiments of the present disclosure.

Representative procedure of copolymerization of $CO_2$ with styrene oxide (SO): Take Entry 26 in Table 2 as the example. A 50 mL Parr reactor with magnetic stirrer was first dried in an oven at 120° C. overnight, then immediately placed into the glove box chamber. After keeping under vacuum for 2-3 hours, the reaction vessel was moved into the glove box under argon atmosphere. 20 mg (0.035 mmol) of PPNCl in 1.0 mL of THF was first added into the reactor, then triethylborane in THF solution (0.28 mmol) was dropped into this suspension solution. Styrene oxide (SO, 2 mL, 17.5 mmol) was added into the reactor, and the autoclave was quickly sealed, taken out from the glove box and charged with $CO_2$ to a pressure of 10 bar. The copolymerization was carried out at 60° C. for 10 hr. At the end of the polymerization, the unreacted $CO_2$ was slowly released, and the polymer solution was quenched with HCl in methanol (1 mol/L). The crude product was diluted with $CH_2Cl_2$ and then precipitated in cold methanol. The product was collected by centrifugation and dried in vacuum at room temperature until constant weight. See FIGS. 29-30.

EXAMPLE 9

Figure 31:
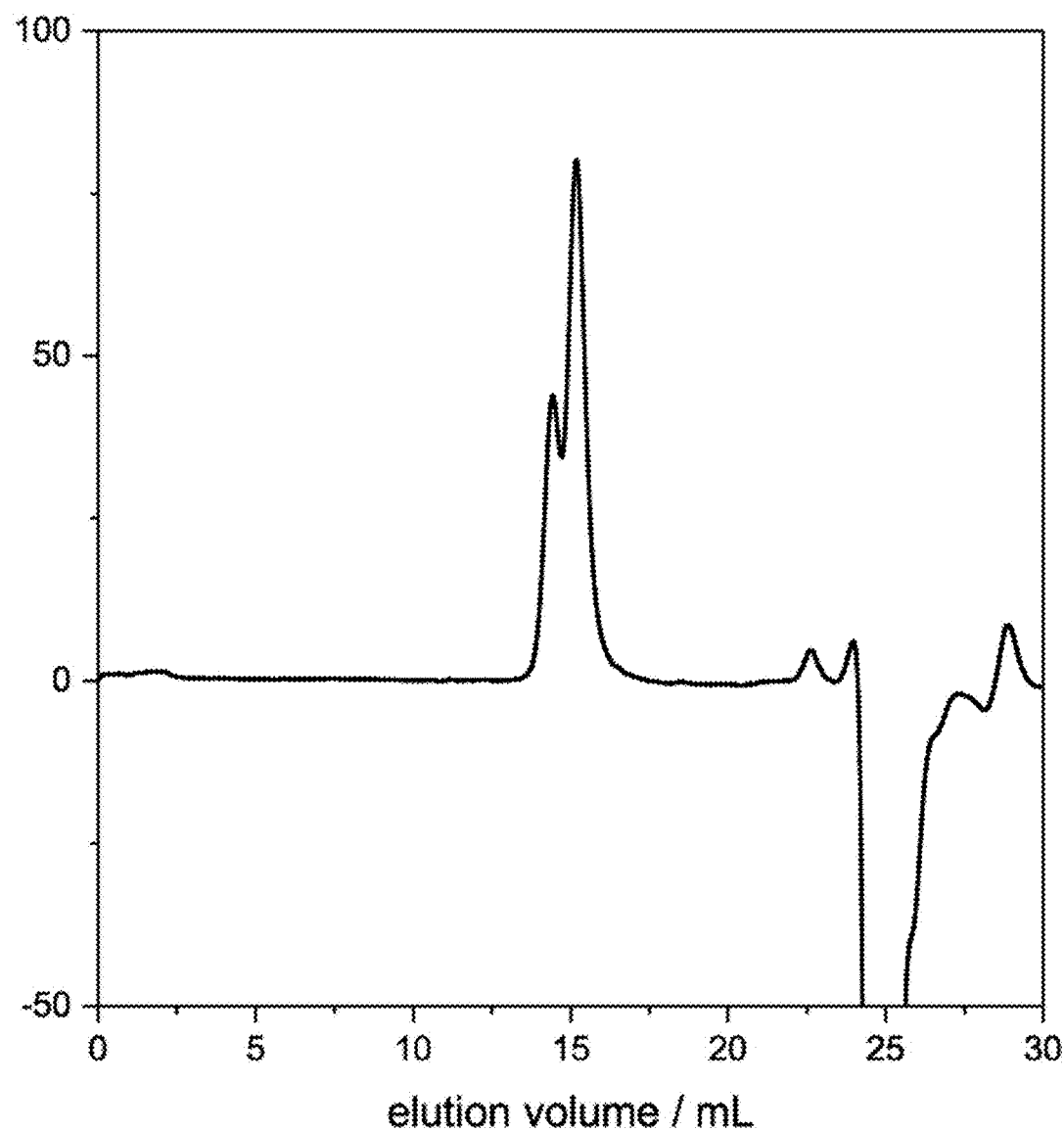
FIG. 31 is a graphical view of GPC trace of entry 28 in table 2, according to one or more embodiments of the present disclosure.
Figure 32:
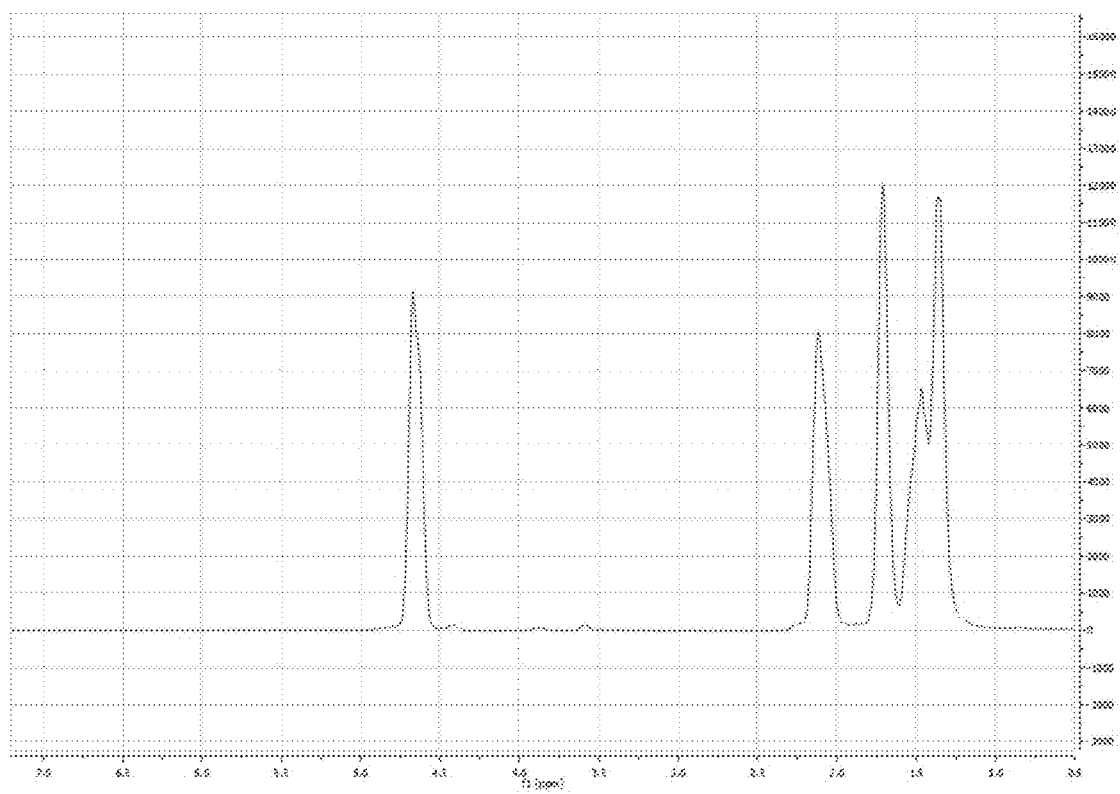
FIG. 32 is a graphical view of $^1$H NMR spectrum of poly(cyclohexene carbonate) (entry 28 in table 2), according to one or more embodiments of the present disclosure.

Representative procedure of copolymerization of $CO_2$ with cyclohexene oxide (CHO): Take Entry 28 in Table 2 as the example. A 50 mL Parr reactor with magnetic stirrer was first dried in an oven at 120° C. overnight, then immediately placed into the glove box chamber. After keeping under vacuum for 2-3 hours, the reaction vessel was moved into the glove box under argon atmosphere. 11 mg (0.040 mmol) of NBu4Cl in 1.0 mL of THF was first added into the reactor, then triethylborane in THF solution (0.080 mmol) was dropped into this suspension solution. CHO (2 mL, 20.0 mmol) was added into the reactor, and the autoclave was quickly sealed, taken out from the glove box and charged with $CO_2$ to a pressure of 10 bar. The copolymerization was carried out at 60° C. for 10 hr. At the end of the polymerization, the unreacted $CO_2$ was slowly released, and the polymer solution was quenched with HCl in methanol (1 mol/L). The crude product was diluted with $CH_2Cl_2$ and then precipitated in cold methanol. The product was collected by centrifugation and dried in vacuum at room temperature until constant weight. See FIGS. 31-32.

EXAMPLE 10

Figure 33:
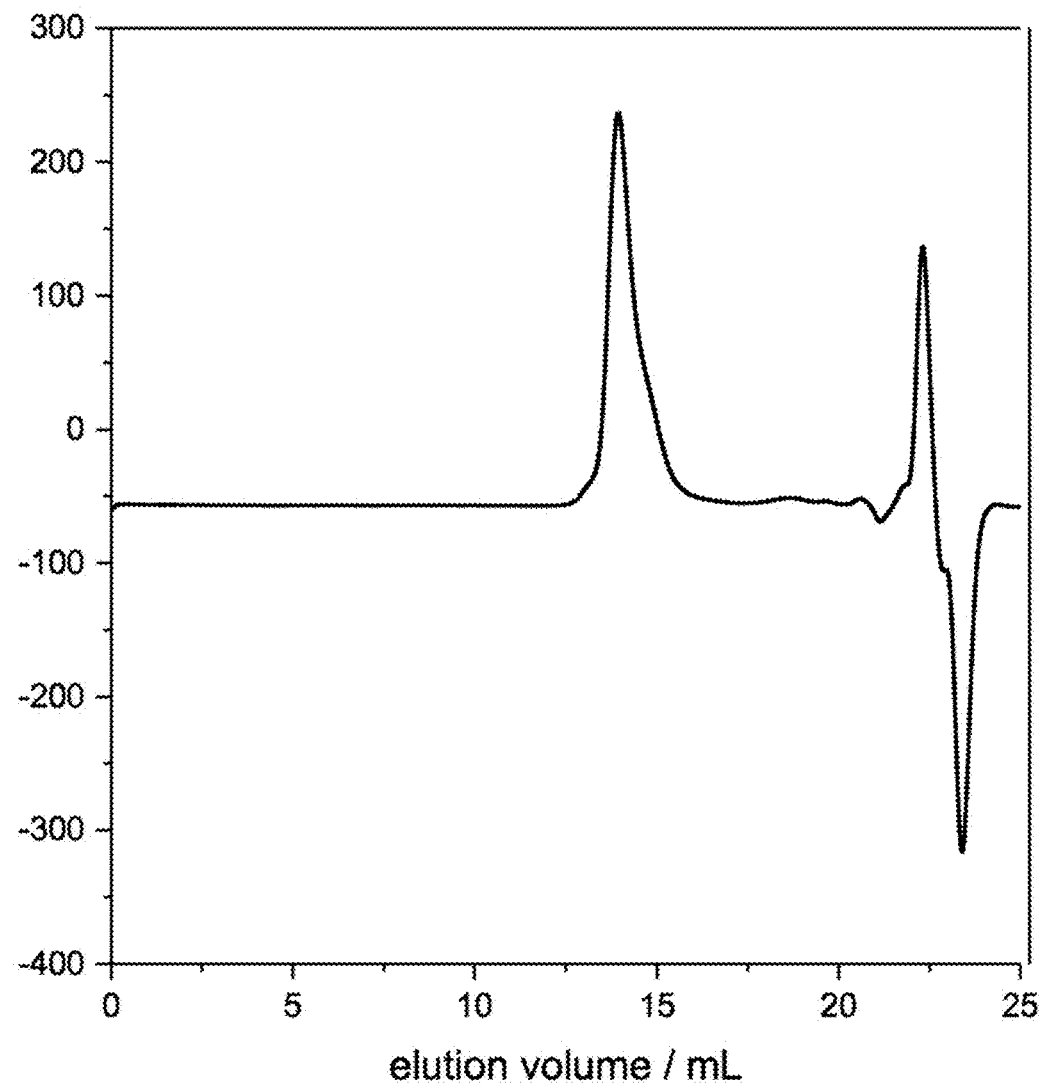
FIG. 33 is a graphical view of GPC trace of entry 29 in table 2, according to one or more embodiments of the present disclosure.
Figure 34:
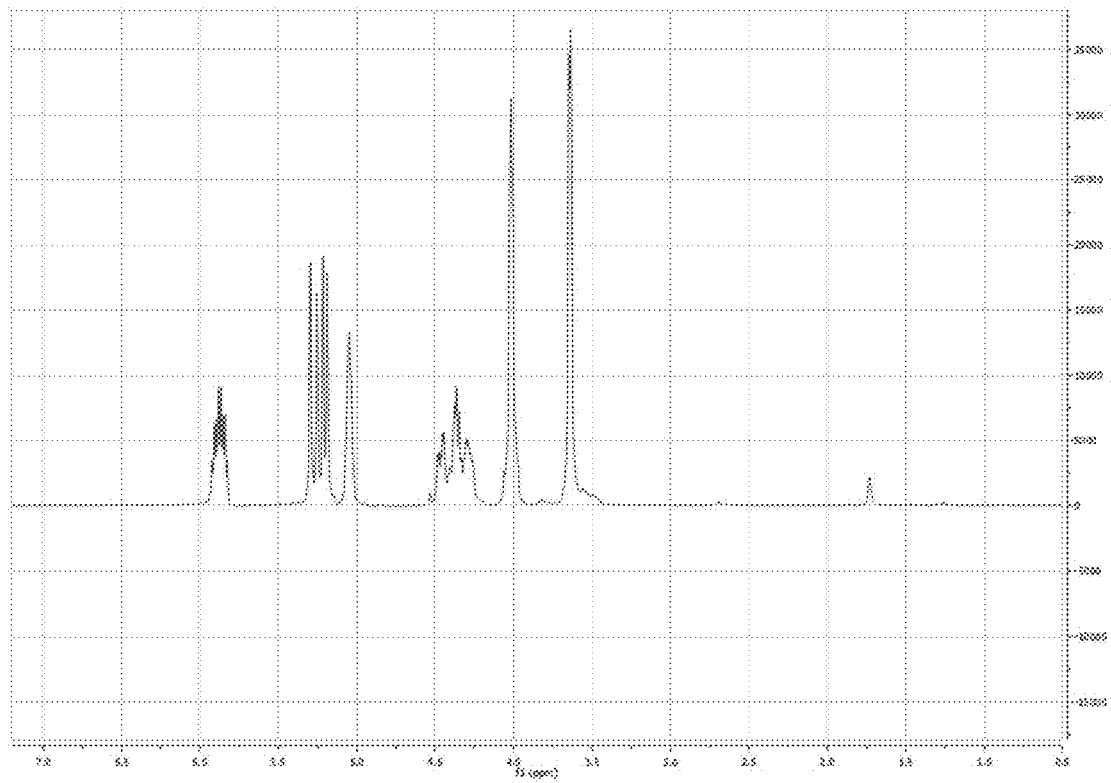
FIG. 34 is a graphical view of $^1$H NMR spectrum of poly(allyl glycidyl carbonate) (entry 29 in table 2), according to one or more embodiments of the present disclosure.

Representative procedure of copolymerization of $CO_2$ with allyl glycidyl ether (AGE): Take Entry 29 in Table 2 as the example. A 50 mL Parr reactor with magnetic stirrer was first dried in an oven at 120° C. overnight, then immediately placed into the glove box chamber. After keeping under vacuum for 2-3 hours, the reaction vessel was moved into the glove box under argon atmosphere. 2.3 mg (0.017 mmol) of BDM in 1.0 mL of THF was first added into the reactor, then equal equivalent of t-BuP4 solution (0.034 mmol) was slowly added accompanying with the generation of white precipitate. triethylborane in THF solution (0.068 mmol) was dropped into this suspension solution. The white precipitates dissolved gradually, and a transparent yellow solution was formed. After AGE (2 mL, 16.8 mmol) was added into the reactor, and the autoclave was quickly sealed, taken out from the glove box and charged with $CO_2$ to a pressure of 10 bar. The copolymerization was carried out at 60° C. for 10 hr. At the end of the polymerization, the unreacted $CO_2$ was slowly released, and the polymer solution was quenched with HCl in methanol (1 mol/L). The crude product was diluted with $CH_2Cl_2$ and then precipitated in cold methanol. The product was collected by centrifugation and dried in vacuum at room temperature until constant weight. See FIGS. 33-34.

EXAMPLE 11

Figure 35:
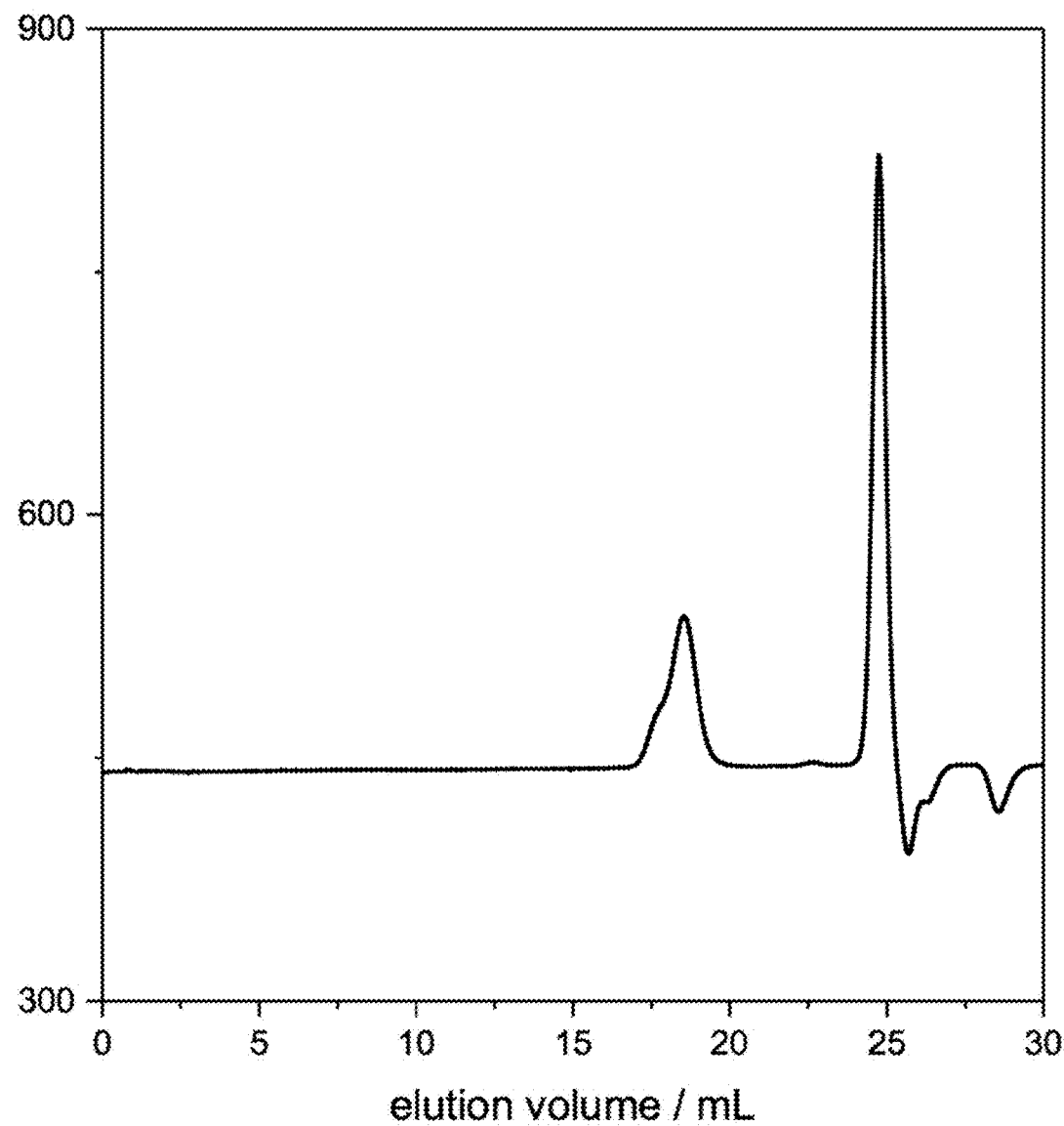
FIG. 35 is a graphical view of GPC trace of entry 32 in table 2, according to one or more embodiments of the present disclosure.
Figure 36:
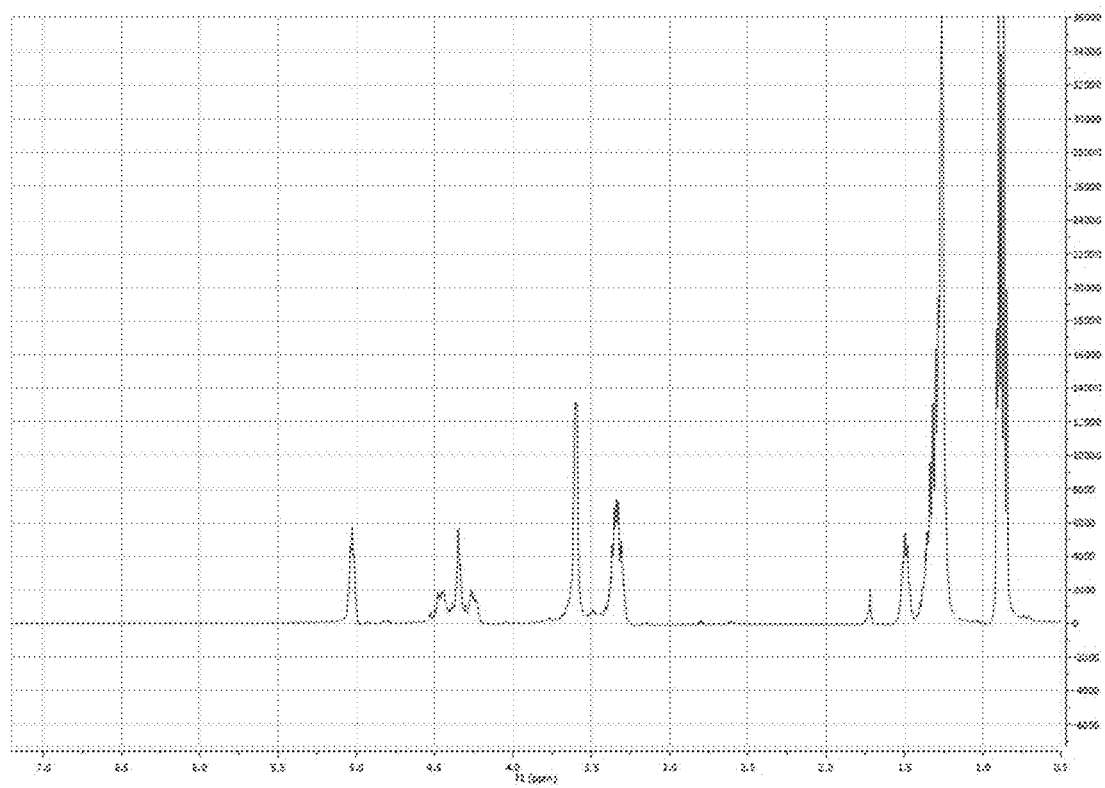
FIG. 36 is a graphical view of $^1$H NMR spectrum of poly(butyl glycidyl carbonate) (entry 32 in table 2), according to one or more embodiments of the present disclosure.

Representative procedure of copolymerization of $CO_2$ with butyl glycidyl ether (BGE): Take Entry 32 in Table 2 as the example. A 50 mL Parr reactor with magnetic stirrer was first dried in an oven at 120° C. overnight, then immediately placed into the glove box chamber. After keeping under vacuum for 2-3 hours, the reaction vessel was moved into the glove box under argon atmosphere. 19 mg (0.14 mmol) of BDM in 1.0 mL of THF was first added into the reactor, then equal equivalent of t-BuP4 solution (0.28 mmol) was slowly added accompanying with the generation of white precipitate. triethylborane in THF solution (0.056 mmol) was dropped into this suspension solution. The white precipitates dissolved gradually, and a transparent yellow solution was formed. After BGE (2 mL, 14 mmol) was added into the reactor, and the autoclave was quickly sealed, taken out from the glove box and charged with $CO_2$ to a pressure of 10 bar. The copolymerization was carried out at 60° C. for 10 hr. At the end of the polymerization, the unreacted $CO_2$ was slowly released, and the polymer solution was quenched with HCl in methanol (1 mol/L). The crude product was diluted with $CH_2Cl_2$ and then precipitated in cold methanol. The product was collected by centrifugation and dried in vacuum at room temperature until constant weight. See FIGS. 35-36.

EXAMPLE 12

Figure 37:
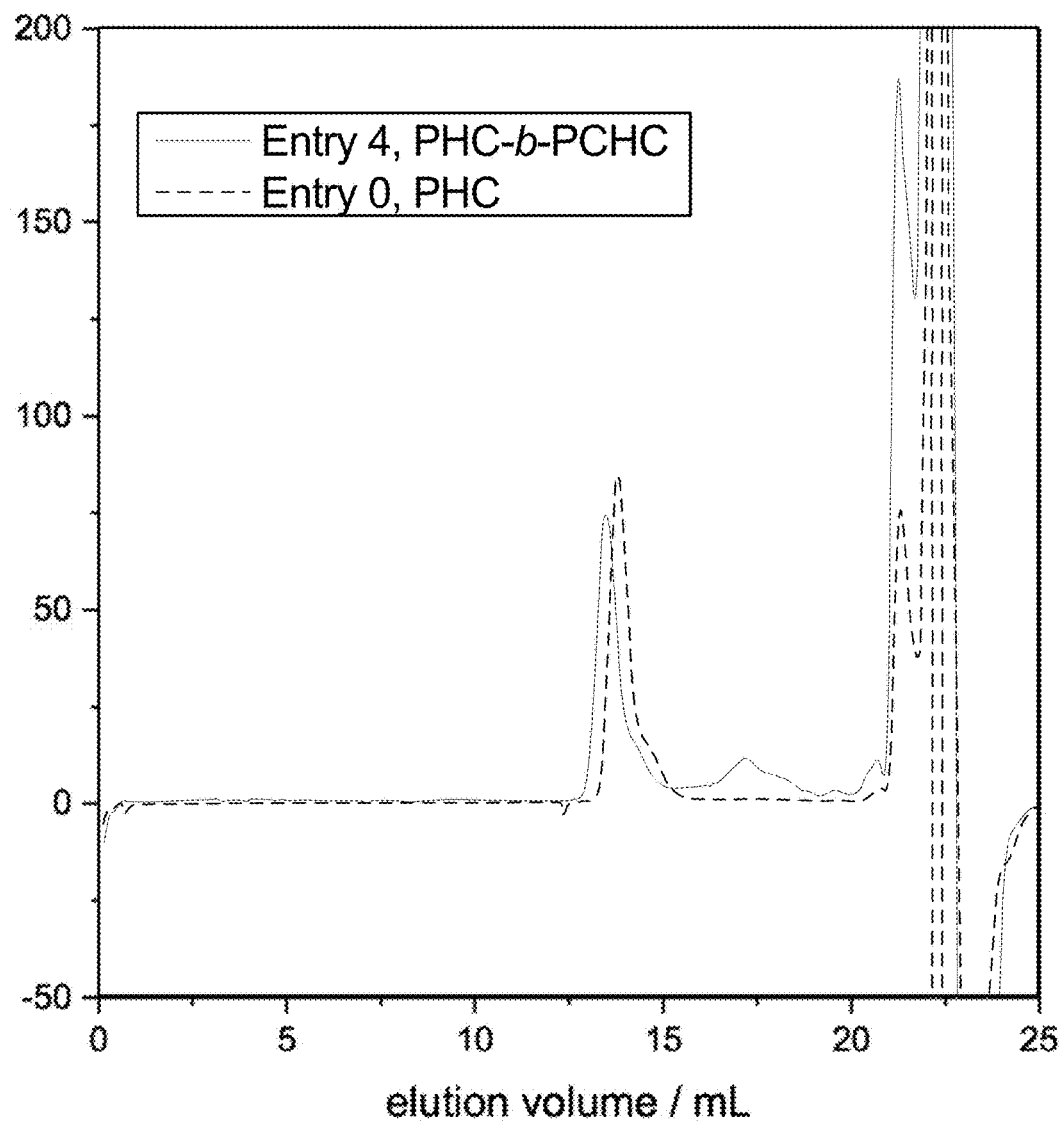
FIG. 37 is a graphical view of GPC trace of entry 0 and entry 4 in table 3, according to one or more embodiments of the present disclosure.
Figure 38:
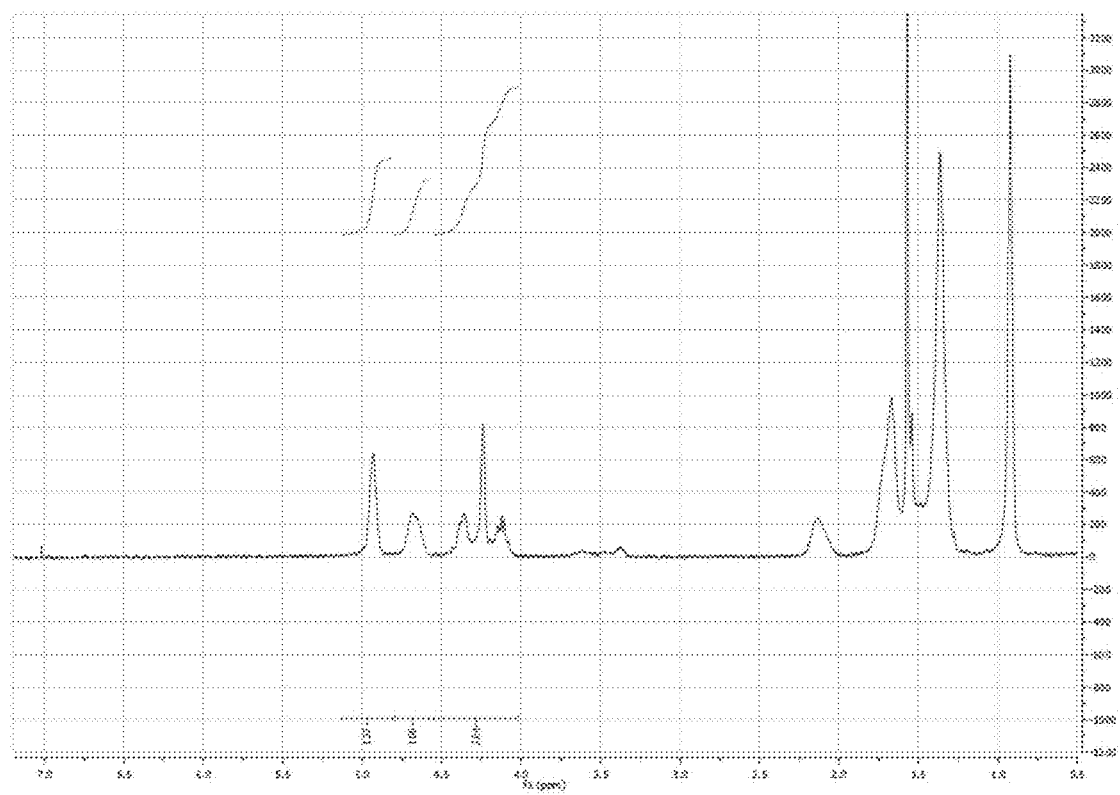
FIG. 38 is a graphical view of $^1$H NMR spectrum of poly(CHC-b-HC-b-CHC (entry 4 in table 3), according to one or more embodiments of the present disclosure.

Representative procedure of sequential copolymerization of $CO_2$ with 1-hexene oxide (HO) and cyclohexene oxide (CHO): Take Entry 4 in Table 3 as the example. A 300 mL Parr reactor with mechanical stirrer was first dried in an oven at 120° C. overnight, then immediately placed into the glove box chamber. After keeping under vacuum for 2-3 hours, the reaction vessel was moved into the glove box under argon atmosphere. 17 mg (0.12 mmol) of BDM in 3.0 mL of THF was first added into the reactor, then equal equivalent of t-BuP4 solution (0.24 mmol) was slowly added accompanying with the generation of white precipitate. triethylborane in THF solution (0.5 mmol) was dropped into this suspension solution. The white precipitates dissolved gradually, and a transparent yellow solution was formed. After 1-hexene oxide (HO, 15 mL, 124 mmol) was added into the reactor, and the autoclave was quickly sealed, taken out from the glove box and charged with $CO_2$ to a pressure of 10 bar. The copolymerization was carried out at 50° C. for 10 hr., the unreacted $CO_2$ and HO was removed under short vacuum. CHO (4.2 ml, 41.6 mmol) in 8 mL of THF was quickly added by syringe. The reactor was charged $CO_2$ again to 10 bar, and polymerization extended for another 10 hrs. At the end of the polymerization, the unreacted $CO_2$ was slowly released. The crude product was dissolved in some amount of $CH_2Cl_2$ and then precipitated in cold methanol. The product was collected by centrifugation and dried in vacuum at room temperature until constant weight. See FIGS. 37-38.

TABLE 3

Related data of polycarbonate triblock copolymer synthesis through sequential addition of epoxide monomers initiated with 1,4-benzenedimethanol/P4.[a]

| Entry | Feed Ratio [HO]/[CHO] | Conv.[b] [HO]% | Conv.[b] [CHO]% | Selectivity.[b] % | Mn/ PDI[d] | [PHC]/ [PCHC][c] |
|---|---|---|---|---|---|---|
| 0 | 10/0 | 80 | — | 98 | 59.0/1.1 | — |
| 1 | 9/1 | 77 | 85 | 97 | 83.0/1.0 | 8.5/1.0 |
| 2 | 7/1 | 78 | 87 | 98 | 65.0/1.2 | 6.3/1.0 |
| 3 | 5/1 | 82 | 92 | 97 | 69.0/1.2 | 4.2/1.0 |
| 4 | 3/1 | 79 | 91 | 99 | 73.0/1.1 | 2.6/1.0 |

[a]The copolymerization was carried out in same reactor at 50° C. for HO and 60° C. for CHO respectively.
[b]Determined by $^1$H NMR of crude products.
[c][PHC]/[PCHC]: molar ratio of poly (hexene carbonate) and poly (cyclohexene carbonate) in obtained triblock copolymer based on 1H NMR data.
[d]Determined by GPC using tetrahydrofuran as the fluent and polystyrene as standard.

EXAMPLE 13

Figure 39A:
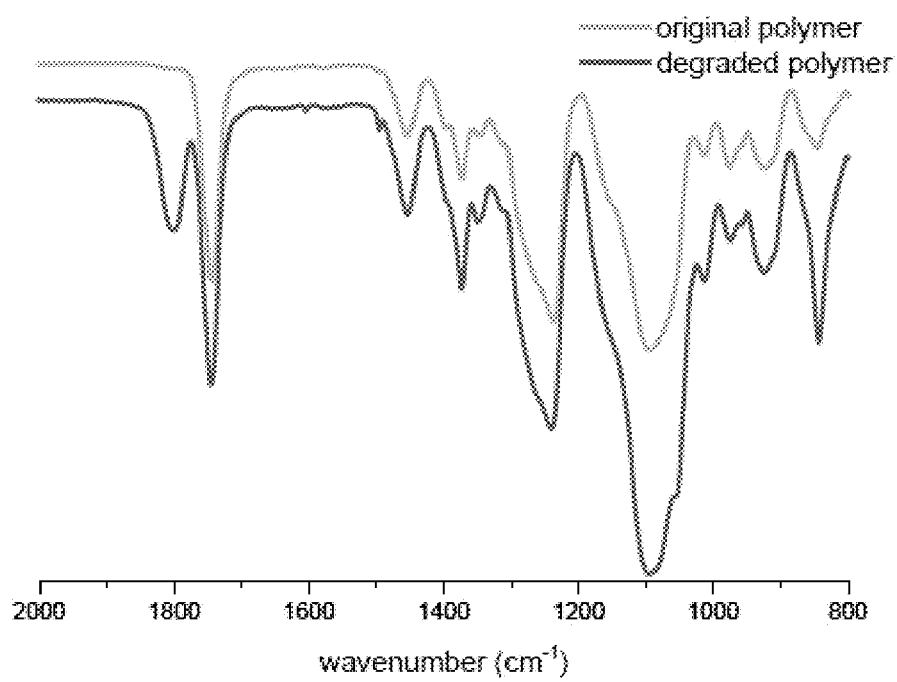
FIG. 39A illustrates a graphical view of an infrared (IR) degradation characterization of a prepared polymer initiated by N-heterocyclic carbene (NHC), according to one or more embodiments of this disclosure.
Figure 39B:
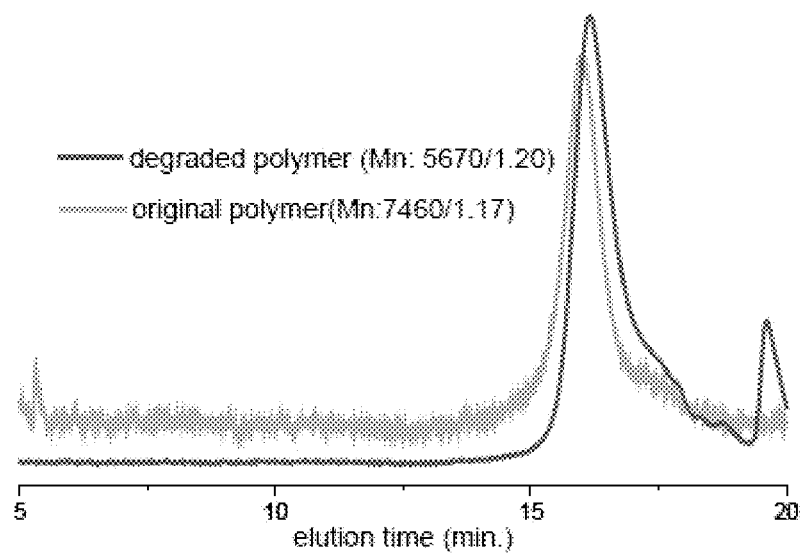
FIG. 39B illustrates a graphical view of a gel permeation chromatography (GPC) degradation characterization of a prepared polymer initiated by N-heterocyclic carbene (NHC), according to one or more embodiments of this disclosure.

A representative procedure of $CO_2$ copolymerization of propylene oxide with carbene catalyzed by triisobutyl aluminum was performed. Inside a glove box under argon, to a pre-dried 50 mL of autoclave fitted with magnetic stirring bar, 10.8 mg of 2-phenyl ethanol (86 µmol) was added followed by 1.5 mL of toluene. 1,3-diisopropylimidazol-2-ylidene in toluene (86 µmol) was added to deprotonate the alcohol. Ten minutes later, 246 mg of ionic liquid (10 eq.), 1-butyl-3-methylimidazolium hexaflurophosphate and triisobutyl aluminum in toluene (103 µmol) were added into the autoclave. To prevent homopolymerization before charging $CO_2$, 1.5 mL of propylene oxide was charged into a separate small vial which was put inside the autoclave. $CO_2$ was charged into the sealed autoclave to 10 bar. Then, copolymerization was carried out under vigorous stirring at room temperature. After the reaction time, the carbon dioxide slowly vented, and the reaction quenched with drops of 10% HCl. Toluene was used to extract the polymer to remove the added ionic liquid. The organic solution was concentrated and dried for characterization. The results were listed in Table 4. The obtained polycarbonates (non-quenched polymer crude mixture) exhibited degradation phenomena characterized by IR (See FIG. 39A illustrating a graphical view of an IR degradation characterization of a prepared polymer initiated by N-heterocyclic carbene (NHC), according to one or more embodiments of this disclosure), GPC (See FIG. 39B illustrating a graphical view of a gel permeation chromatography (GPC) degradation characterization of a prepared polymer initiated by N-heterocyclic carbene (NHC), according to one or more embodiments of this disclosure), suggesting their gradient structure.

TABLE 4

Gradient poly(ether carbonate) copolymer initiated by carbene system

| EXP* | Initiator (1.0) | iBu3Al (Eq.) | IL (Eq.) | solvent | PO | CO2 (atm) | Temp. | time | Conv. (% PO) | PC (mol %) | Selectivity (%) | GPC (×10³) |
|---|---|---|---|---|---|---|---|---|---|---|---|---|
| 1 | PhEOH/NHC | 0 | 0 | Tol | 7.2M | 10 | 60 | | | 0 | 0 | |
| 2 | PhEOH/NHC | 1.0 | 0 | Tol | 7.2M | 10 | 60 | 3 ds | 51 | 26 | 30 | 1.39/2.28 |
| 3 | PhEOH/NHC | 1.5 | 0 | Tol | 7.2M | 10 | R.t. | 16 + 10(40° C.) | 91 | 1.1 | 64 | 14.7/1.18 |
| 4 | PhEOH/NHC | 1.2 | 5 | Tol | 7.2M | 10 | R.t. | 16 + 8(40° C.) | 12 | 42 | 73 | 1.57/1.37 |
| 5 | PhEOH/NHC | 1.5 | 10 | Tol | 7.2M | 10 | R.t. | 16 | 26 | 27 | 85 | 6.46/1.10 |
| 6 | PhEOH/NHC | 1.2 | 20 | Tol | 7.2M | 10 | R.t. | 3 ds | 36 | 50 | 99.3 | 5.82/1.16 |
| 7 | PhEOH/NHC | 1.2 | 5 | Tol. | 7.2M | 10 | r.t. | 16 h | 2.5 | 51 | >99% | |
| 8 | PhEOH/NHC | 1.2 | 8 | Tol. | 7.2M | 10 | r.t. | 16 h | 4.9 | 58 | 93% | |
| 9 | PhEOH/NHC | 1.2 | 10 | Tol. | 7.2M | 10 | r.t. | 16 h | 6.9 | 54 | >99% | |
| 11 | PhEOH/NHC | 1.2 | 20 | Tol. | 7.2M | 10 | r.t. | 16 h | 10.3 | 38 | 99% | |
| 12 | PhEOH/NHC | 5.0 | 10 | Tol. | 7.2M | 10 | r.t. | 16 h | 26.2 | 37 | 97% | |
| 13 | PhEOH/NHC | 3.0 | 10 | Tol. | 7.2M | 10 | r.t. | 16 h | 19.3 | 42 | 97% | |
| 14 | PhEOH/NHC | 2.0 | 10 | Tol. | 7.2M | 10 | r.t. | 16 h | 9.9 | 46 | 97% | |
| 15 | Acetic acid/NHC | 1.2 | 10 | Tol. | 7.2M | 10 | r.t. | 16 h | 3.5 | 48 | 99% | |
| 16 | PhEOH/NHC | 1.2 | 10 | DCM | 7.2M | 10 | r.t. | 16 h | 0.8 | 53 | 98% | |
| 17 | PhEOH/NHC | 1.2 | 10 | Dioxane | 7.2M | 10 | r.t. | 16 h | 5.8 | 50 | 98% | |
| 18 | PhEOH/NHC | 1.2 | 10 | THF | 7.2M | 10 | r.t. | 16 h | 9.3 | 44 | >99% | |
| 19 | PhEOH/NHC | 1.2 | 10 | Cyclic carbonate | 7.2M | 10 | r.t. | 16 h | Trace | 52 | | |
| 20 | PhEOH/NHC | 1.2 | 10 | hexane | 7.2M | 10 | r.t. | 16 h | 6.4 | 45 | 97% | |
| 21 | PhEOH/NHC | 2.0 | 10 | Tol. | 5.6M | 10 | r.t. | 16 h | 84.0 | 33 | >99% | [00150] |
| 22 | PhEOH/NHC | 1.2 | 10 | Tol. | 5.6M | 30 | r.t. | 16 h | 10.0 | 16 | >99% | [00151] |

*: Exp. 1-20, propylene oxide as monomer, 21-22, cyclohexene oxide as monomer.

EXAMPLE 14

Figure 40:
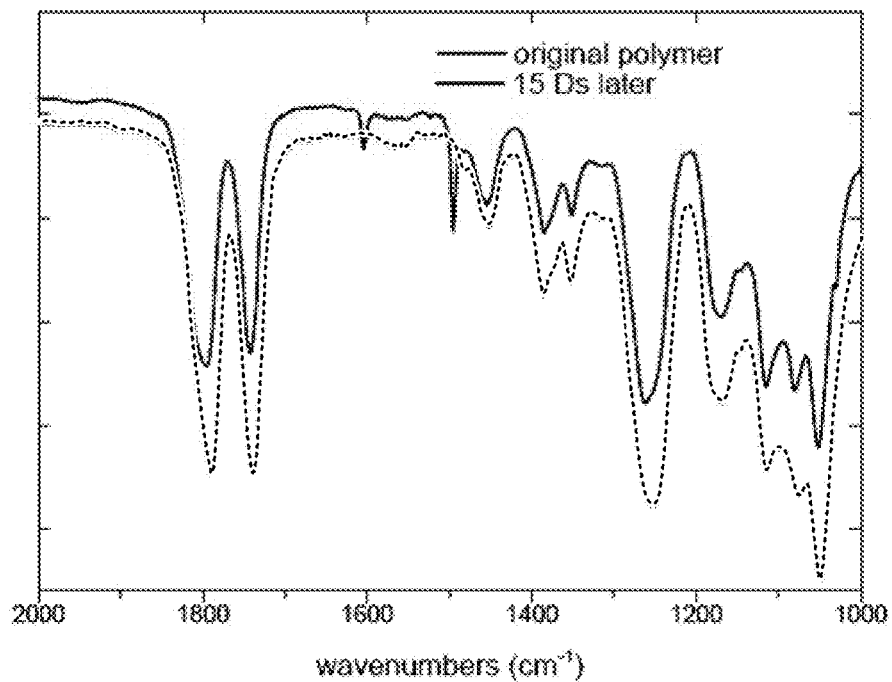
FIG. 40 illustrates a graphical view of an infrared (IR) degradation test of prepared polymer initiated by imidazolium chloride, according to one or more embodiments of this disclosure.
Figure 41A:
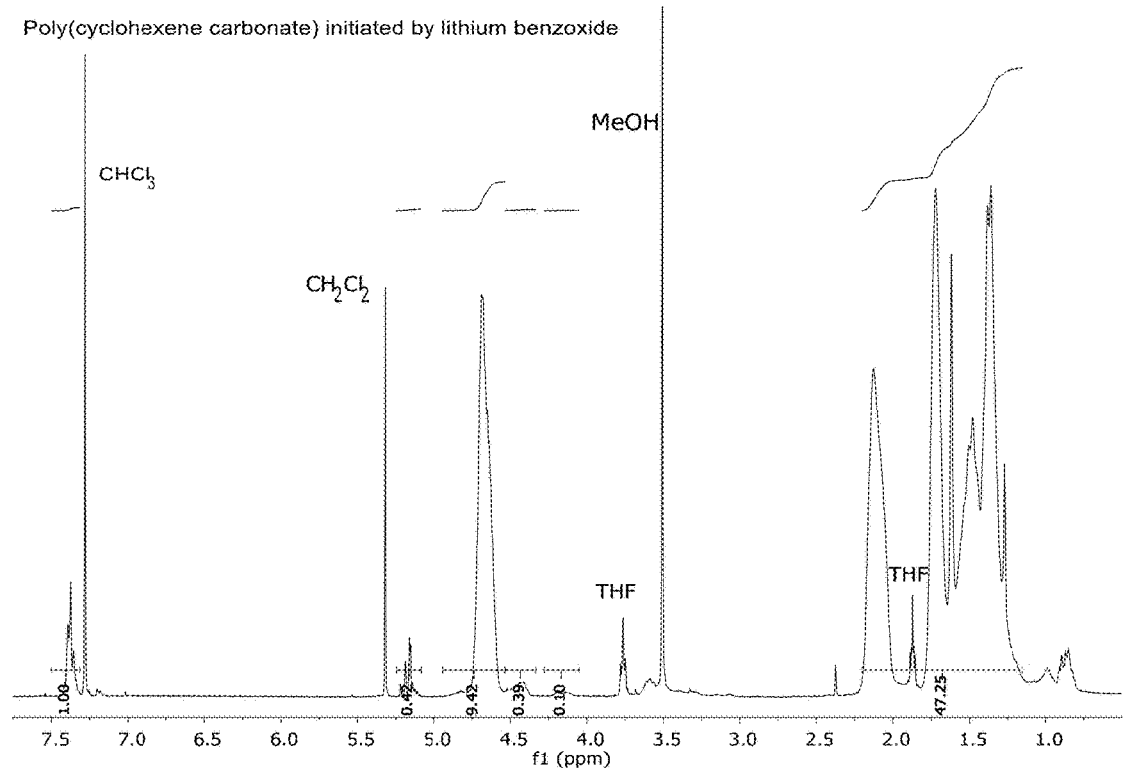
FIG. 41A illustrates a graphical view of NMR characterization of prepared poly(cyclohexene carbonate) initiated by Lithium benzoxide and catalyzed by triisobutyl aluminum, according to one or more embodiments of this disclosure.
Figure 41B:
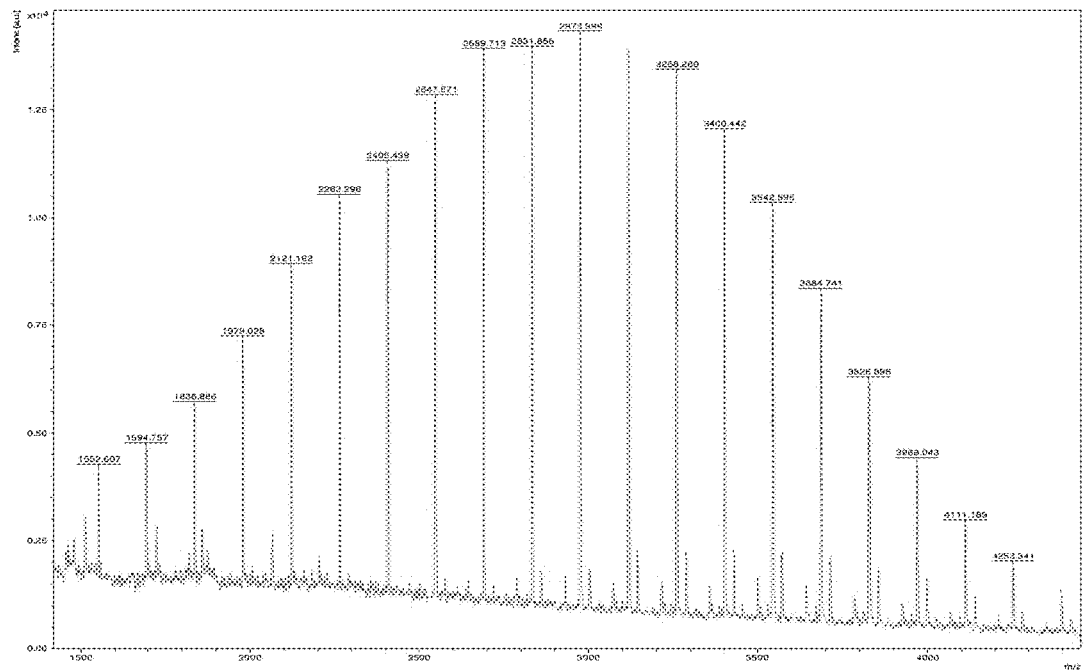
FIG. 41B illustrates a graphical view of MALDI-tof characterization of prepared poly(cyclohexene carbonate) initiated by Lithium benzoxide and catalyzed by triisobutyl aluminum, according to one or more embodiments of this disclosure.
Figure 42A:
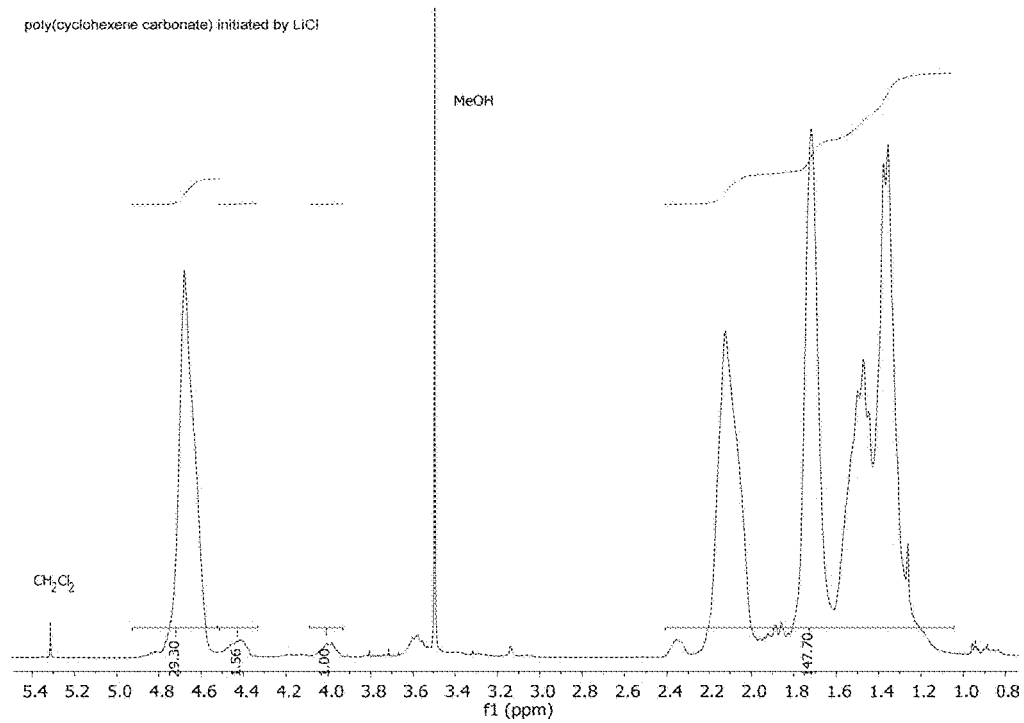
FIG. 42A illustrates a graphical view of NMR characterization of prepared poly(cyclohexene carbonate) initiated by Lithium chloride and catalyzed by triisobutyl aluminum, according to one or more embodiments of this disclosure.
Figure 42B:
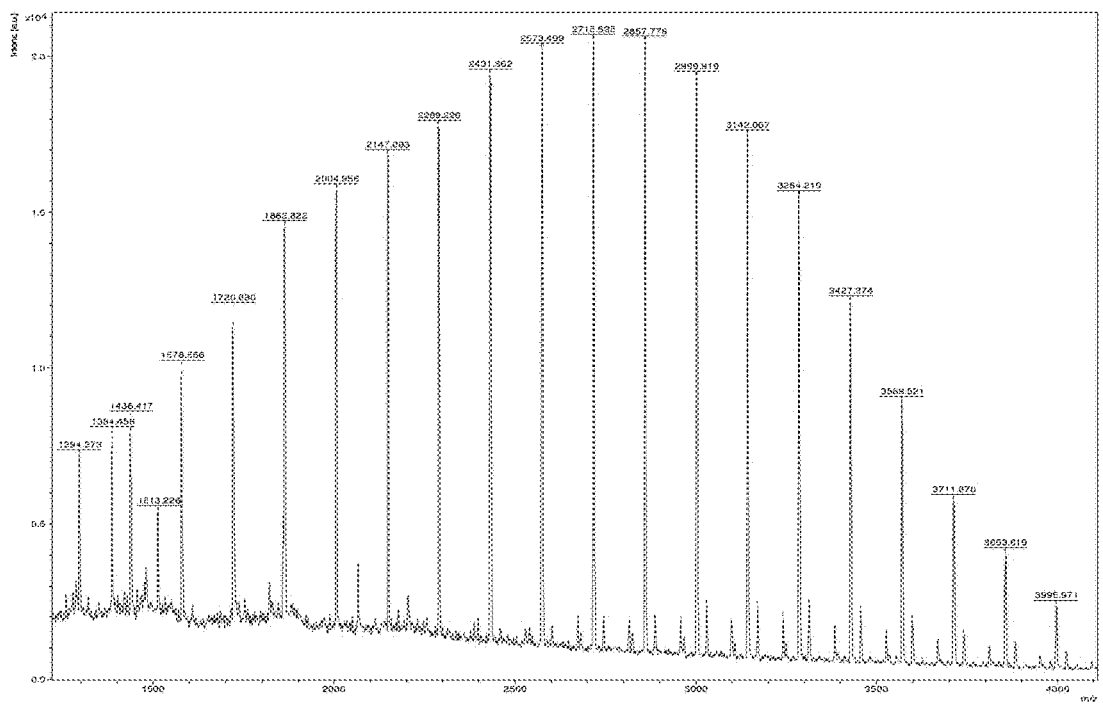
FIG. 42B illustrates a graphical view of MALDI-tof characterization of prepared poly(cyclohexene carbonate) initiated by Lithium chloride and catalyzed by triisobutyl aluminum, according to one or more embodiments of this disclosure.
Figure 43A:
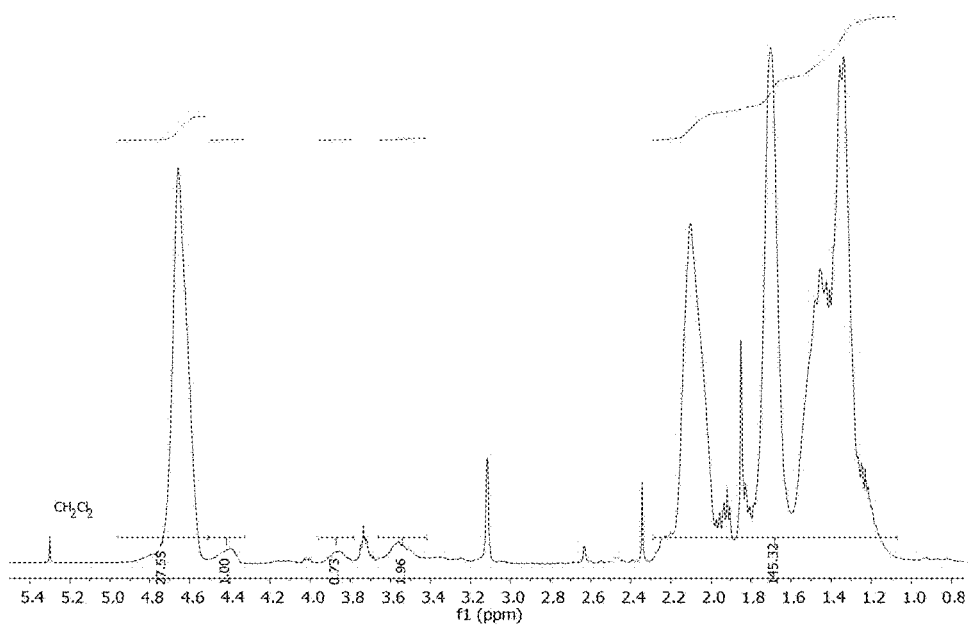
FIG. 43A illustrates a graphical view of NMR characterization of prepared poly(cyclohexene carbonate) initiated by Lithium bromide and catalyzed by triisobutyl aluminum, according to one or more embodiments of this disclosure.
Figure 43B:
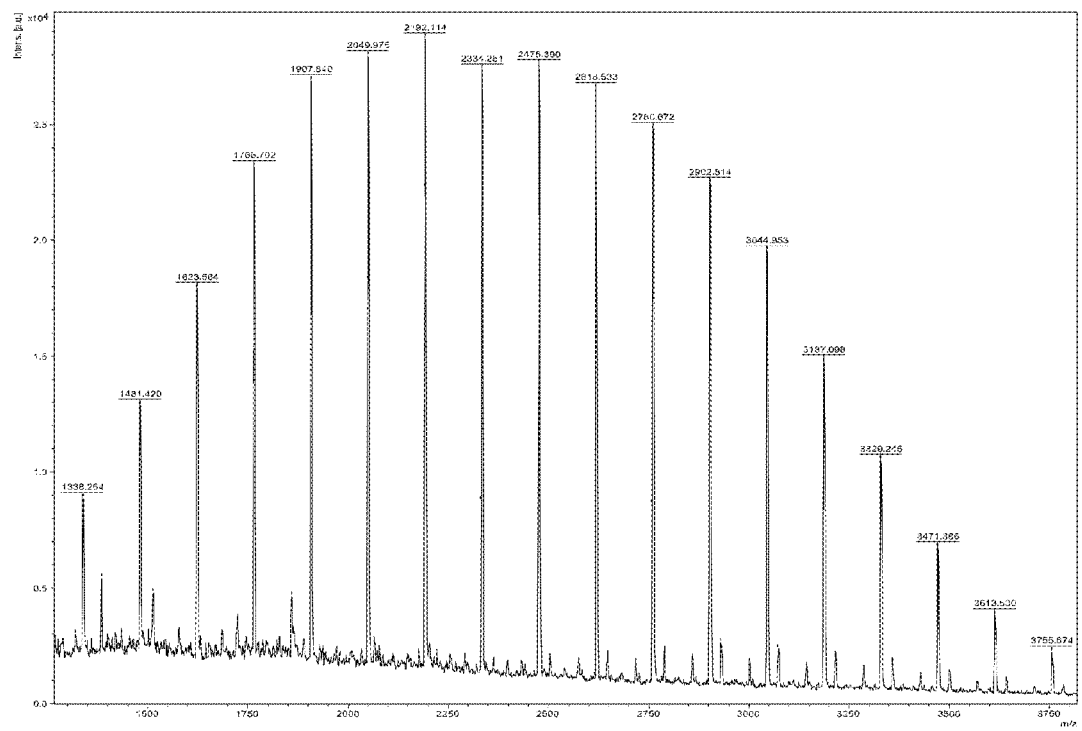
FIG. 43B illustrates a graphical view of MALDI-tof characterization of prepared poly(cyclohexene carbonate) initiated by Lithium bromide and catalyzed by triisobutyl aluminum, according to one or more embodiments of this disclosure.
Figure 44:
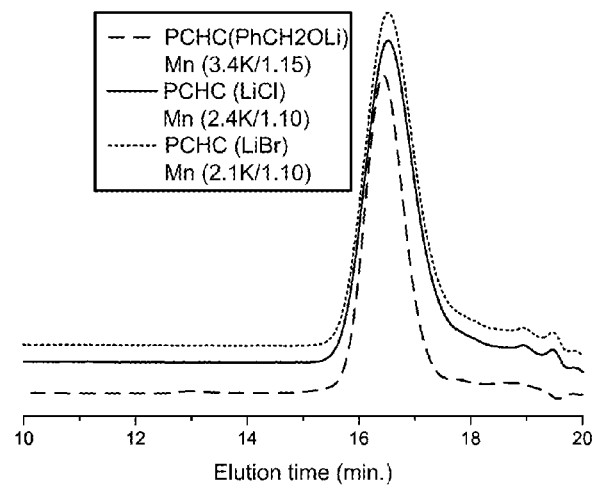
FIG. 44 illustrates a graphical overlay view of a gel permeation chromatography (GPC) characterization of prepared poly(cyclohexene carbonate) initiated by lithium salts and catalyzed by triisobutyl aluminum, according to one or more embodiments of this disclosure.
Figure 45:
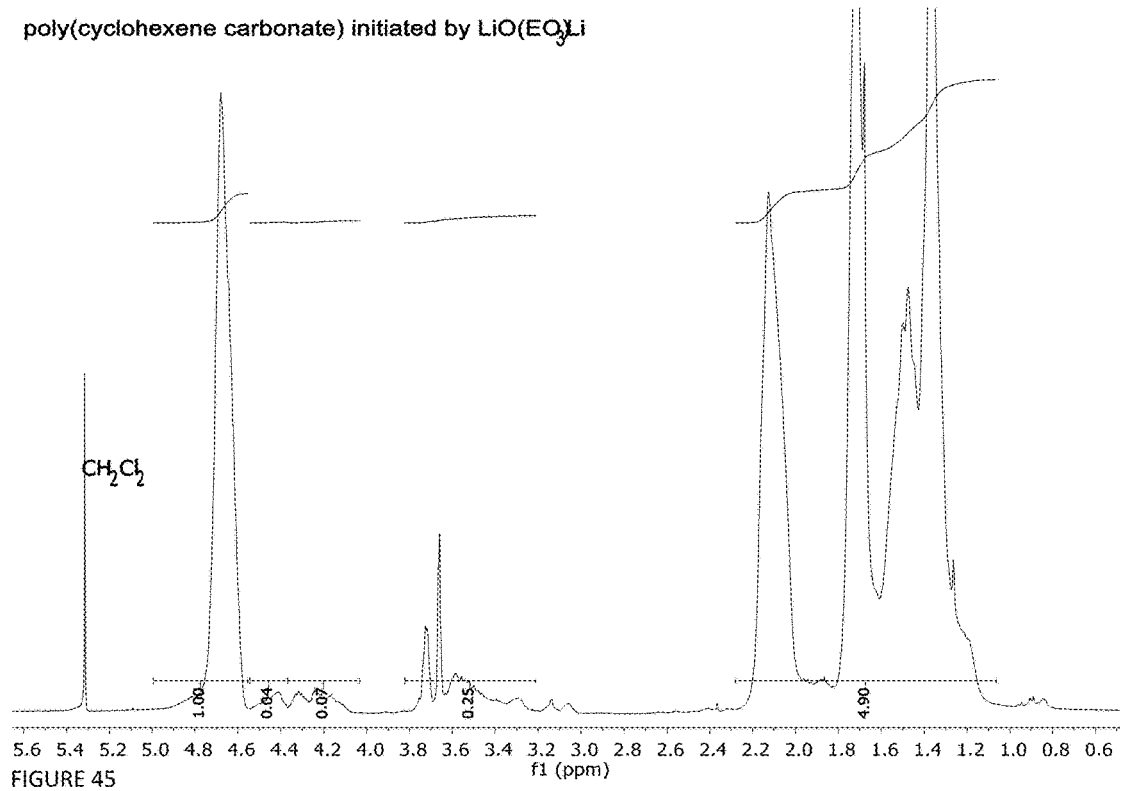
FIG. 45 illustrates a graphical view of NMR characterization of prepared poly(cyclohexene carbonate) initiated by Lithium triethylene glycoxide and catalyzed by triisobutyl aluminum, according to one or more embodiments of this disclosure.
Figure 46:
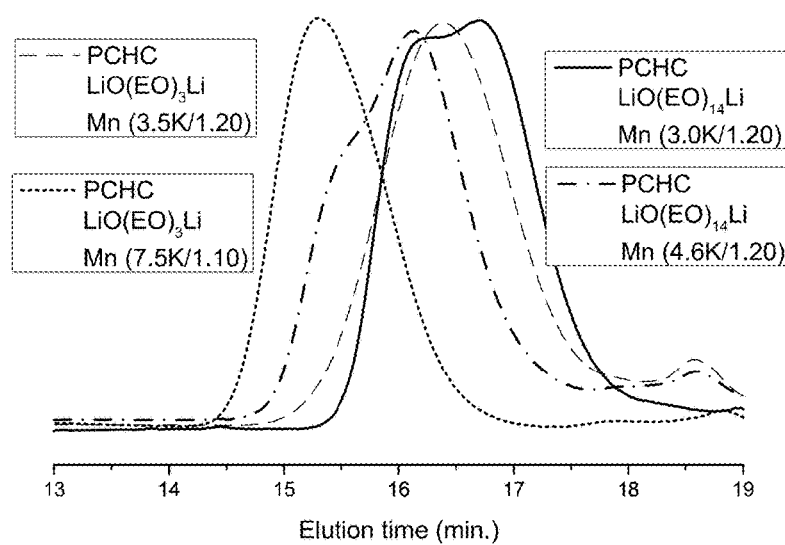
FIG. 46 illustrates a graphical overlay view of a gel permeation chromatography (GPC) characterization of prepared poly(cyclohexene carbonate) initiated by lithium glycoxides and catalyzed by triisobutyl aluminum, according to one or more embodiments of this disclosure.
Figure 47:
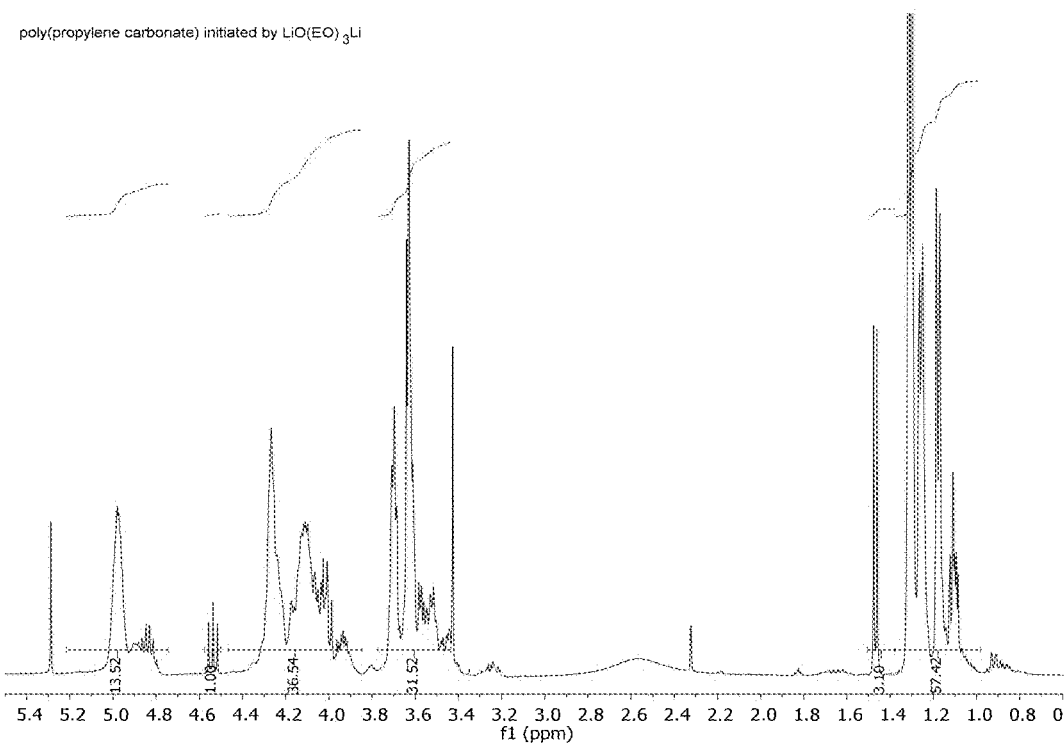
FIG. 47 illustrates a graphical view of NMR characterization of prepared poly(propylene carbonate) initiated by Lithium triethylene glycoxide and catalyzed by triisobutyl aluminum, according to one or more embodiments of this disclosure.
Figure 48:
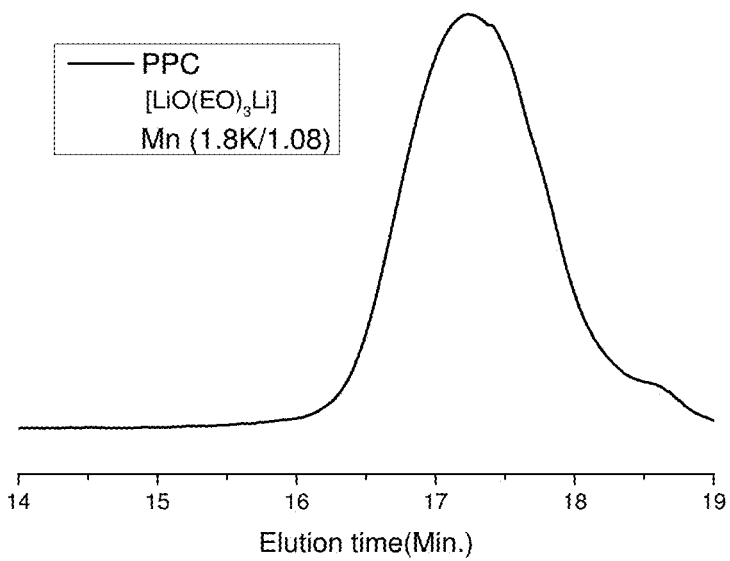
FIG. 48 illustrates a graphical view of a gel permeation chromatography (GPC) characterization of prepared poly(propylene carbonate) initiated by lithium triethylene glycoxides and catalyzed by triisobutyl aluminum, according to one or more embodiments of this disclosure.

A representative procedure of $CO_2$ copolymerization of propylene oxide with imidazolium salt catalyzed by triisobutyl aluminum was performed. Inside a glove box under argon, to a pre-dried 50 mL of autoclave fitted with magnetic stirring bar, 16 mg of 1,3-diisopropylimidazolium chloride (86 μmol) was added followed by 0.3 g of propylene carbonate. After the imidazolium salt was completely dissolved, 123 mg of ionic liquid (5 eq.), 1-butyl-3-methylimidazolium hexaflurophosphate and triisobutyl aluminum in toluene (103 μmol) were added into the autoclave. To prevent homopolymerization before charging $CO_2$, 1.5 mL of propylene oxide was charged into a separate small vial which was put inside the autoclave. $CO_2$ was charged into the sealed autoclave to 10 bar. Then, copolymerization was carried out under stirring at 60° C. after the propylene oxide was mixed through vigorous shaking. After the reaction time, the carbon dioxide was slowly vented, and quenched the reaction with drops of 10% HCl. The reaction mixture was precipitated into excess of water to remove propylene carbonate. Toluene was used to extract the precipitate to remove the added ionic liquid. The organic solution was concentrated and dried for characterization. The results were listed in Table 5. The obtained polycarbonates (non-quenched polymer crude mixture) did not exhibit degradation phenomena characterized by IR (see FIG. 40 illustrating a graphical view of an infrared (IR) degradation test of prepared polymer initiated by imidazolium chloride, according to one or more embodiments of this disclosure).

TABLE 5

Random poly(propylene carbonate) copolymer initiated by imidazolium chloride

| EXP | Initiator (1.0) | iBu3Al (Eq.) | IL (Eq.) | solvent | PO | CO2 (atm) | Temp. | time | Conv. (% PO) | PPC (mol %) | Selectivity (%) | GPC (×10³) |
|---|---|---|---|---|---|---|---|---|---|---|---|---|
| 23 | Pr2lmCl | 1.2 | 5 | CPC | 12.3M | 10 | 60 | 16 | 90 | 33 | nd | 2.55/1.28 |
| 24 | Pr2lmCl | 1.2 | 20 | CPC | 12.3M | 10 | 60 | 16 | 56 | 36 | nd | 4.67/1.59 |
| 25 | Pr2lmCl | 1.2 | 0 | CPC | 13.6M | 15 | 60 | 3 ds | 42 | | nd | 22.0/1.12 |
| 26 | Pr2lmCl | 1.1 | 5 | CPC | 12.3M | 10 | 60 | 16 | 77 | 34 | nd | 6.48/1.58 |

EXAMPLE 15

A representative procedure of $CO_2$ copolymerization of cyclohexene oxide with lithium salts catalyzed by triisobutyl aluminum was performed. Inside a glove box under argon, to a pre-dried 50 mL of autoclave fitted with magnetic stirring bar, 93 mg of 2-phenyl ethanol (0.74 mmol) was added followed by 1.5 mL of THF. Butyllithium in toluene (0.74 mmol) was added to deprotonate the alcohol. Ten minutes later, triisobutyl aluminum in toluene (0.20 mmol) were added into the autoclave. To prevent homopolymerization before charging $CO_2$, 1.5 mL of cyclohexene oxide was charged into a separate small vial which was put inside the autoclave. $CO_2$ was charged into the sealed autoclave to 10 bar. Then, copolymerization was carried out under vigorous stirring at 80° C. After the reaction time, the carbon dioxide slowly vented, and the reaction quenched with drops of 10% HCl. Dichloromathane was used to extract the polymer. The organic solution was concentrated and precipitated in methanol. The results were listed in Table 6, FIG. 41-48.

TABLE 6 polycarbonate initiated by lithium salts

| EXP | Initiator (mol/L) | iBu3Al (mol/L) | Li salt additive (Eq.) | solvent | Epoxide | CO2 (atm) | Temp. | time | Yield (%) | PC (mol %) | Selectivity (%) | GPC (×10³) |
|---|---|---|---|---|---|---|---|---|---|---|---|---|
| 27 | BzOLi(0.25) | 0.066 | 0 | THF | CHO(5.0M) | 10 | 80 | 16 | 84 | 99 | >99 | 3.4/1.10 |
| 24 | BzOLi(0.10) | 0.025 | 0 | Tol | CHO(5.0M) | 10 | 80 | 16 | 11 | 25 | >99 | 2.0/1.20 |
| 25 | BzOLi(0.10) | 0.025 | 0 | THF | CHO(5.0M) | 10 | 60 | 16 | 13 | 91 | >99 | 5.3/1.10 |
| 26 | BzOLi(0.10) | 0.066 | 0 | THF | CHO(5.0M) | 10 | 60 | 16 | 73 | 88 | >99 | 4.0/1.10 |
| 27 | BzOLi(0.10) | 0.10 | 0 | THF | CHO(5.0M) | 10 | 60 | 16 | 78 | 29 | >99 | 5.3/1.10 |
| 28 | BzOLi(0.10) | 0.066 | $CF_3SO_3Li$(1.5) | THF | CHO(5.0M) | 10 | 80 | 16 | 50 | 12 | >99 | 1.2/1.30 |
| 29 | BzOLi(0.10) | 0.066 | LiF(1.5) | THF | CHO(5.0M) | 10 | 80 | 16 | 47 | 60 | >99 | 1.4/1.40 |
| 30 | LiCl(0.25) | 0.066 | 0 | THF | CHO(5.0M) | 10 | 80 | 16 | 86 | 99 | >99 | 2.4/1.10 |
| 31 | LiBr(0.25) | 0.066 | 0 | THF | CHO(5.0M) | 10 | 60 | 16 | 92 | 99 | >99 | 2.1/1.10 |
| 32 | $LiO(EO)_3Li$ (0.25) | 0.13 | 0 | THF | CHO(5.0M) | 10 | 60 | 16 | 91 | 88 | >99 | 4.1/1.20 |
| 33 | $LiO(EO)_{14}Li$ (0.25) | 0.13 | 0 | THF | CHO(5.0M) | 10 | 60 | 16 | 97 | 99 | >99 | 3.0/1.20 |
| 34 | PSt-CH2CH2OLi (0.25) | 0.066 | 0 | THF | CHO(5.0M) | 10 | 60 | 16 | 90 | 95 | >99 | 4.1/1.10 |
| 35 | $LiO(EO)_3Li$ (0.18) | 0.094 | 0 | THF | PO(7.2M) | 10 | r.t. | 16 | 25 | 61 | 94 | 1.8/1.08 |

EXAMPLE 16

Figure 49:
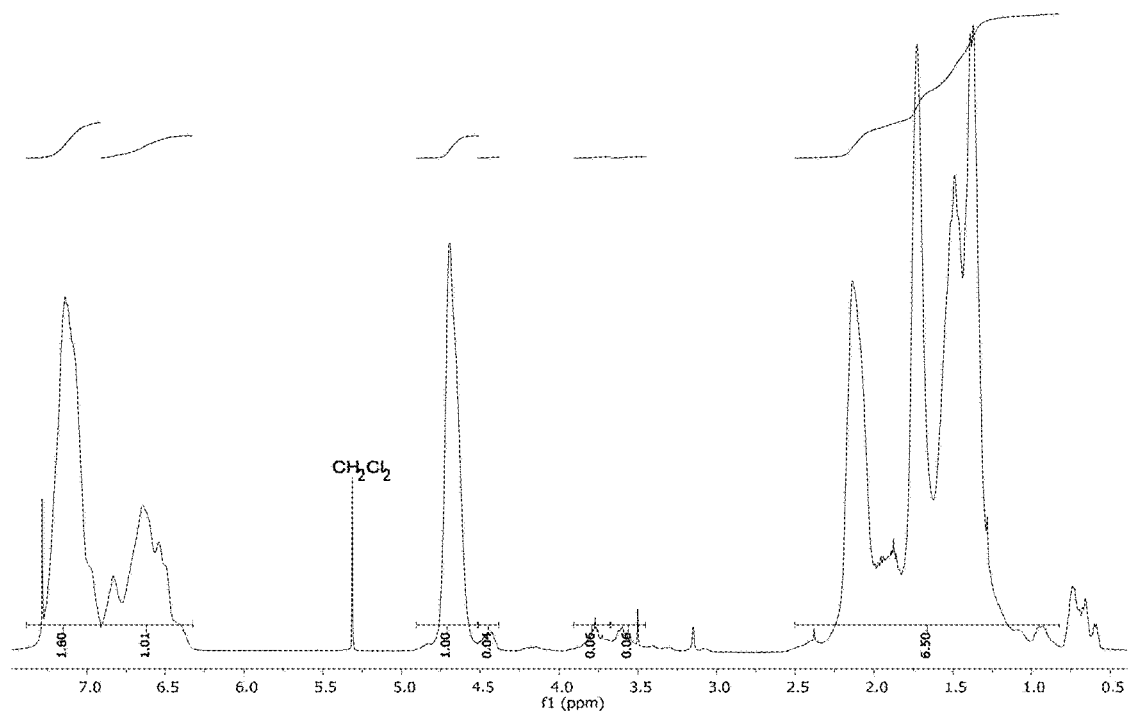
FIG. 49 illustrates a graphical view of NMR characterization of prepared polymer initiated by Lithium polystyrene and catalyzed by triisobutyl aluminum, according to one or more embodiments of this disclosure.
Figure 50:
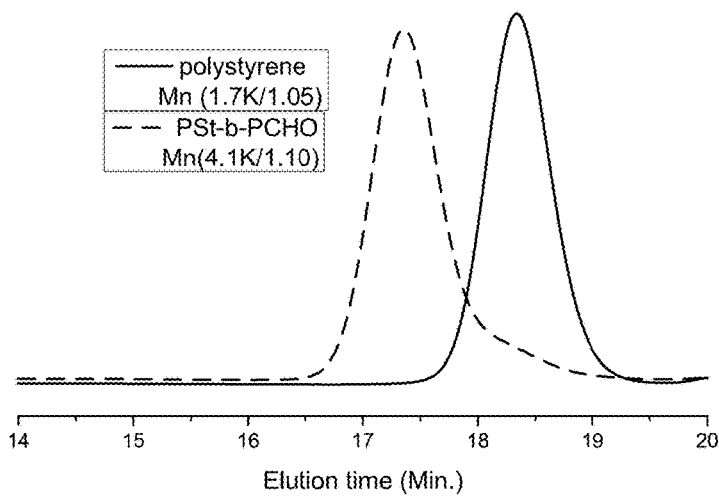
FIG. 50 illustrates a graphical overlay view of a gel permeation chromatography (GPC) characterization of prepared polymers initiated by lithium polystyrene and catalyzed by triisobutyl aluminum, according to one or more embodiments of this disclosure.
Figure 51:
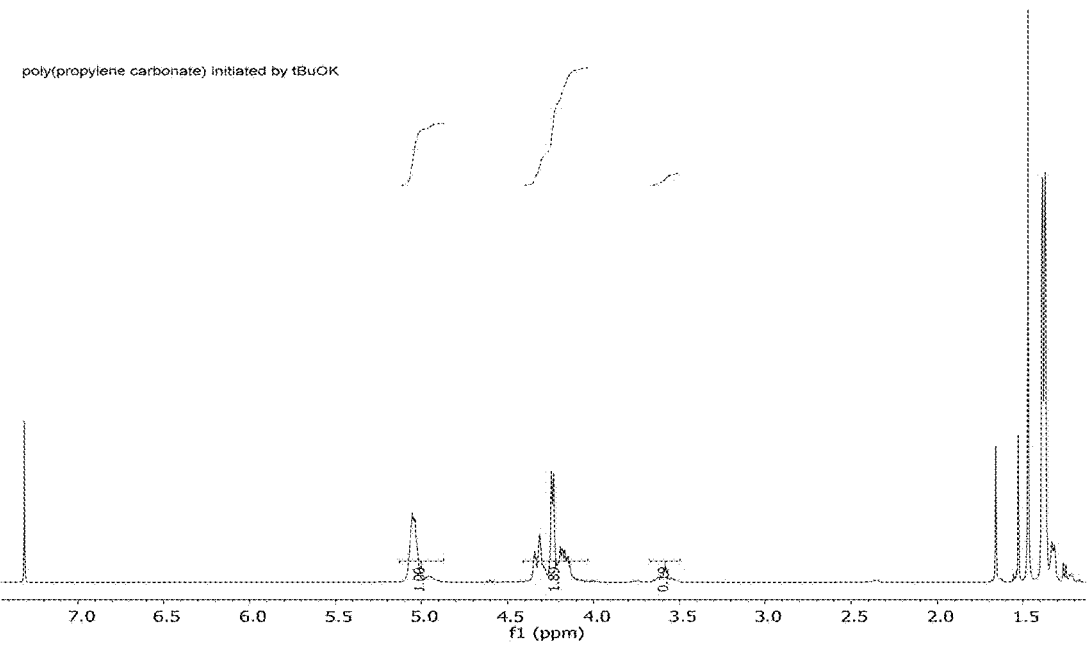
FIG. 51 illustrates a graphical view of NMR characterization of prepared polymer initiated by potassium tertbutyloxide and catalyzed by triethyl borane, according to one or more embodiments of this disclosure.
Figure 52:
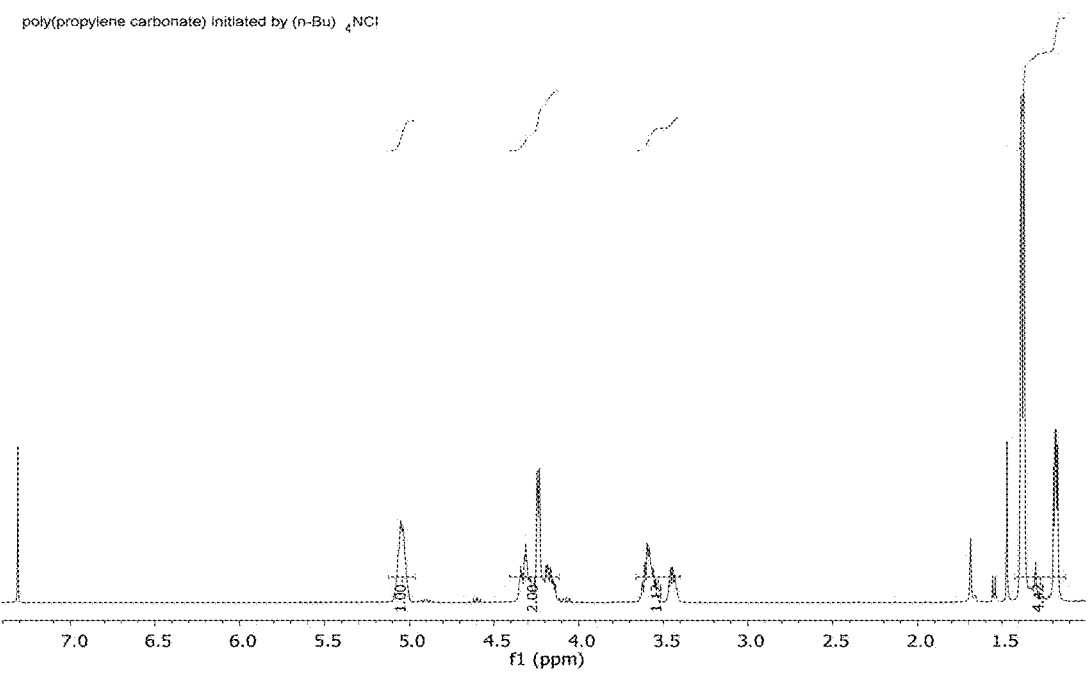
FIG. 52 illustrates a graphical view of NMR characterization of prepared polymer initiated by tetrabutylammonium chloride and catalyzed by triethyl borane, according to one or more embodiments of this disclosure.
Figure 53:
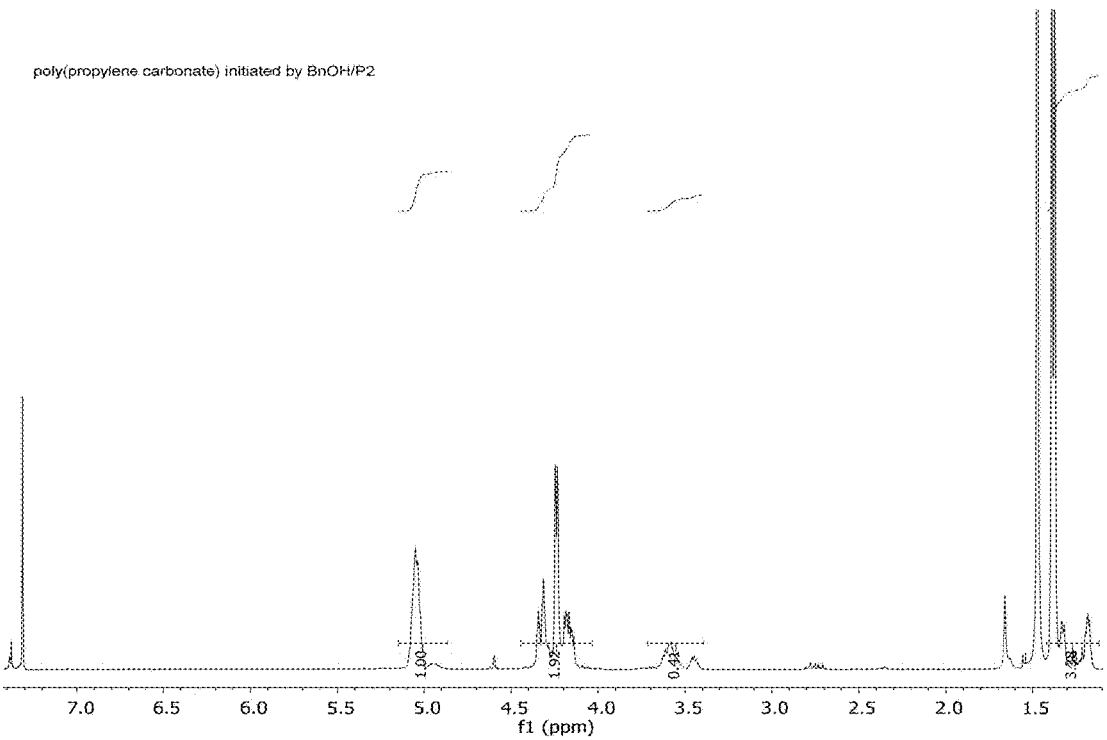
FIG. 53 illustrates a graphical view of NMR characterization of prepared polymer initiated by benzene alcohol and phosphazene P2 and catalyzed by triethyl borane, according to one or more embodiments of this disclosure.
Figure 54:
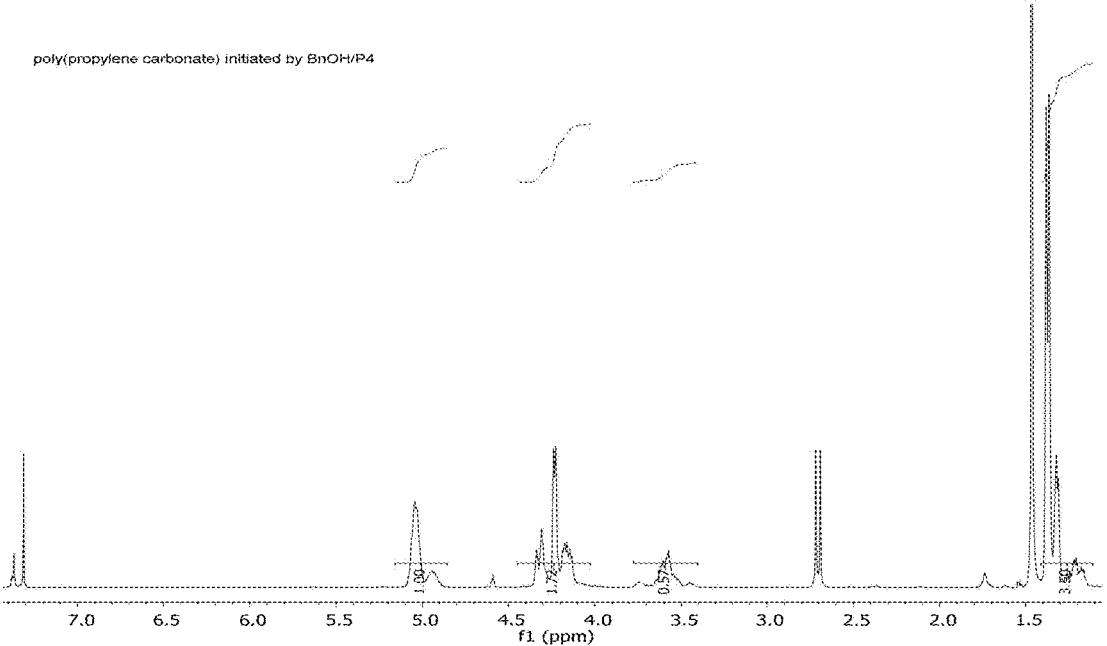
FIG. 54 illustrates a graphical view of NMR characterization of prepared polymer initiated by benzene alcohol and phosphazene P4 and catalyzed by triethyl borane, according to one or more embodiments of this disclosure.

A representative procedure of $CO_2$ copolymerization of cyclohexene oxide with macromolecular lithium salts catalyzed by triisobutyl aluminum was performed. Inside a glove box under argon, to a pre-dried 50 mL of autoclave fitted with magnetic stirring bar, 93 mg of 2-phenyl ethanol (0.74 mmol) was added followed by 1.5 mL of THF. Butyllithium in toluene (0.74 mmol) was added to deprotonate the alcohol. Ten minutes later, triisobutyl aluminum in toluene (0.20 mmol) were added into the autoclave. To prevent homopolymerization before charging $CO_2$, 1.5 mL of cyclohexene oxide was charged into a separate small vial which was put inside the autoclave. $CO_2$ was charged into the sealed autoclave to 10 bar. Then, copolymerization was carried out under vigorous stirring at 80° C. After the reaction time, the carbon dioxide slowly vented, and the reaction quenched with drops of 10% HCl. Dichloromathane was used to extract the polymer. The organic solution was concentrated and precipitated in methanol. The results were listed in Table 6, FIG. 49, 50.

EXAMPLE 17

A representative procedure of $CO_2$ copolymerization of propylene oxide catalyzed by triethylborane was performed. Inside a glove box under argon, to a pre-dried 50 mL of autoclave fitted with magnetic stirring bar, 9.6 mg of potassium tert-butyloxide (86 μmol) was added followed by triethylborane solution in THF (172 μmol) and propylene oxide (3 mL, 43 mmol). $CO_2$ was charged into the sealed autoclave to 10 bar. Then, copolymerization was carried out under stirring at 60° C. After the reaction time for 16 hours, the carbon dioxide was slowly vented, and quenched the reaction with drops of 10% HCl. Dichloromathane was used to extract the polymer. The organic solution was concentrated and the polymer was obtained after precipitation in cyclohexene or cold methanol. The results were listed in Table 7. (see FIG. 51-54, 56).

EXAMPLE 18

A representative procedure of $CO_2$ copolymerization of cyclohexene oxide catalyzed by triethylborane was per-

TABLE 7

Supplementary data of copolymerization of $CO_2$ and epoxide in the presence of boron Lewis acids.

Figure 55:
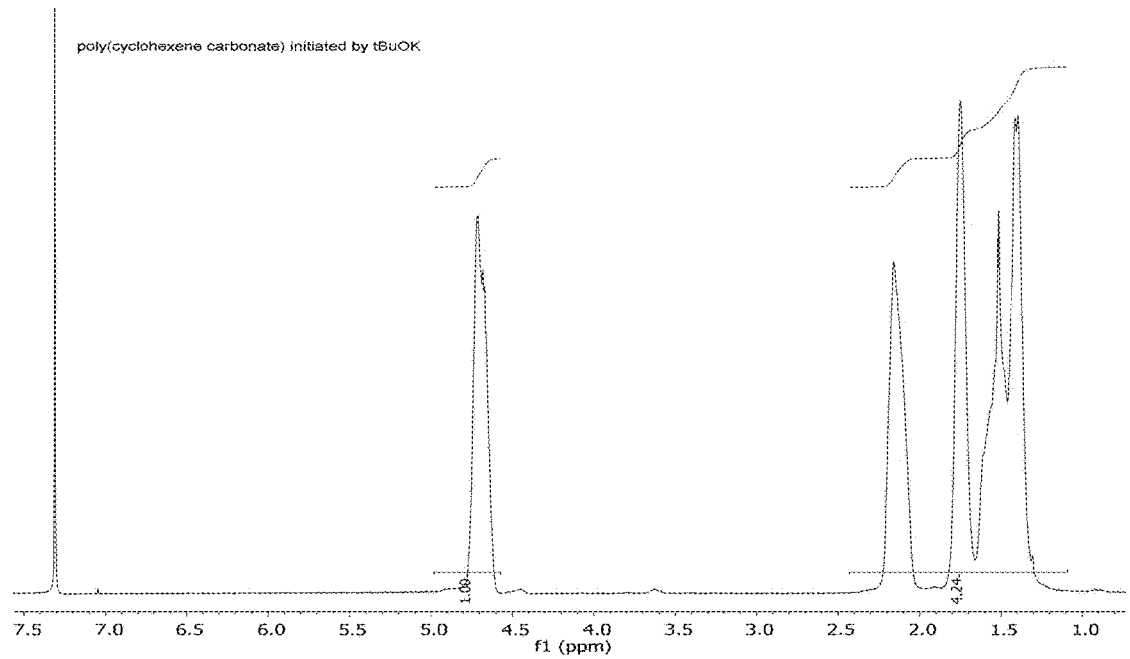
FIG. 55 illustrates a graphical view of NMR characterization of prepared poly(cyclohexene carbonate) initiated by potassium tertbutyloxide and catalyzed by triethyl borane, according to one or more embodiments of this disclosure.
Figure 56:
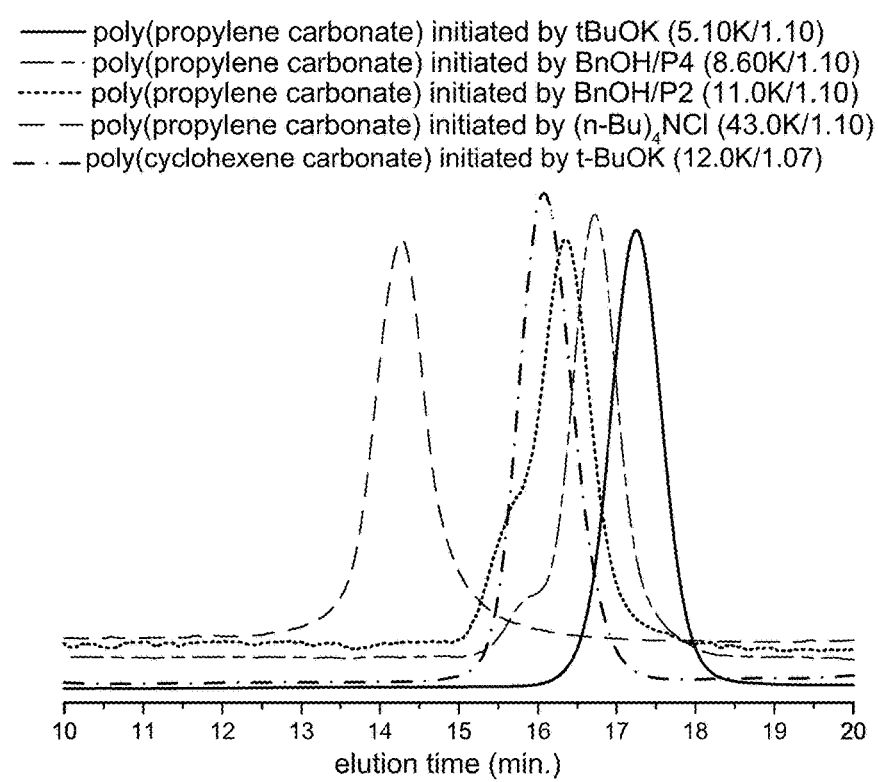
FIG. 56 illustrates a graphical overlay view of a gel permeation chromatography (GPC) characterization of prepared poly(propylene carbonate) and poly(cyclohexene carbonate) polymers catalyzed by triethylborane, according to one or more embodiments of this disclosure.
Figure 57A:
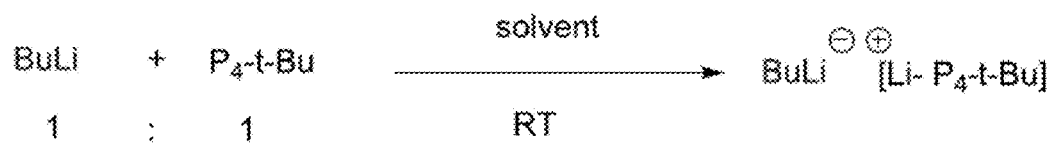
FIGS. 57A-57B are a schematic diagram of preparing n-butyllithium/phosphazene $P_4$-t-Bu superbase complex and $H^1$ NMR spectra for n-BuLi/$P_4$-t-Bu complex (400 MHz, benzene-$d_6$), according to one or more embodiments of the present disclosure.
Figure 57B:
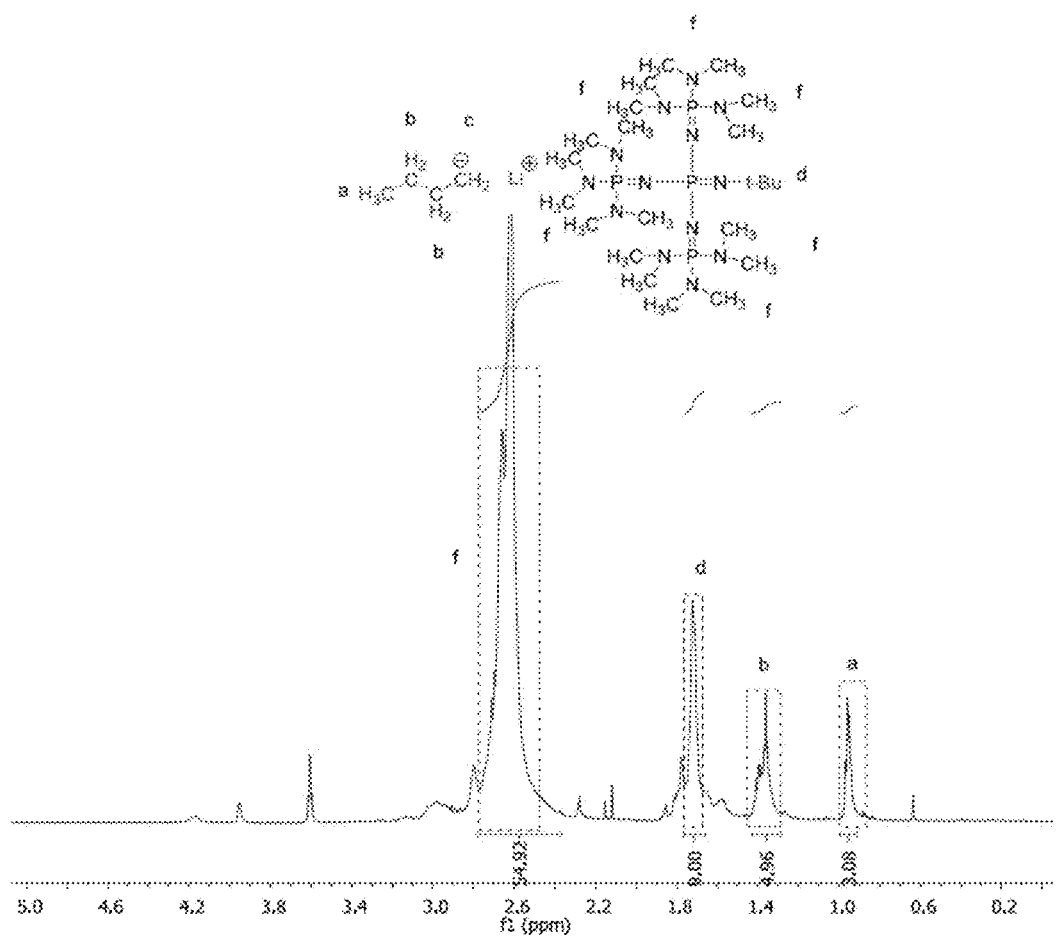

| EXP | Initiator (mol/L) | Et₃B (mol/L) | solvent | Epoxide | CO2 (atm) | Temp. | time | Yield (%) | PC (mol %) | Selectivity (%) | GPC (×10³) |
|---|---|---|---|---|---|---|---|---|---|---|---|
| 27 | t-BuOK (0.28) | 0.56 | — | PO, bulk | 10 | 60 | 16 h | 93 | 94 | 97 | 5.10/1.10 |
| 28 | (Bu)₄NCl (0.14) | 0.28 | — | PO, bulk | 10 | 60 | 16 h | 85 | 82 | 95 | 9.00/1.10 |
| 29 | (Bu)₄NCl (0.028) | 0.056 | — | PO, bulk | 10 | 60 | 16 h | 80 | 73 | 94 | 43.0/1.10 |
| 30 | (Bu)₄NCl (0.014) | 0.028 | — | PO, bulk | 10 | 60 | 16 h | 59 | 83 | 78 | 40.0/1.10 |
| 31 | (Bu)₄NCl (0.028) | 0.056 | toluene | PO, 7.2M | 10 | 60 | 16 h | 62 | 73 | 85 | 33.0/1.20 |
| 32 | BnOH/P2 (0.07) | 0.014 | THF | PO, 7.2M | 10 | 60 | 16 h | 93 | 88 | 96 | 11.0/1.20 |
| 33 | BnOH/P4 (0.14) | 0.28 | THF | PO, 7.2M | 10 | 60 | 16 h | 95 | 85 | 95 | 8.60/1.10 |
| 34 | t-BuOK (0.067) | 0.13 | THF | CHO, 5.0M | 10 | 80 | 16 h | 93 | >99 | >99% | 12.0K/1.07 | formed. Inside a glove box under argon, to a pre-dried 50 mL of autoclave fitted with magnetic stirring bar, 45 mg of potassium tert-butyloxide (40 µmol) was added followed by 3.0 mL of THF, triethylborane (80 umol), and 3.0 mL of cyclohexene oxide. $CO_2$ was charged into the sealed autoclave to 10 bar. Then, copolymerization was carried out under vigorous stirring at 80° C. After the reaction time, the carbon dioxide slowly vented, and the reaction quenched with drops of 10% HCl. Dichloromathane was used to dissolve and dilute the polymer. The polymer was obtained through precipitation in cold methanol. The results were listed in Table 7, FIG. 55-56. FIGS. 57A-57B a schematic diagram of preparing n-butyllithium/phosphazene $P_4$-t-Bu superbase complex and $H^1$ NMR spectra for n-BuLi/$P_4$-t-Bu complex (400 MHz, benzene-$d_6$), according to one or more embodiments of the present disclosure.

The present invention is described with reference to the attached figures, wherein like reference numerals are used throughout the figures to designate similar or equivalent elements. The figures are not drawn to scale and they are provided merely to illustrate the invention. Several aspects of the invention are described with reference to example applications for illustration. It should be understood that numerous specific details, relationships, and methods are set forth to provide an understanding of the invention. One skilled in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

What is claimed is:

1. A method of making a polycarbonate, comprising:
   contacting an epoxide monomer and carbon dioxide in the presence of an activator and initiator to form a polycarbonate,
   wherein the activator is a trialkyl borane,
   wherein the initiator includes an alcohol compound and an organic cation,
   wherein the polycarbonate is formed under metal-free conditions.

2. The method of claim 1, wherein the epoxide monomer is one or more of ethylene oxide, propylene oxide, 1-butene oxide, 1-hexene oxide, 1-octene oxide, styrene oxide, cyclohexene oxide, allyl glycidyl ether, and butyl glycidyl ether.

3. The method of claim 1, wherein the activator is one or more of triethyl borane, trimethyl borane, triisobutylborane, and triphenylborane.

4. The method of claim 1, wherein the alcohol compound includes more than one hydroxyl group.

5. The method of claim 1, wherein the alcohol compound of the initiator is one or more of 1,4-benzenedimethanol and benzyl alcohol.

6. A method of making a polycarbonate, comprising:
   contacting an epoxide monomer and carbon dioxide in the presence of an activator and initiator to form a polycarbonate,
   wherein the activator is a trialkyl borane,
   wherein the initiator includes an alcohol compound and an organic cation,
   wherein the organic cation is a phosphazene base.

7. The method of claim 1, wherein the initiator is one of the following: 1,4-benzenedimethanol and t-Bu-$P_4$; and benzyl alcohol and t-Bu-$P_4$.

8. A method of making a block copolymer of polycarbonate, comprising:
   contacting a first epoxide monomer and carbon dioxide in the presence of an activator including trialkyl borane and an initiator to form a first polycarbonate block, wherein the initiator includes an alcohol compound and an organic cation, and
   adding a second epoxide monomer to form a second polycarbonate block of a block copolymer that is different from the first polycarbonate block,
   wherein the block copolymer is formed under metal-free conditions.

9. The method of claim 8, wherein the first epoxide monomer and the second epoxide monomer are different.

10. The method of claim 8, wherein the first epoxide monomer and the second epoxide monomer are one or more of ethylene oxide, propylene oxide, 1-butene oxide, 1-hexene oxide, 1-octene oxide, styrene oxide, cyclohexene oxide, allyl glycidyl ether, and butyl glycidyl ether.

11. The method of claim 8, wherein the activator is one or more of triethyl borane, trimethyl borane, triisobutylborane, and triphenylborane.

12. The method of claim 8, wherein the initiator includes an organic cation and either an alkali metal or alcohol compound.

13. The method of claim 8, wherein the organic cation is one or more of phosphazenium, ammonium, and phosphonium.

14. The method of claim 8, wherein the alcohol compound contains more than one hydroxyl group.

15. The method of claim 8, wherein the alcohol compound is one or more of a diol and triol.

16. The method of claim 8, wherein the block copolymer is an ABA block copolymer, wherein A and B are different.

* * * * *